(12) United States Patent
Kishimoto et al.

(10) Patent No.: US 10,702,864 B2
(45) Date of Patent: Jul. 7, 2020

(54) SOLID-LIQUID SEPARATION METHOD, SOLID-LIQUID SEPARATION APPARATUS, AND KIT TO BE USED THEREFOR

(71) Applicants: SYSMEX CORPORATION, Kobe-shi, Hyogo (JP); MITSUBISHI CHEMICAL CORPORATION, Chiyoda-ku, Tokyo (JP)

(72) Inventors: Satomi Kishimoto, Kobe (JP); Hiroyuki Kabata, Kobe (JP); Takanobu Katsuki, Tokyo (JP)

(73) Assignees: Sysmex Corporation, Hyogo (JP); Mitsubishi Chemical Corporation, Tokyo (JP)

( * ) Notice: Subject to any disclaimer, the term of this patent is extended or adjusted under 35 U.S.C. 154(b) by 245 days.

(21) Appl. No.: 15/993,013

(22) Filed: May 30, 2018

(65) Prior Publication Data

US 2018/0345272 A1 Dec. 6, 2018

(30) Foreign Application Priority Data

May 31, 2017 (JP) ................. 2017-108765

(51) Int. Cl.
*B01L 3/02* (2006.01)
*G01N 1/40* (2006.01)
*G01N 15/06* (2006.01)
*G01N 35/10* (2006.01)

(52) U.S. Cl.
CPC ............ *B01L 3/0275* (2013.01); *B01L 3/021* (2013.01); *B01L 3/0289* (2013.01); *B01L 3/0293* (2013.01); *G01N 1/405* (2013.01); *G01N 15/06* (2013.01); *G01N 35/1009* (2013.01); *B01L 2200/0631* (2013.01); *B01L 2200/0647* (2013.01); *B01L 2200/0668* (2013.01); *B01L 2300/0681* (2013.01); *G01N 2015/0687* (2013.01); *G01N 2015/0693* (2013.01); *G01N 2035/1053* (2013.01); *G01N 2035/1055* (2013.01)

(58) Field of Classification Search
None
See application file for complete search history.

(56) References Cited

U.S. PATENT DOCUMENTS

| 6,875,354 B1 | 4/2005 | Kopaciewicz |
| 8,715,593 B2 | 5/2014 | Brewer |
| 2009/0095057 A1 | 4/2009 | Staats |
| 2010/0015010 A1 | 1/2010 | Tajima |

FOREIGN PATENT DOCUMENTS

| JP | 2003-254877 | 9/2003 |
| JP | 2013-047680 | 3/2013 |
| WO | WO 2004/011146 A1 | 2/2004 |

*Primary Examiner* — Kathryn Wright
(74) *Attorney, Agent, or Firm* — Brinks Gilson & Lione

(57) ABSTRACT

Disclosed is a solid-liquid separation method including: sucking a suspension containing particles, through an opening formed at a leading end of a suction nozzle, into the suction nozzle; allowing at least a part of the particles contained in the sucked suspension, to sediment to be clogged in the suction nozzle; and ejecting a liquid inside the suction nozzle, through the opening of the suction nozzle clogged with the particles.

18 Claims, 33 Drawing Sheets

Specification includes a Sequence Listing.

NO CLOGGING

FIG. 5B

| SIEVE SIZE (μm) | 75-900 | 900-425 | 425-106 | 355-106 | 300-106 | 250-106 | 180-106 | 150-106 | 106-75 | 250-125 |
|---|---|---|---|---|---|---|---|---|---|---|
| D10(μm) | 118.4 | 435.6 | 164.2 | 197.5 | 163.1 | 118.1 | 110.8 | 106.8 | 46.18 | 160.5 |
| D50(μm) | 267.1 | 508.1 | 311.2 | 316.5 | 264 | 188.7 | 159.1 | 150.5 | 87.76 | 229.4 |
| D90(μm) | 467.1 | 577.1 | 453.7 | 435.7 | 374.2 | 293.5 | 223 | 205.9 | 130.3 | 321.4 |
| PARTICLE DIAMETER (μm) | CUMULATIVE (%) | CUMULATIVE (%) | CUMULATIVE (%) | CUMULATIVE (%) | CUMULATIVE (%) | CUMULATIVE (%) | CUMULATIVE (%) | CUMULATIVE (%) | CUMULATIVE (%) | CUMULATIVE (%) |
| 704 | 100 | 100 | 100 | 100 | 100 | 100 | 100 | 100 | 100 | 100 |
| 592 | 98.26 | 95.94 | 99.06 | 99.59 | 100 | 100 | 100 | 100 | 100 | 100 |
| 497.8 | 93.31 | 43.18 | 95.22 | 96.98 | 99.46 | 100 | 100 | 100 | 100 | 100 |
| 418.6 | 82.84 | 4.1 | 83.48 | 86.68 | 96.28 | 99.39 | 100 | 100 | 100 | 99.41 |
| 352 | 69.05 | 1.88 | 63.75 | 65.07 | 85.07 | 96.86 | 99.67 | 100 | 100 | 95.31 |
| 296 | 56.5 | 1.88 | 44.96 | 41.07 | 64.97 | 90.48 | 98.55 | 99.42 | 100 | 83.07 |
| 248.9 | 45.81 | 1.8 | 30.78 | 23.11 | 42.64 | 78.63 | 95.07 | 97.42 | 100 | 61.74 |
| 209.3 | 36.16 | 1.47 | 20.38 | 12.36 | 24.93 | 61.67 | 85.62 | 91.15 | 100 | 36.93 |
| 176 | 27 | 0.94 | 12.53 | 6.48 | 13.39 | 42.14 | 65.57 | 74.62 | 99.07 | 16.8 |
| 148 | 18.56 | 0.49 | 6.82 | 3.3 | 6.75 | 24.68 | 38.88 | 47.25 | 95.82 | 5.97 |
| 124.5 | 11.64 | 0.31 | 3.27 | 1.61 | 3.25 | 12.57 | 18.07 | 22.49 | 87.01 | 1.91 |
| 104.7 | 6.62 | 0.31 | 1.37 | 0.69 | 1.43 | 5.6 | 7.31 | 8.89 | 70.73 | 0.53 |
| 88 | 3.41 | 0.31 | 0.45 | 0.17 | 0.49 | 2.17 | 2.84 | 3.31 | 50.32 | 0 |
| 74 | 1.54 | 0.31 | 0 | 0 | 0 | 0.64 | 1.07 | 1.25 | 32.51 | |
| 62.23 | 0.54 | 0.2 | | | | 0 | 0.34 | 0.49 | 20.45 | |
| 52.33 | 0 | 0.12 | | | | | 0 | 0.16 | 13.23 | |
| 44 | | 0 | | | | | | 0.16 | 9.05 | |
| 37 | | | | | | | | 0.16 | 6.59 | |
| 31.11 | | | | | | | | 0.16 | 5.17 | |
| 26.16 | | | | | | | | 0.16 | 4.35 | |
| 22 | | | | | | | | 0.16 | 3.86 | |
| 18.5 | | | | | | | | 0.16 | 3.51 | |
| 15.56 | | | | | | | | 0.16 | 3.2 | |
| 13.08 | | | | | | | | 0.16 | 2.86 | |
| 11 | | | | | | | | 0.16 | 2.46 | |
| 9.25 | | | | | | | | 0.16 | 1.97 | |
| 7.778 | | | | | | | | 0.16 | 1.41 | |
| 6.541 | | | | | | | | 0 | 0.84 | |
| 5.5 | | | | | | | | | 0.35 | |
| 4.625 | | | | | | | | | 0 | |

MEASUREMENT APPARATUS: Microtrac FRA 9220 manufactured by Leeds & Northrup
MEASUREMENT TYPE: LASER DIFFRACTION/SCATTERING

FIG. 5D

◎:GOOD: solid-liquid separation state is good (success rate ≥ 50%)
○:POSSIBLE: solid-liquid separation is possible (success rate < 50%)

| × | TUBE NAME | | | | | |
|---|---|---|---|---|---|---|
| | N | A | B | O | B1 | B2 |
| CARRIER NAME 1 | ◎ | ◎ | ◎ | ◎ | ◎ | ○ |
| 2 | — | — | — | — | ◎ | ◎ |
| 3 | — | — | — | — | ◎ | ◎ |
| 4 | — | — | — | — | ◎ | — |
| 5 | — | — | — | — | ◎ | — |
| 6 | — | — | — | — | ◎ | — |
| 7 | — | ◎ | — | — | ◎ | ○ |
| 8 | — | — | — | — | ○ | — |
| 9 | — | — | — | — | ○ | — |

SEQUENCE LISTING

<160> NUMBER OF SEQ ID NOS: 3

<210> SEQ ID NO 1
<211> LENGTH: 24
<212> TYPE: PRT
<213> ORGANISM: Artificial
<220> FEATURE:
<223> OTHER INFORMATION: a sequence of ACTH (1-24)

<400> SEQUENCE: 1

```
Ser Tyr Ser Met Glu His Phe Arg Trp Gly Lys Pro Val Gly Lys Lys
1               5                   10                  15

Arg Arg Pro Val Lys Val Tyr Pro
            20

<210> SEQ ID NO 2
<211> LENGTH: 40
<212> TYPE: PRT
<213> ORGANISM: Artificial Sequence
<220> FEATURE:
<223> OTHER INFORMATION: a sequence of CEA (132-171)

<400> SEQUENCE: 2

Glu Glu Ala Thr Gly Gln Phe Arg Val Tyr Pro Glu Leu Pro Lys Pro
1               5                   10                  15

Ser Ile Ser Ser Asn Asn Ser Lys Pro Val Glu Asp Lys Asp Ala Val
            20                  25                  30

Ala Phe Thr Cys Glu Pro Glu Thr
            35                  40

<210> SEQ ID NO 3
<211> LENGTH: 32
<212> TYPE: PRT
<213> ORGANISM: Artificial
<220> FEATURE:
<223> OTHER INFORMATION: a sequence of BNP

<400> SEQUENCE: 3

Ser Pro Lys Met Val Gln Gly Ser Gly Cys Phe Gly Arg Lys Met Asp
1               5                   10                  15

Arg Ile Ser Ser Ser Ser Gly Leu Gly Cys Lys Val Leu Arg Arg His
            20                  25                  30
```

SOLID-LIQUID SEPARATION METHOD, SOLID-LIQUID SEPARATION APPARATUS, AND KIT TO BE USED THEREFOR

CROSS REFERENCE TO RELATED APPLICATIONS

This application claims priority from prior Japanese Patent Application No. 2017-108765, filed on May 31, 2017, entitled "SOLID-LIQUID SEPARATION METHOD, SOLID-LIQUID SEPARATION APPARATUS, AND PIPETTE TIP, PARTICLE AND KIT TO BE USED THEREFOR", the entire content of which is incorporated herein by reference.

FIELD OF THE INVENTION

The present invention relates to a solid-liquid separation method, a solid-liquid separation apparatus, and a pipette tip, particles and a kit to be used therefor.

BACKGROUND

A method is known in which when a specific component in a sample is to be extracted, the specific component is filtrated by use of a filter, or a solid capable of having the specific component adsorbed thereon is added and then the solid and the liquid are separated from each other (BF separation). In general, BF separation is one of solid-liquid separation methods for separating a liquid and a solid from each other. Centrifugal sedimentation, separation by magnetic force, or the like is performed as a BF separation method.

However, when such a method is performed in an analyzer, complicated mechanisms and controls are required.

Thus, a dispensing nozzle (pipette tip) has been proposed in which a filter or a solid as an adsorbent is attached to the dispensing nozzle and a specific component is extracted during suction-ejection operation (for example, see Japanese Laid-Open Patent Publication No. 2013-47680 and Japanese Laid-Open Patent Publication No. 2003-254877).

In the cases of dispensing nozzles as disclosed in Japanese Laid-Open Patent Publication No. 2013-47680 and Japanese Laid-Open Patent Publication No. 2003-254877, detailed work needs to be performed to the inside of the nozzle, and thus, production steps are complicated, which leads to high production costs.

The present invention has been made in consideration of such circumstances. The present invention provides: a solid-liquid separation method and a solid-liquid separation apparatus which do not require a nozzle having a complicated structure such as a filter; and a kit to be used therefor.

SUMMARY OF THE INVENTION

The scope of the present invention is defined solely by the appended claims, and is not affected to any degree by the statements within this summary.

The present invention provides a solid-liquid separation method which includes: sucking a suspension containing particles, through an opening formed at a leading end of a suction nozzle, into the suction nozzle; allowing at least a part of the particles contained in the sucked suspension, to sediment to be clogged in the suction nozzle; and ejecting a liquid inside the suction nozzle, through the opening of the suction nozzle clogged with the particles.

From a still different point of view, the present invention provides a solid-liquid separation apparatus including: a suction unit to which a suction nozzle having an opening formed at a leading end thereof is attached; a controller programmed to control operation of the suction unit; and a container supporting body configured to support a container storing a liquid that contains particles, wherein the controller is programmed to perform control so as to suck at least a part of a suspension of the liquid containing the particles, through the opening into the suction nozzle, allow at least a part of the particles contained in the sucked suspension, to sediment to be clogged in the suction nozzle, and eject a liquid inside the suction nozzle, through the opening of the suction nozzle clogged with the particles.

In addition, the present invention provides a pipette tip as a suction nozzle that is used in the solid-liquid separation method described above and that does not have a filter in a vicinity of the leading end opening.

Further, the present invention provides particles that are used in the solid-liquid separation method described above.

Further, the present invention provides a solid-liquid separation kit including: a pipette tip as a suction nozzle that is used in the solid-liquid separation method described above and that does not have a filter in a vicinity of the leading end opening; and particles that are used in the solid-liquid separation method, wherein a minimum opening diameter of the pipette tip is greater than a maximum diameter of the particles and is smaller than six times the maximum diameter of the particles.

BRIEF DESCRIPTION OF THE DRAWINGS

FIG. 5B is a table showing particle size distributions of carriers No. 1 to No. 10 used in Examples;

FIG. 5D is a table showing combinations of a carrier and a tube with which the solid-liquid separation was successful in Examples;

DETAILED DESCRIPTION OF THE PREFERRED EMBODIMENTS

<<Solid-Liquid Separation Method>>

Figure 1:
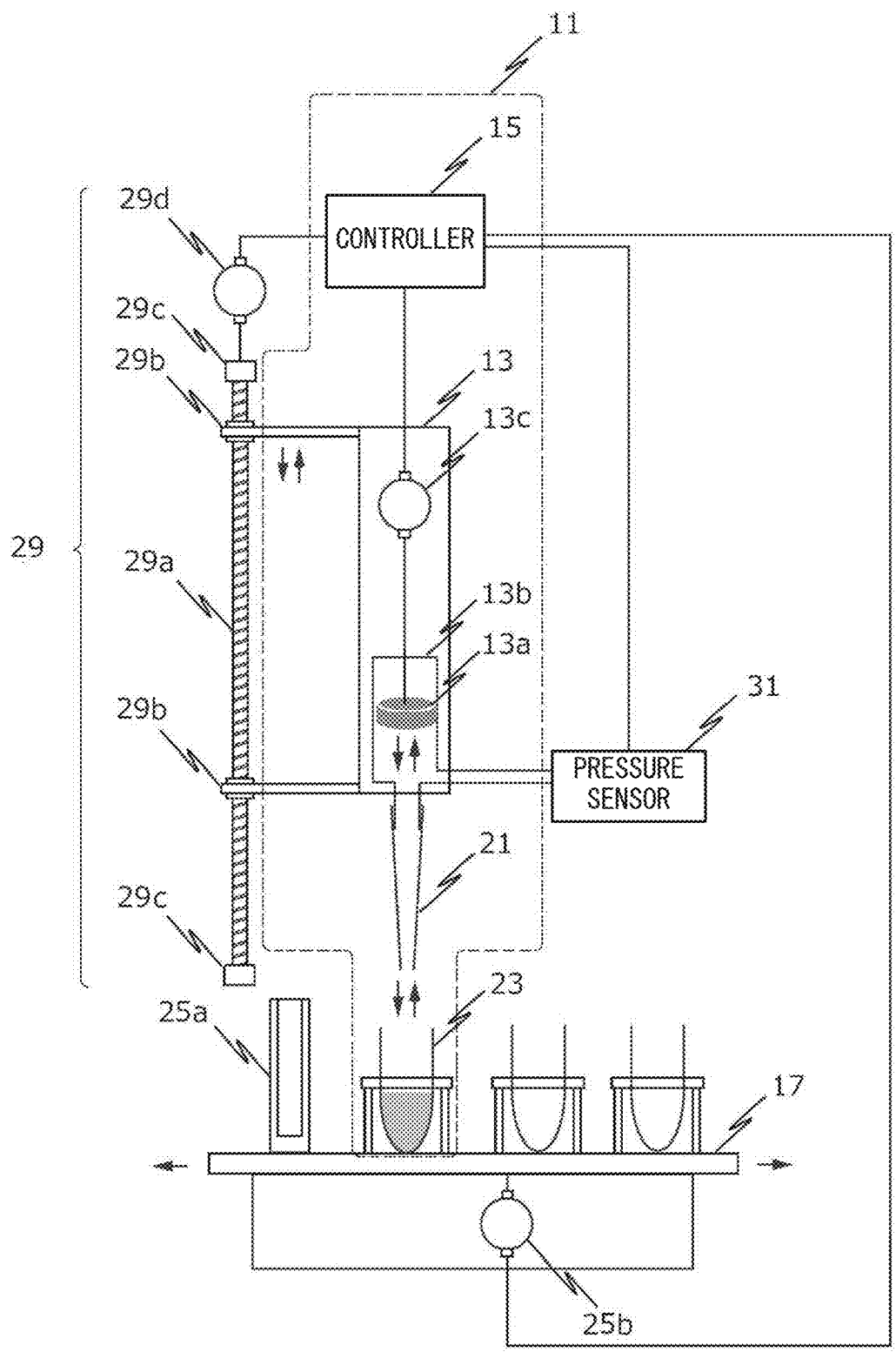
FIG. 1 shows one example of a solid-liquid separation apparatus of the present embodiment.

A solid-liquid separation method of the present embodiment includes a step of sucking a suspension containing particles, through an opening formed at the leading end of a suction nozzle, into the suction nozzle.

Preferably, the suction nozzle has an opening formed at the leading end thereof, and the inner diameter thereof is gradually reduced toward the leading end. The suction nozzle can be in a substantially tubular shape. The opening formed at the leading end of the suction nozzle is also referred to as leading end opening. The diameter of the leading end opening is referred to as opening diameter. The opening diameter corresponds to the inner diameter at the leading end of the suction nozzle the inner diameter of which is gradually reduced toward the leading end. Since the inner diameter is gradually reduced toward the leading end, it becomes possible to cause the particles to be clogged. As a result, the clogged particles are not ejected from the opening at the leading end of the suction nozzle, while the liquid which is the solvent of the suspension is ejected from the opening, whereby the solid-liquid separation is achieved. Here, "clogging" means a state in which: particles are concentrated on a place at the near side of the leading end opening, to get stuck due to other particles and the tube wall; and other particles cannot pass through the place. However, since molecules that are sufficiently smaller than the clogged particles can pass through the gap between particles or through the gap between particles and the tube wall, particles may be mixed in the ejected liquid. Herein, "clogging" of particles means a state that allows passage of liquid. The present inventors succeeded in separating particles and liquid from each other with high reproducibility by utilizing clogging of particles, without being required to attach a filter to a suction nozzle, in particular, to the leading end of a pipette tip.

Preferably, the minimum opening diameter of the suction nozzle is greater than the maximum diameter of the particles, and is smaller than six times the maximum diameter of the particles. The "minimum" opening diameter of the suction nozzle means the value of the opening diameter of the fixed suction nozzle in a case where the suction nozzle is fixed to a syringe. Meanwhile, in a case where the suction nozzle is a detachable nozzle, the "minimum" opening diameter of the suction nozzle means the opening diameter of the nozzle indicating the minimum value among the opening diameters of one or more suction nozzles used in a series of solid-liquid separations. The opening diameter of the suction nozzle can be measured in accordance with a known method.

The suction nozzle may be any suction nozzle that is designed so as to be able to suck and eject a liquid through the opening at the leading end thereof in accordance with change in pressure in the suction nozzle. The change in pressure may be caused, for example, by a plunger being moved in a syringe attached to the rear end of the suction nozzle. The suction nozzle may be fixed to the syringe, or may be a detachable suction nozzle. Examples of the suction nozzle include a suction tube which performs suction without a pipette tip attached thereto, a detachable nozzle such as a pipette tip, and the like. The suction nozzle is preferably a detachable pipette tip, more preferably, a detachable pipette tip that does not have a filter in the vicinity of the leading end opening thereof.

The opening diameter of the suction nozzle is preferably 0.70 to 2.4 mm, more preferably 0.80 to 1.6 mm.

The maximum volume of the suction nozzle is preferably 500 to 2000 µL, more preferably 1000 to 1500 µL.

A suspension means a liquid having macroscopically-observable particles dispersed therein. Here, macroscopically-observable particles means, in general, particles of which average particle diameter is on the order of 10 µm. Preferably, the suspension is a mixture of a sample liquid containing a target substance and particles for adsorbing the target substance.

The material of the particles is not limited in particular as long as the solid-liquid separation is not hindered. Examples of the material of the particles include: inorganic materials such as silica, alumina, and zirconia; organic materials such as polyethylene, polypropylene, and polystyrene; porous materials, and magnetic materials.

The shape of the particles is not limited in particular as long as the solid-liquid separation is not hindered. Examples of the shape of the particles include a ball shape, a substantial ball shape, a regular polyhedron, and a honeycomb structure where each opening has the shape of a regular polygon.

The particles may have surface modification by an aminosilyl group, an octadecylsilyl group (ODS), or the like, for example.

Since the solid-liquid separation of the present embodiment can be applied to BF separation, the particles are preferably those that are suitable for purification of a desired peptide or nucleic acid.

The particle diameter is not limited in particular as long as the solid-liquid separation is not hindered. However, preferably, the maximum diameter is smaller than the minimum opening diameter of the suction nozzle, and is greater than one sixth the minimum opening diameter. Specific numerical values of the particle diameter are preferably 70 to 700 µm, more preferably 100 to 700 µm. In the present embodiment, the particle diameter is measured according to a known laser diffraction scattering method.

The maximum diameter of the particles means the maximum value of the particle diameter.

The maximum diameter of the particles is not limited in particular as long as the solid-liquid separation is not hindered, and is preferably not smaller than 150 µm, more preferably not smaller than 250 µm.

$D_{90}$ of the particles is not limited in particular as long as the solid-liquid separation is not hindered. $D_{90}$ is a numerical value regarding the particle diameter. $D_{90}$ indicates the point at which the cumulative distribution of the particle diameters becomes 90%, that is, $D_{90}$ indicates the particle diameter at which, when powder is divided into two groups of a larger-particle-diameter group and a smaller-particle-diameter group on the basis of a certain particle diameter, the ratio of the larger-side portion to the smaller-side portion becomes 1:9. $D_{90}$ is preferably not smaller than 105 µm, more preferably not smaller than 110 µm.

$D_{10}$ of the particles is not limited in particular as long as the solid-liquid separation is not hindered. $D_{10}$ is a numerical value regarding the particle diameter. $D_{10}$ indicates a point at which the cumulative distribution of the particle diameters becomes 10%, that is, $D_{10}$ indicates the particle diameter at which, when powder is divided into two groups of a larger-particle-diameter group and a smaller-particle-diameter group on the basis of a certain particle diameter, the ratio of the larger-side portion to the smaller-side portion becomes 9:1. $D_{10}$ is preferably not smaller than 150 µm, more preferably not smaller than 170 µm.

$D_{90}-D_{10}$ of the particles is the difference between $D_{90}$ and $D_{10}$. $D_{90}-D_{10}$ is not limited in particular as long as the solid-liquid separation is not hindered. $D_{90}-D_{10}$ is preferably not smaller than 90 µm, more preferably not smaller than 120 µm.

$D_{50}$ of the particles is not limited in particular as long as the solid-liquid separation is not hindered. $D_{50}$ is a point at which the cumulative distribution becomes 50%, that is, $D_{50}$ indicates the particle diameter at which, when powder is divided into two groups of a larger-particle-diameter group and a smaller-particle-diameter group on the basis of a certain particle diameter, the larger-side portion and the smaller-side portion become equivalent. $D_{50}$ of the particles is preferably not smaller than 150 µm, more preferably not smaller than 170 µm.

The specific gravity of the particles is not limited in particular as long as the solid-liquid separation is not hindered. The specific gravity of the particles can be set as appropriate by a person skilled in the art in consideration of the specific gravity of the liquid serving as the solvent. The specific gravity of the particles is preferably greater than the specific gravity of the liquid serving as the solvent.

In the present embodiment, a suction nozzle having a minimum opening diameter of 0.80 mm is used. In the present embodiment, the particles preferably have $D_{90}-D_{10}$ being not smaller than 120 µm. In the present embodiment, the particles preferably have $D_{50}$ being not smaller than 170 µm.

The liquid serving as the solvent of the suspension is not limited in particular as long as the particles can be dispersed, and the liquid that does not cause dissociation of the target substance is preferable. Examples of the liquid include water, phosphate buffer (PBS), and the like. Preferably, the liquid can pass through the suction nozzle clogged with the particles, in association with the ejection. The liquid may contain a target substance, preferably, a desired peptide or nucleic acid of which purification is desired. Such a liquid may contain a peptide and/or a nucleic acid and a salt other than the desired peptide or nucleic acid. Further, the liquid may contain a surfactant by preferably not higher than 20% and more preferably not higher than 8%, within a range that does not hinder the solid-liquid separation. Such a liquid is preferably whole blood, serum, or plasma; and more preferably, a supernatant obtained by heating whole blood, serum, or plasma, preferably by use of a microwave oven, more preferably by use of a microwave oven at 150 to 180° C. Such a supernatant may be further desalted to be a desalted liquid.

The kind of the liquid serving as the solvent of the suspension is not limited in particular as long as the solid-liquid separation is not hindered. The specific gravity of the liquid is not limited in particular as long as the solid-liquid separation is not hindered, and can be set as appropriate by a person skilled in the art in consideration of the specific gravity of the particles. Preferably, the specific gravity of the liquid is smaller than the specific gravity of the particles. The viscosity of the liquid is not limited in particular as long as the solid-liquid separation is not hindered.

The particles may be used in combination with a supporting body. Here, the supporting body means, in terms of relationship with the suction nozzle to be used, a substance that can cause clogging of particles that do not get clogged by themselves in the suction nozzle, and in particular, a particulate substance that exhibits such a characteristic. The material and various physical properties of the supporting body are similar to those in the description above regarding the particles. Use of such a supporting body is especially advantageous in a case where, in terms of relationship with the suction nozzle to be used, particles that do not get clogged by themselves in the suction nozzle are used to perform the solid-liquid separation of the present embodiment. Preferably, such a supporting body is a substance having a greater specific gravity than the particles, or a substance that forms a firm lump with the particles. A person skilled in the art can select as appropriate a supporting body that is suitable for the particles to be used.

Figure 5A:
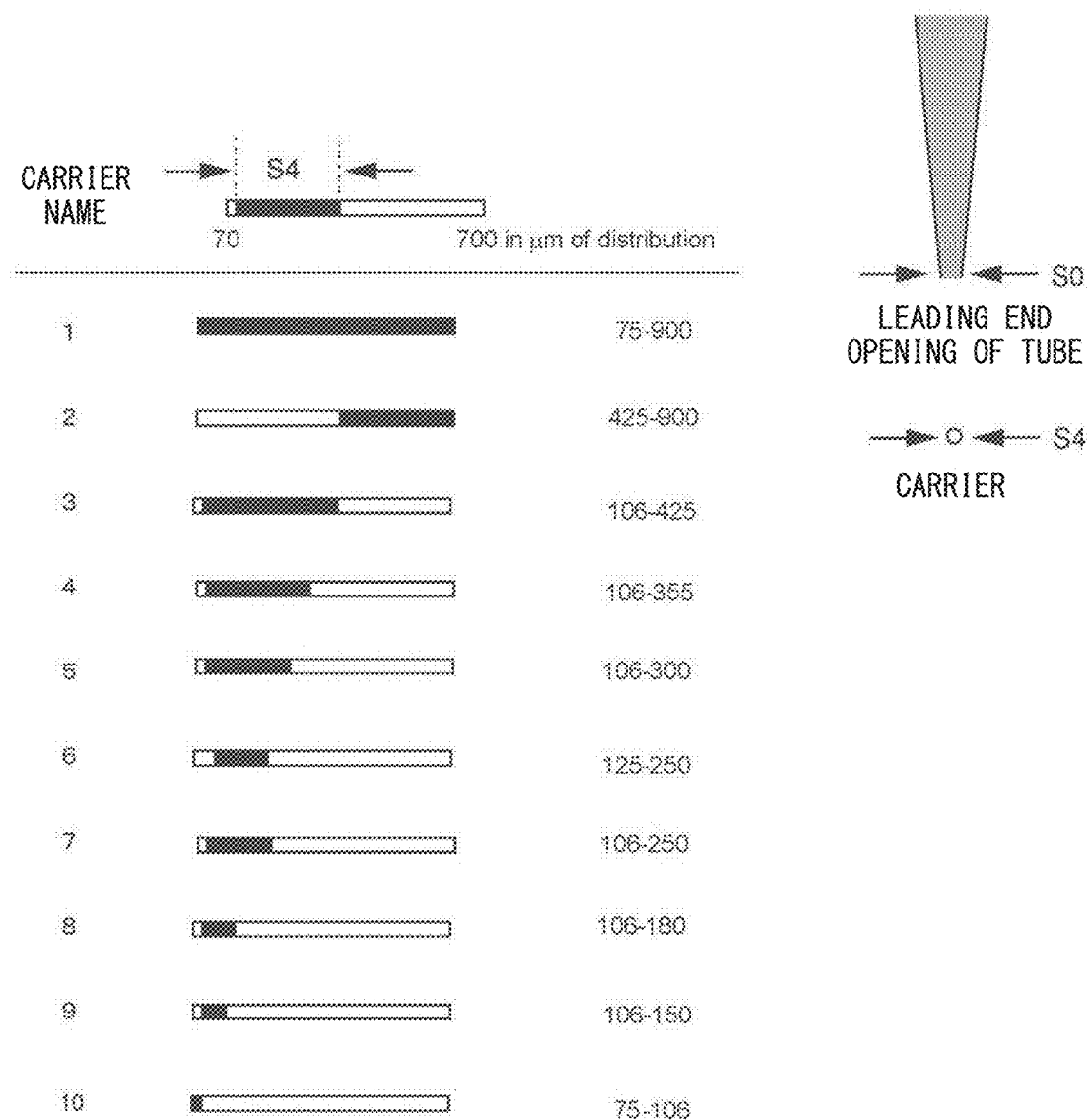
FIG. 5A shows the aperture sizes of sieves used in preparation of carriers used in Examples.
Figure 5C:
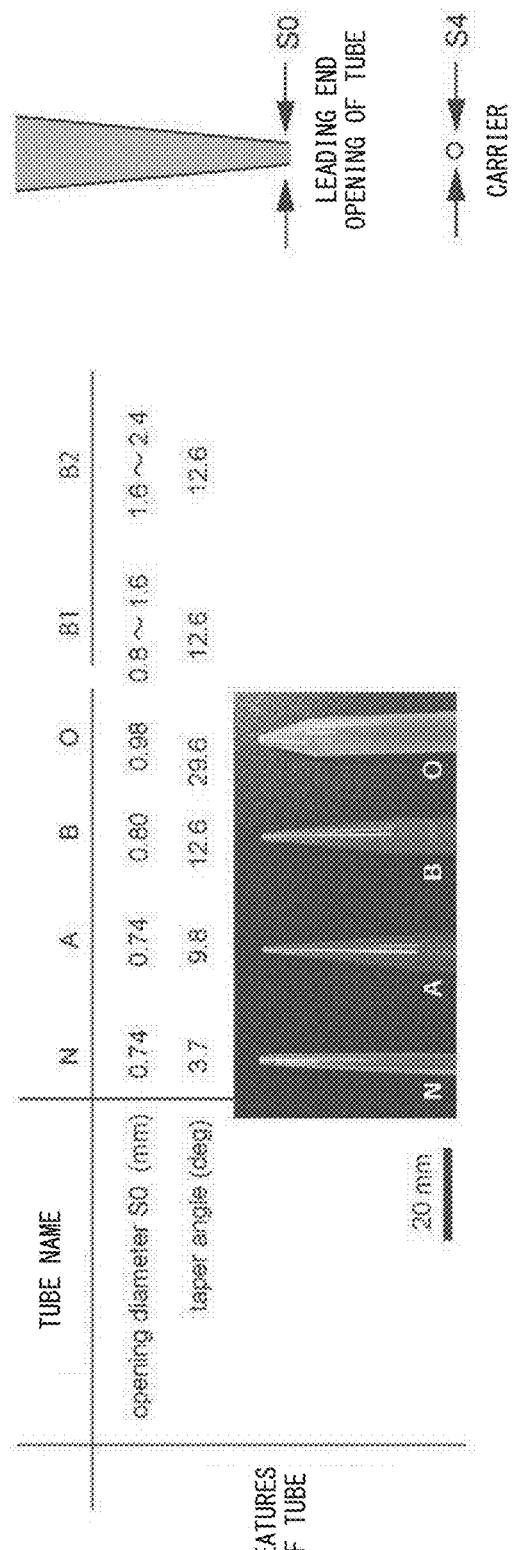
FIG. 5C shows the features of the carriers and tubes used in Examples.

In Example 12 described later, when a tube B shown in FIG. 5C is used as the suction nozzle and carrier No. 10 shown in FIG. 5C is used as the particles, carrier No. 2 is used as the supporting body. In the present embodiment, carrier No. 10 by itself cannot get clogged in the tube B and thus is ejected together with the liquid, and therefore, the solid-liquid separation cannot be achieved. However, if carrier No. 10 is used in combination with carrier 2 as the supporting body, carrier No. 2 gets clogged in the tube B or carrier No. 10 together with carrier No. 2 get clogged in the tube B, and thus, the carrier stays in the suction nozzle during the liquid ejection, whereby the solid-liquid separation can be achieved.

The concentration of the particles in the suspension is not limited in particular as long as the solid-liquid separation is not hindered, and is preferably 5 to 100 mg/mL. The temperature of the suspension is not limited in particular as long as the solid-liquid separation is not hindered, and is preferably 0.5 to 100° C. and more preferably 20 to 98° C.

Suction of the suspension is performed, for example, by immersing the leading end of the suction nozzle in the suspension and causing the air pressure in the suction nozzle to be a negative pressure relative to the external air pressure. For example, when the control of the air pressure in the suction nozzle is performed by controlling the position of a plunger in a state where a syringe including the plunger is connected to the rear end of the suction nozzle, suction of the suspension is performed by moving the plunger to increase the volume inside the syringe including the suction nozzle.

The step of sucking the suspension may include preparing a suspension by repeating suction and ejection of a mixed liquid of the particles and the solvent into and out of the suction nozzle to agitate the mixed liquid of the particles and the solvent. The suction and the ejection are performed in the following manner, for example: immersing the leading end of the suction nozzle into the mixed liquid; causing the air pressure in the suction nozzle to be a negative pressure relative to the external air pressure, thereby sucking the mixed liquid; then causing the air pressure in the suction nozzle to be a positive pressure relative to the external air pressure, thereby ejecting the mixed liquid. Such suction and ejection may be repeated a plurality of times. The control of the air pressure in the suction nozzle may be performed by controlling the position of the plunger in a state where the syringe including the plunger is connected to the rear end of the suction nozzle. The speed of suction/ejection of the suspension in this case is not limited in particular, but preferably, the suction/ejection is repeated at a constant speed. Preferably, the speed of suction/ejection mentioned above is faster than the speed of ejection of the liquid. The number of times of the suction and the ejection in this case is also not limited in particular. Further, the suction and the ejection in this case may be performed by use of one or more suction nozzles.

As another method, the agitation may be performed by agitating the mixed liquid of the particles and the solvent by a vortex or the like or by use of an agitator. Alternatively, the agitation and the suction may be performed by: connecting a first tube (suction tube) to be used only for suction and a second tube to be used only for discharge, via a tube, a catheter, or the like; and then, immersing the first tube and the second tube in the mixed liquid of the particles and the solvent, to cause a reflux.

The solid-liquid separation method of the present embodiment includes a step of allowing at least a part of the particles contained in the sucked suspension to sediment to be clogged. It is considered that due to the sedimentation, a lump (plug) of the particles is formed in the suction nozzle, whereby the particles are clogged. It is considered that the particles are clogged during sedimentation of the particles, after the sedimentation, before ejection of the liquid described later, or during ejection of the liquid.

Sedimentation means a phenomenon in which force, such as gravity or centrifugal separation action, that acts in a constant direction on the particles overcomes diffusion action of the particles due to Brownian motion, whereby the particles are concentrated on a certain place and the dispersion becomes ununiform. Judgement as to whether the dispersion of the particles is ununiform may be performed by observing decrease in the particle concentration from the leading end opening toward the farthest portion, or may be performed by observing difference in the particle concentration between the vicinity of the leading end opening and the farthest portion from the leading end opening. Alternatively, the judgement may be performed by observing the boundary between the particles and the liquid becoming clear. Such observation may be performed visually. Preferably, the sedimentation is realized by leaving the suspension for a sufficient time period that allows occurrence of difference in the particle concentration due to sedimentation between: the vicinity of the leading end opening in the suspension in which the particles sucked in the suction nozzle are substantially uniformly dispersed; and the farthest portion from the leading end opening in the suspension. A person skilled in the art can set as appropriate a leaving time period necessary for causing such a difference in the particle concentration. The farthest portion means the portion, of the liquid sucked in the suction nozzle, in the vicinity of the interface between the liquid phase and the gas phase at the opposite side to the leading end opening.

The sedimentation of the particles is realized by keeping the air pressure in the suction nozzle constant, for example. During this time, the suspension is left or made to rest with neither pressurization nor depressurization being performed on the suspension, and the particles in the suspension are acted upon by gravity or the like and sediment. In a case where control of the air pressure in the suction nozzle is performed by controlling the position of a plunger in a state where a syringe including the plunger is connected to the rear end of the suction nozzle, sedimentation of the particle is realized by causing the plunger to rest and keep the same position.

The solid-liquid separation method of the present embodiment includes a step of ejecting the liquid inside the suction nozzle, through the opening of the suction nozzle clogged with the particles.

Preferably, the ejection of the liquid is performed after a difference in the particle concentration due to sedimentation has occurred between: the vicinity of the leading end opening in the suspension in which the particles sucked in the suction nozzle are substantially uniformly dispersed; and the farthest portion from the leading end opening in the suspension. In the solid-liquid separation of the present embodiment, due to the sedimentation or in association with ejection of the liquid, the particles get clogged in the suction nozzle and stay therein, while the liquid passes through the particles clogged in the suction nozzle, to be ejected. Accordingly, the solid-liquid separation of the present embodiment can be realized. Preferably, the ejection of the liquid is performed such that the particles having the target substance adsorbed thereon are left at the near side of the opening. The near side of the opening corresponds to the direction from the farthest portion from the leading end opening, toward the leading end opening.

The ejection of the liquid is performed by, for example, causing the air pressure in the suction nozzle to be a positive pressure relative to the external air pressure. When the control of the air pressure in the suction nozzle is performed by controlling the position of a plunger in a state where a syringe including the plunger is connected to the rear end of the suction nozzle, the ejection of the liquid is performed by: moving the plunger to decrease the volume inside the syringe including the suction nozzle, and then causing the plunger to rest and keep the same position. Preferably, the speed of the ejection of the liquid is slower than the speed of suction/ejection.

From another point of view, the solid-liquid separation method of the present embodiment can be used for BF separation.

More specifically, after the liquid is ejected, an elution liquid for eluting the target substance from the particles having the target substance adsorbed thereon is sucked into the suction nozzle, at least a part of the particles mixed with the sucked elution liquid is allowed to sediment to the near side of the opening, the elution liquid and the eluted target substance are ejected through the leading end opening, and the obtained liquid is further purified as necessary. In this manner, the solid-liquid separation method of the present embodiment can be used as a BF separation method.

The elution liquid is not limited in particular as long as the elution liquid can elute the target substance from the particles having the target substance adsorbed thereon. Examples of such an elution liquid include: organic solvents such as acetonitrile and hexane; or aqueous solutions such as a buffered saline solution and a ligand sample; or a mixture of water that contains methanol, water that contains trifluoroacetic acid, and the like; or an ionic liquid and the like.

The suction nozzle according to the present disclosure can be in a substantially tubular shape. That the inner diameter is gradually reduced toward the leading end means that the inner diameter at one end (leading end) of the suction nozzle is smaller than the inner diameter at the other end (connector end), and that at least in the vicinity of the one end, the inner diameter of the cross section of the nozzle becomes smaller toward the leading end.

A suction unit of a solid-liquid separation apparatus according to the present disclosure sucks from the outside and ejects to the outside a liquid containing the particles in the suction nozzle, in accordance with change in pressure in the suction nozzle.

A controller allows, after the suction of the suspension, at least a part of the particles contained in the sucked suspension, to sediment to be clogged in the suction nozzle. However, the sedimentation of at least a part of the particles means sedimentation that causes the suction nozzle to be clogged when the suction nozzle ejects the liquid.

Here, at least the ejection is performed through the opening (leading end opening) formed at the leading end of the suction nozzle. The suction unit acts as a pump for sending a liquid from the outside to the inside of the attached suction nozzle, and from the inside to the outside of the suction nozzle. A typical structure of the suction unit is a plunger-type pump that performs suction and ejection by reciprocating a plunger, but is not limited thereto. For example, various types of pumps such as a diaphragm type, a gear type, and the like are applicable.

The controller controls the suction unit, thereby controlling suction and ejection of the liquid containing the particles into and out of the suction nozzle. The functions of the controller may be realized by, for example, a CPU or a microcomputer (hereinafter, these are collectively referred to as a computer) executing software for control. However, the configuration is not limited thereto. For example, as a configuration not using a computer, i.e., not through software processing, a mode of realizing the function of the controller by combining hardware circuits is conceivable.

Some preferable modes in the above-described solid-liquid separation apparatus are described.

The controller may control the suction unit in the following manner. That is, in a resting period determined in advance on the basis of a period after the suction of the suspension until a difference in particle concentration due to sedimentation occurs between: a vicinity of the leading end opening in the suspension having the particles substantially uniformly dispersed in the suction nozzle; and a farthest portion from the leading end opening in the suspension, the suction unit stops the suction of the suspension to allow at least a part of the particles to sediment. Further, after a lapse of the resting period, the suction unit ejects the liquid inside the suction nozzle through the opening of the suction nozzle clogged with the particles.

As described above, if the resting period is determined in advance by measuring in advance the period after the suction of the suspension into the suction nozzle until a difference in the particle concentration due to sedimentation occurs between the vicinity of the leading end opening of the suction nozzle and the farthest portion from the leading end opening, the solid-liquid separation thereafter can be realized by starting ejection after a lapse of the resting period after the suction has ended. That is, since the particles sediment during the resting period, the liquid in the suction nozzle can be ejected in a state where the particles are clogged in the suction nozzle, whereby the solid-liquid separation becomes possible.

The container may store a sample liquid containing a target substance, and particles for adsorbing the target substance thereon. The controller may cause the liquid inside the suction nozzle to be ejected, thereby causing the particles having the target substance adsorbed thereon, to remain in the suction nozzle.

Further, the suction unit may include: a syringe including a plunger; and an actuator configured to move the plunger, and the controller may control the actuator to move the plunger so as to increase a volume inside the syringe including the suction nozzle, thereby performing the suction of the suspension, cause the plunger to rest and keep a same position in the resting period, move, after a lapse of the resting period, the plunger so as to decrease the volume inside the syringe including the suction nozzle, and then, cause the plunger to rest.

With this configuration, by controlling movement and rest of the plunger, it is possible to cause the suspension to be sucked, allow the particles to sediment in the suction nozzle, and eject the liquid inside the suction nozzle, thereby causing the particles to remain in the suction nozzle.

The controller may cause the liquid inside the suction nozzle to be ejected by causing the plunger to move at a speed slower than a moving speed of the plunger sucking the suspension.

With this configuration, it is possible to cause, during suction, the plunger to move at a speed that causes the agitated particles to be dispersed in the suspension, and to cause, during ejection, the plunger to move at a speed that does not cause the sedimented particles to be agitated. The speed here does not include a direction and means the magnitude of change in position per unit time.

The suction nozzle may be attachable to and detachable from the suction unit.

Further, a nozzle transporting mechanism configured to transport the suction nozzle to a position where the suction nozzle is to be attached to the suction unit; and a raising-lowering mechanism configured to lower the leading end of the suction nozzle attached to the suction unit, toward the suspension in the container supported by the container supporting body may be provided.

These preferable modes can be combined as appropriate.

Hereinafter, the present disclosure is further described with reference to the drawings. The following description is merely illustrative in all aspects, and should not be considered as restricting the present disclosure.

<<Configuration of Solid-Liquid Separation Apparatus>>

FIG. 1 is an explanatory drawing showing the outline of the configuration of a solid-liquid separation apparatus in the present embodiment. As shown in FIG. 1, a solid-liquid separation apparatus 11 includes a suction unit 13, a controller 15, and a container supporting body 17, which are essential components of the solid-liquid separation apparatus 11. In FIG. 1, the components necessary for solid-liquid separation performed in the solid-liquid separation apparatus 11 are shown in a chain-line frame.

In the present embodiment, the suction unit 13 includes: a plunger 13a; and a syringe 13b to which a suction nozzle 21 (pipette tip) is attached at the lower end thereof.

A plunger drive motor 13c is a drive source which causes the plunger 13a to move in the syringe 13b.

The controller 15 is hardware circuitry including a computer, a memory, an input/output circuit, and the like. By the computer executing a control program (software) stored in advance in the memory, control of the plunger drive motor 13c is realized.

The container supporting body 17 supports a container 23 storing a liquid that contains particles, and determines the position of the container 23. The container 23 is supported in a replaceable manner by the container supporting body 17. When the liquid and the particles stored in the container 23 are agitated, a suspension is made. However, the specific gravities of the particles and the liquid are different, and thus, when the suspension is left to stand still, the particles gradually sediment.

A downwardly protruding connector is formed at the lower end of the syringe 13b, and a suction/ejection hole is open at the lower end of the connector. The suction nozzle 21 is in a tubular shape. At one end side of the suction nozzle 21, the inner diameter is gradually reduced toward the leading end thereof, and an opening is formed at the leading end. The other end side of the suction nozzle 21 is formed in a shape that allows the suction nozzle 21 to be attached to and detached from the connector of the syringe 13b. When the other end of the suction nozzle 21 is attached to the syringe 13b, the syringe 13b and the suction nozzle 21 are joined to each other in an air-tight and liquid-tight manner. It should be noted that the suction nozzle 21 is in a simple tubular shape. That is, the suction nozzle 21 does not have a component such as a filter for filtrating particles. When solid-liquid separation is performed, the suction nozzle 21 is attached to the syringe 13b and used. After the solid-liquid separation ends, the suction nozzle 21 that has been used may be detached from the solid-liquid separation apparatus 11, and another suction nozzle may be attached to the syringe 13b in the next solid-liquid separation process. That is, the suction nozzle 21 is disposable or replaceable. Specifically, the suction nozzle 21 may be a disposable pipette tip represented by a so-called pipette that is used for suction and discharge of a solvent. The suction nozzle 21 attached to the connector of the syringe 13b can be detached therefrom.

Preferably, the solid-liquid separation apparatus 11 further includes a raising-lowering mechanism 29 for immersing the lower end of the suction nozzle 21 into a liquid stored in a container 23. The raising-lowering mechanism 29 is composed of a screw shaft 29a, screw nuts 29b, shaft bearings 29c, and a shaft drive motor 29d. The screw shaft 29a is disposed in the vertical direction, and is driven by the shaft drive motor 29d so as to be able to rotate forwardly and reversely. When the screw shaft 29a rotates, the fitted screw nuts 29b are raised or lowered. Together with the screw nuts 29b, the syringe 13b and the suction nozzle 21 are raised or lowered. The shaft drive motor 29d is controlled by the controller 15.

Preferably, the solid-liquid separation apparatus 11 further includes a nozzle stand 25a and a table drive motor 25b. The nozzle stand 25a holds a suction nozzle 21 that is to be attached to the syringe 13b. The container supporting body 17 moves with the nozzle stand 25a and the container 23 placed thereon. The table drive motor 25b causes the container supporting body 17 to move. The controller 15 controls the table drive motor 25b. The nozzle stand 25a and the table drive motor 25b cause the suction nozzle 21 held in the nozzle stand 25a to move to a position where the suction nozzle 21 is to be attached to the suction unit 13, i.e., immediately below the connector at the lower end of the syringe 13b.

The nozzle stand 25a and the table drive motor 25b form a nozzle transporting mechanism which transports the suction nozzle 21 to a position where the suction nozzle 21 is to be attached to the suction unit 13.

When the suction nozzle 21 is to be attached to the syringe 13b, the controller 15 controls the table drive motor 25b such that the suction nozzle 21, with the other end thereof directed upward, held in the nozzle stand 25a is located immediately below the connector of the syringe 13b. Then, the controller 15 controls the shaft drive motor 29d, so as to lower the syringe 13b to a position where the connector at the lower end of the syringe 13b is inserted into the other end of the suction nozzle 21. Through these operations, the suction nozzle 21 is attached to the syringe 13b.

The solid-liquid separation apparatus 11 may include a pressure sensor 31. The pressure sensor 31 detects (measures) the pressure in the syringe 13b. The signal detected by the pressure sensor 31 is inputted to the controller 15.

The controller 15 controls movement of the plunger 13a, thereby controlling suction and discharge of the liquid containing the particles and stored in the container 23.

According to a preferable configuration, the controller 15 controls movement of the container supporting body 17 having the nozzle stand 25a and containers 23 placed thereon. Accordingly, it becomes possible to attach the suction nozzle 21 to the syringe 13b. In addition, it becomes possible to dispense the liquid containing the particles and stored in a container 23, into another container placed on the container supporting body 17.

According to a preferable configuration, the controller 15 may control the movement, the stopping, the operation period, and the like of the plunger 13a, on the basis of an internal pressure P of the syringe 13b detected by the pressure sensor 31. Alternatively, change in the syringe internal pressure P associated with a lapse of time (Pt curve) may be displayed on, for example, a display apparatus not shown in FIG. 1.

<<Control of Plunger>>

Next, control of the plunger 13a performed by the controller 15 is described.

Figure 2A:
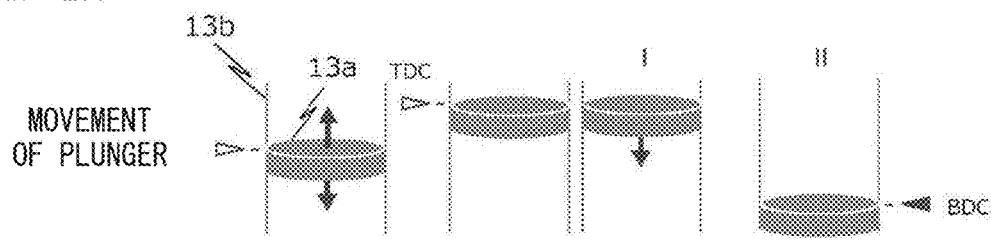
FIG. 2A shows the movement of a plunger of the solid-liquid separation apparatus of the present embodiment.
Figure 2B:
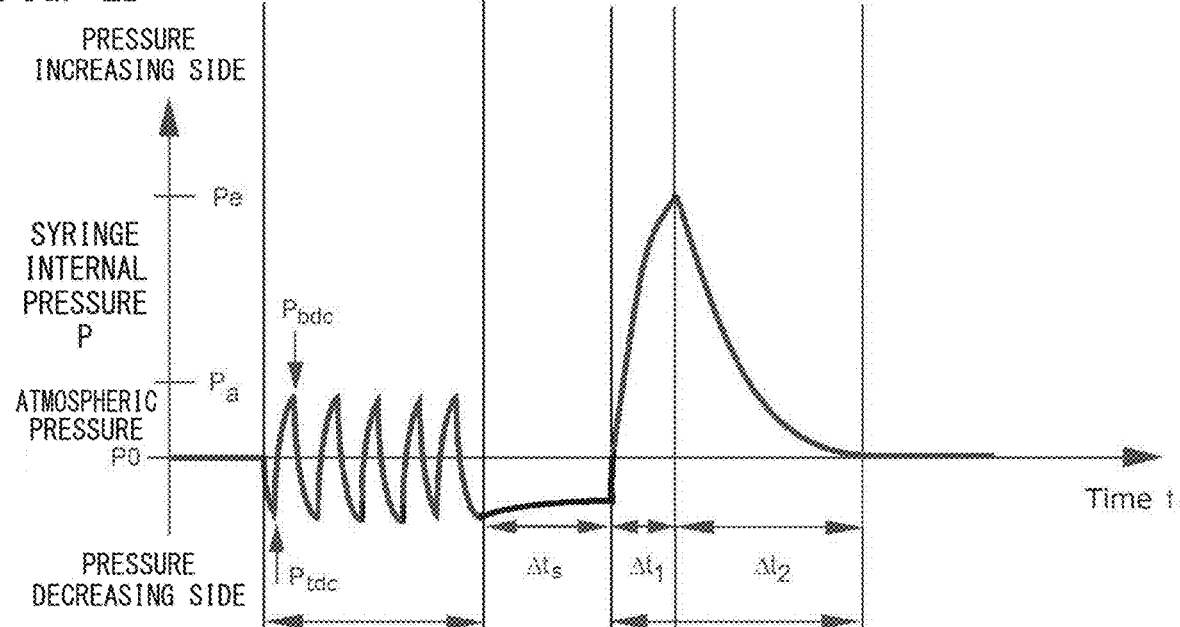
FIG. 2B shows a Pt curve indicating the syringe internal pressure.
Figure 2C:
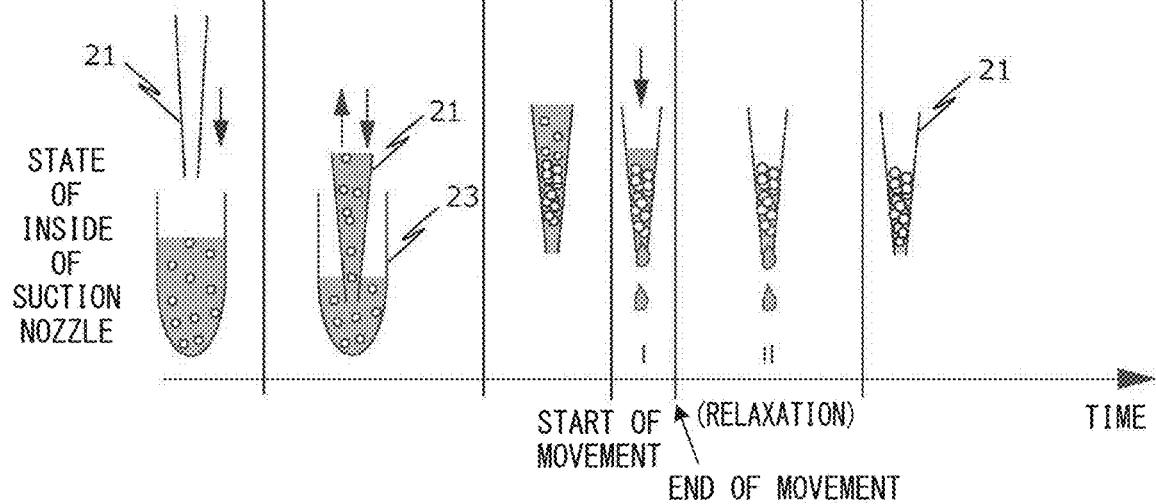
FIG. 2C shows the state of solid-liquid separation.

FIG. 2A to FIG. 2C are explanatory drawings showing how the controller 15 causes the plunger 13a to move for solid-liquid separation. FIG. 2A shows movement of the plunger 13a in the syringe 13b, FIG. 2B shows an example of change in the syringe internal pressure P, and FIG. 2C shows an example of the state of the particles and the liquid in the suction nozzle 21. The waveform shown in FIG. 2B corresponds to the Pt curve observed when the solid-liquid separation apparatus 11 includes the pressure sensor 31.

In FIG. 2A, "TDC" indicates the upper end position (top dead center) up to which the plunger 13a can move, and "BDC" indicates the lower end position (bottom dead center) down to which the plunger 13a can move.

First, the controller 15 causes the plunger 13a to stop at an intermediate position between the top dead center and the bottom dead center of the syringe 13b. However, this is merely an example, and the controller 15 may cause the plunger 13a to stop at a position other than the intermediate position.

In this state, the leading end of the suction nozzle 21 is immersed in the liquid containing the particles and stored in the container 23. In a preferable configuration, the raising-lowering mechanism 29 immerses the leading end of the suction nozzle 21 into the liquid on the basis of the control by the controller 15. However, in a case where the solid-liquid separation apparatus 11 does not include the raising-lowering mechanism 29, a user manually changes the position of the suction nozzle 21 or the container 23. The raising-lowering mechanism 29 may immerse the suction nozzle 21 by lowering the suction nozzle 21, but instead or in addition, the raising-lowering mechanism 29 may immerse the suction nozzle 21 by raising the container 23.

<Agitation and Suction>

Thereafter, the controller 15 causes the plunger 13a to move in the direction along which the syringe internal pressure P becomes a negative pressure, i.e., toward the top dead center. Associated with the movement, the particles and the liquid stored in the container 23 are sucked into the suction nozzle 21.

Further, the controller 15 causes the plunger 13a to reciprocate between the top dead center and the bottom dead center. In the following, movement of the plunger 13a from the top dead center toward the bottom dead center is also referred to as advance, and movement of the plunger 13a from the bottom dead center toward the top dead center is also referred to as retreat. In the example shown in FIG. 2, the plunger 13a is caused to reciprocate five times, and then, to stop at the top dead center.

In FIG. 2B, each local minimum value of the syringe internal pressure P at the time when the plunger 13a reaches the top dead center is indicated by $P_{tdc}$, and each local maximum value of the syringe internal pressure P at the time when the plunger 13a reaches the bottom dead center is indicated by $P_{bdc}$.

Due to the reciprocating movement of the plunger 13a, the liquid containing the particles is reciprocated between the suction nozzle 21 and the container 23, to be agitated. Even if the particles have settled in the container 23 before the agitation, the agitating operation in the form of reciprocation of the plunger 13a causes the particles and the liquid to be mixed with each other to form a suspension. In FIG. 2B, the period of the agitating operation is indicated by $\Delta t_a$. The average of the local maximum values $P_{bdc}$ of the internal pressure during the agitating operation is indicated by $P_a$. At the end of the agitating operation, the controller 15 has caused the plunger 13a to be located at the top dead center, and the suspension has been sucked in the suction nozzle 21 (see FIG. 2C).

In the present embodiment, the controller 15 causes the plunger 13a to perform reciprocating movement at a cycle determined in advance and at a speed determined in advance, so as to perform the agitating operation. In the reciprocating movement, the moving speed of the plunger 13a toward the top dead center, i.e., the speed during suction, is defined as $R_{suction}$. The moving speed of the plunger 13a corresponds to the speed of change in the volume of the syringe. Also in a mode in which a pump other than a plunger-type pump is used as the suction unit, a similar operation can be performed, with the change in the volume of a chamber communicating the inside of the suction nozzle 21 considered as the speed during suction. In the Examples, as to the advance and the retreat (suction) of the plunger 13a during agitation, the directions of the movements are opposite to each other, but the speeds of the movements are equal to each other. This speed is defined as $R_{agit}$. The plunger 13a stops at the top dead center in the last stage in the agitation step, and suction is performed. Thus, $R_{suction} = R_{agit}$.

<Resting>

After the agitating operation, the controller 15 causes the plunger 13a at the top dead center to rest (see the figure that corresponds to the period $\Delta t_s$, in FIG. 2A). The resting is performed for a predetermined period ($\Delta t_s$ shown in FIG. 2B). It should be noted that, after the end of the agitation, by raising the leading end of the suction nozzle 21 or lowering the container 23, the leading end of the suction nozzle 21 may be caused to be above the liquid surface of the suspension stored in the container 23. However, without raising the suction nozzle 21 above the liquid surface here, solid-liquid separation can be performed. In a preferable configuration, the raising-lowering mechanism 29 can raise the leading end of the suction nozzle 21 above the liquid surface of the container 23 on the basis of control by the controller 15. In a configuration where the solid-liquid separation apparatus 11 does not include the raising-lowering mechanism 29, the user may manually change the position of the suction nozzle 21 or the container 23.

Even when the leading end of the suction nozzle 21 is located above the liquid surface of the container 23, most of the suspension in the suction nozzle 21 does not drop from the opening at the lower end, because the syringe internal pressure P is a negative pressure relative to the atmospheric pressure, and also because of the action of surface tension.

Meanwhile, also when the leading end of the suction nozzle 21 is located below the liquid surface of the container 23, the syringe internal pressure P is a negative pressure relative to the atmospheric pressure, and thus, the suspension in the suction nozzle 21 does not flow out into the container 23.

During the resting period indicated by $\Delta t_s$ in FIG. 2B, the suspension stays in the suction nozzle 21, and the particles in the suspension begin to sediment toward a lower end portion. As a result, between the lower end portion and an upper end portion of the suspension, a difference in the particle concentration, i.e., a difference in turbidity, gradually occurs.

The resting period $\Delta t_s$ is determined as a period in which the particles in the suspension substantially uniformly dispersed in the suction nozzle 21 sediment to at least cause a difference in the particle concentration between a lower end portion and an upper end portion of the suspension. The resting period $\Delta t_s$ is determined in advance on the basis of an experiment, for example. In the experiment, a suction nozzle 21 of the same type as that used in the solid-liquid separation is caused to suck the same particles and solution as those used in the solid-liquid separation, the plunger 13a is then caused to rest, the particles in the suspension are allowed to sediment in a lower end portion in the suction nozzle 21, and occurrence of a difference in the particle concentration between a lower end portion and an upper end portion is visually observed or detected by use of a sensor such as a photo sensor or a camera.

As described later, the solid-liquid separation according to the present embodiment is good in phenomenon reproducibility. Thus, if a suction nozzle 21, particles, and a liquid are determined and an appropriate resting period $\Delta t_s$ is set through an experiment in advance, stable solid-liquid separation can be realized.

In a different mode, the solid-liquid separation apparatus 11 may include a sensor such as a photo sensor or a camera, and the controller 15 may set a resting period $\Delta t_s$ as appropriate on the basis of detection performed by such a sensor. That is, the plunger 13a may be controlled so as to rest at the top dead center until a difference in the particle concentration between a lower end portion and an upper end portion in the suction nozzle 21 is detected.

<Ejection>

After a lapse of the resting period $\Delta t_s$ the controller 15 causes the plunger 13a to move to the bottom dead center in a period $\Delta t_1$ which is determined in advance (see "I" in FIG. 2A). The moving speed of the plunger 13a at that time is defined as $R_{eject}$. Preferably, the controller 15 causes the plunger 13a to move at a slower speed than that during the suction. That is, the movement of the plunger 13a is controlled such that the relationship of $R_{eject} < R_{suction}$ is established.

Associated with the movement of the plunger 13a, the syringe internal pressure P increases. In order to alleviate the increase in the syringe internal pressure P, the liquid is ejected through the leading end opening from the inside of the suction nozzle 21 (see FIG. 2C). The portion above the suspension in the syringe 13b is filled with air. When the plunger 13a moves toward the bottom dead center, the air is compressed, whereby the syringe internal pressure P increases. Due to the increase in the syringe internal pressure P, the liquid in the suction nozzle 21 is ejected from the leading end opening of the suction nozzle 21 to the container 23 located below. Since the inner diameter of the suction nozzle 21 is gradually reduced toward the leading end thereof, the particles that have sedimented and the particles that have not sedimented are concentrated, along the flow toward the leading end opening, to the near side of the leading end opening. Then, a lump (hereinafter, also referred to as a plug) of the particles is generated in the suction nozzle, whereby the suction nozzle is clogged with the particles. However, the liquid passes through the space between the particles or the space between the tube wall and the particles, to be ejected from the leading end opening into the container 23. Since the plug causes a resistance against the flow of the liquid, the syringe internal pressure P increases more than in the agitating operation, in accordance with the movement of the plunger 13a toward the bottom dead center (see the period $\Delta t_1$ shown in FIG. 2B). The local maximum value of the syringe internal pressure P at the time when the plunger 13a has reached the bottom dead center is indicated by Pe in FIG. 2B.

After the period $\Delta t_1$, the controller 15 causes the plunger 13a to stop at the bottom dead center (indicated by II in FIG. 2A). In FIG. 2B, a stop period is indicated by $\Delta t_2$. The period $\Delta t_2$ is determined as a period from when the liquid has been sufficiently ejected from the suction nozzle 21 to when the solid-liquid separation ends.

The period $\Delta t_1$, the speed $R_{eject}$, and the period $\Delta t_2$ are determined in advance on the basis of an experiment, for example. In the experiment, the suction nozzle 21 of the same type as that used in the solid-liquid separation is caused to suck the same particles and solution as those used in the solid-liquid separation, the plunger 13a is caused to rest for the period $\Delta t_1$ described above, and the particles are allowed to sediment, thereby causing formation of a plug of the particles at the near side of the leading end opening and clogging of the particles. This is visually observed or detected using a sensor, such as image analysis using a camera, whereby an appropriate condition is found. In this manner, the period $\Delta t_1$ and the speed $R_{eject}$ may be determined. As for the period $\Delta t_2$, a period until the liquid is sufficiently ejected from the suction nozzle 21 after the plunger 13a has been moved to the bottom dead center at the determined speed $R_{eject}$ in the determined period $\Delta t_1$ is determined through visual observation or detection by use of a sensor such as the pressure sensor 31, whereby the period $\Delta t_2$ may be determined.

The present disclosure encompasses the suction nozzle, and preferably, also the pipette tip, to be used in the solid-liquid separation method of the present embodiment. Preferably, the suction nozzle does not have a filter near the leading end opening thereof. Preferably, the minimum opening diameter of the suction nozzle is greater than the maximum diameter of the particles, and is smaller than six times the maximum diameter of the particles.

The present disclosure encompasses the particles to be used in the solid-liquid separation method of the present embodiment.

The present disclosure encompasses a solid-liquid separation kit which includes: the suction nozzle, preferably the pipette tip, to be used in the solid-liquid separation method of the present embodiment; and the particles to be used in the solid-liquid separation method of the present embodiment.

Figure 3:
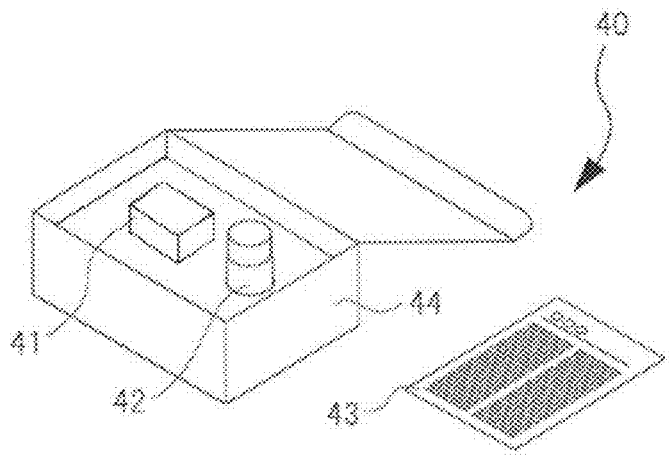
FIG. 3 shows one example of the appearance of a kit of the present embodiment.

In the present embodiment, containers which store the various types of reagents described above may be packaged in a box, to be provided to the user. In this box, a package insert of a reagent kit may be included. Preferably, this package insert includes description of the configuration of the reagent kit, the measurement protocol of presepsin, and the like, for example. FIG. 3 shows one example of the appearance of the reagent kit of the present embodiment. In the drawing, the reference numeral 40 indicates a reagent kit, the reference numeral 41 indicates a first container which stores a detachable suction nozzle, preferably a pipette tip, the reference numeral 42 indicates a second container which stores particles, the reference numeral 43 indicates a package insert, and the reference numeral 44 indicates a package box.

The embodiment, including preferable modes, of the solid-liquid separation method, the solid-liquid separation apparatus, and the solid-liquid separation kit has been described above. The preferable modes can be combined as appropriate.

EXAMPLES

Example 1: Pt Curve and Clogging of Particles

A Pt curve clearly shows whether the solid-liquid separation is successful, with the particles clogged in the suction nozzle 21.

Figure 4A:
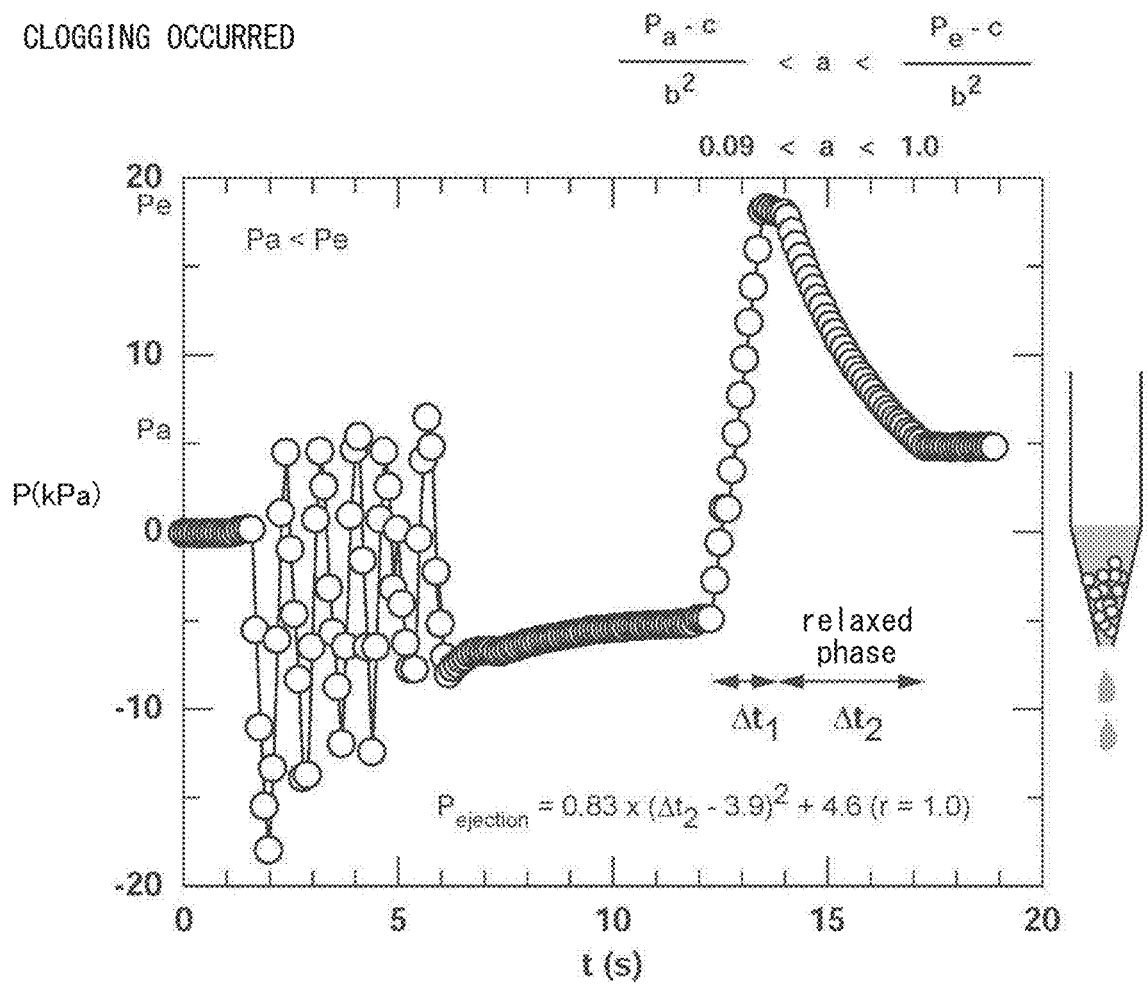
FIG. 4A is one example of a Pt curve in a success case of the solid-liquid separation of the present embodiment.
Figure 4B:
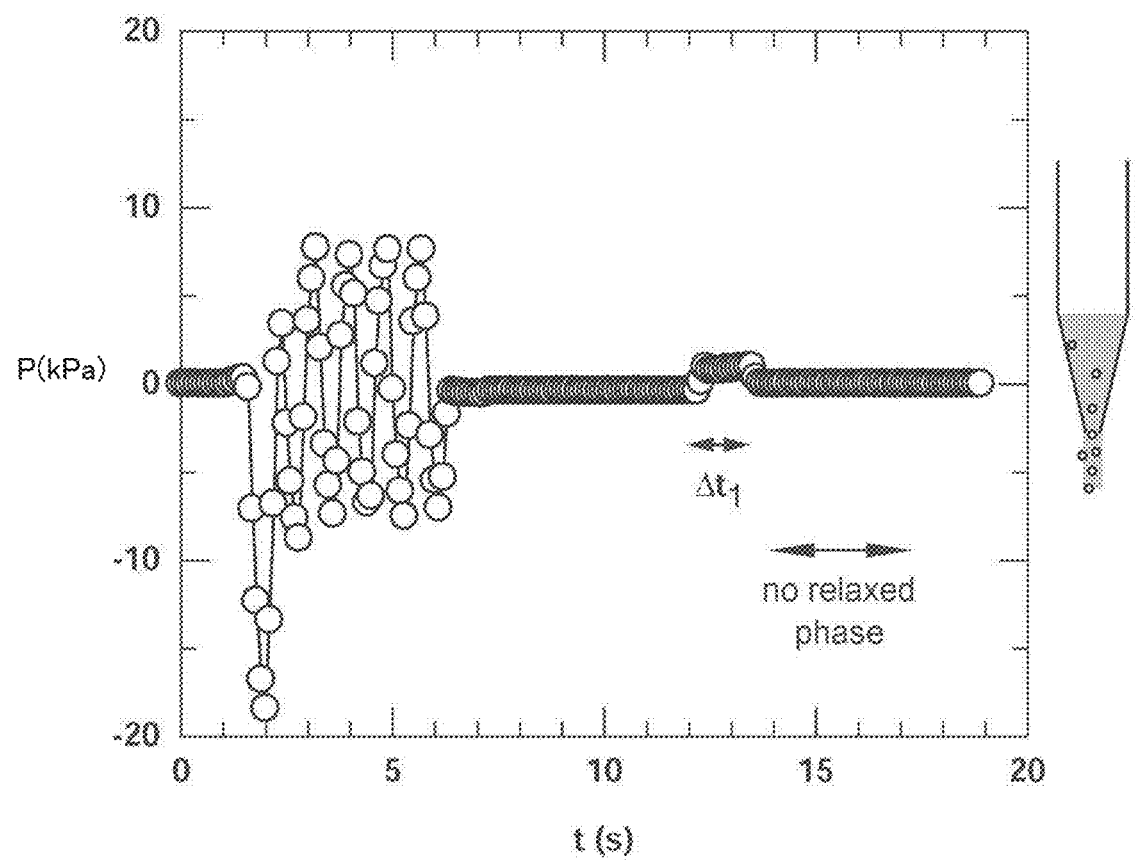
FIG. 4B is one example of a Pt curve in a failure case of the solid-liquid separation of the present embodiment.
Figure 4C:
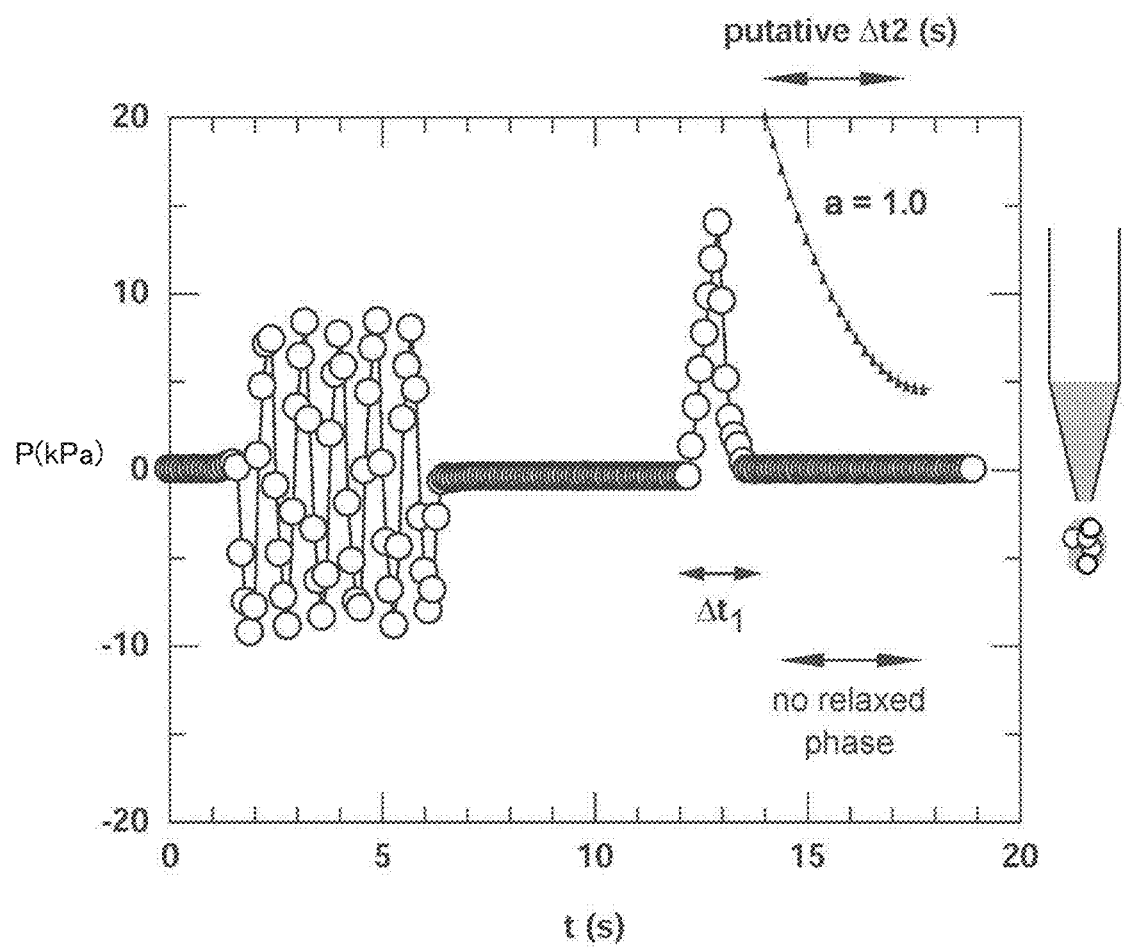
FIG. 4C is one example of a Pt curve in a failure case of the solid-liquid separation of the present embodiment.

FIG. 4A to FIG. 4C are each a graph showing an actual measurement example in which a Pt curve was obtained by performing measurement by use of the solid-liquid separation apparatus 11 having the configuration shown in FIG. 1. The solid-liquid separation apparatus 11 included the pressure sensor 31, and each value of the syringe internal pressure P detected by the pressure sensor 31 was plotted at a constant time interval.

As for the suction nozzle 21 (hereinafter, also referred to simply as tube), a tube named "B" (hereinafter, tube B or tube B type) in FIG. 5C described later was used.

As for the particles used in this Example, porous silica was used, in consideration of usage as an adsorbent (carrier) for adsorbing a desired peptide or nucleic acid as a target substance from a liquid obtained by desalting a supernatant obtained by heating whole blood, serum, or plasma.

Specifically, (a) 100 mg of a carrier named "1" (hereinafter, carrier No. 1 or carrier 1 type) in FIG. 5A described later, i.e., a mesoporous silica carrier manufactured by Nippon Kasei Chemical Co., Ltd, (trade name: Mesopure; carriers No. 2 to No. 10 shown in FIG. 5A are classified fractions of carrier No. 1), (b) 100 mg of carrier No. 10 in FIG. 5A, and (c) 10 mg of carrier No. 5 in FIG. 5A were taken by weighing and were each put into a container 23 (Safe-Lock Tubes 2.0 mL manufactured by eppendorf) (FIG. 1).

Carrier No. 1 was obtained by causing the above mesoporous silica carrier as bulk powder to pass through a sieve having an aperture size of 75 µm and a sieve having an aperture size of 900 µm stacked on each other, and then by recovering particles remaining between the sieves. Carrier 2 to carrier No. 10 were each obtained by causing carrier No. 1 as the bulk powder to pass through stacked sieves having predetermined aperture sizes shown in FIG. 5A, and then by recovering particles remaining between the sieves. FIG. 5B shows particle size distributions of carriers No. 1 to No. 10 measured by a laser diffraction scattering method using a Microtrac FRA 9220 apparatus (manufactured by Leeds & Northrup).

Then, 1.5 mL of PBS (product code: 1610780, manufactured by Bio-Rad Laboratories, Inc.) was added as a solvent (liquid). Then, the plunger 13a was moved from the initial position to the top dead center, to suck the liquid and the particles stored in the container 23.

When the plunger 13a is moved from the top dead center to the bottom dead center, or from the bottom dead center to the top dead center, the volume of the syringe changes by 1000 µL. The moving speed $R_{suction}$ of the plunger 13a during agitating operation is 2800 µL/s.

The plunger 13a was caused to perform agitating operation of five reciprocations similarly to that in FIG. 2, then to rest at the top dead center, then to slowly move (advance) to the bottom dead center, and then to stop for a predetermined period at the bottom dead center. In an ejection step following the agitation and suction step (hereinafter, also referred to simply as agitation step), the plunger 13a was caused to advance from the top dead center to the bottom dead center. In the agitation step and the ejection step, the changed volume of syringe caused by one advance was 1000 µL (the same applies to a retreat). The moving speed R during an advance was 800 µL/s.

Whether the PBS solvent and the carrier were suspended and whether formation of a plug by the carrier in the tube was completed (solid-liquid separation was successful) or whether the formation of the plug was unsuccessful (solid-liquid separation was unsuccessful), through the agitation and suction step and the ejection step, were visually observed, and in addition, a video thereof was recorded and confirmed afterwards. Then, judgement was made.

A success of the solid-liquid separation means that it was judged that carrier No. 1 and the PBS solvent were able to be separated from each other after the agitation step and the ejection step.

FIG. 4A to FIG. 4C show the Pt curves obtained when the various types of carriers of (a) to (c) above were used, respectively. In each of FIG. 4A to FIG. 4C, at the right of the graph, a pattern when the solid-liquid separation is successful, or a representative state of the inside of the tube when the solid-liquid separation is unsuccessful is illustrated.

In the case of a combination of a tube and a carrier for which the solid-liquid separation was judged to be unsuccessful, the Pt curve has the following characteristics compared with that when the solid-liquid separation was successful: (1) Compared with the value of $P_{agit}$ measured in the agitation step, the value of $P_{eject}$ measured during the period $\Delta t_1$ in a first half part of the time period in the ejection step did not show a significant difference; (2) during the period $\Delta t_2$ in the second half part of the ejection step, ejection of the solvent to the outside of the tube (hereinafter, "relaxation") following the end of the advancing movement of the plunger 13a was not observed.

Meanwhile, in the case of a combination for which the solid-liquid separation was judged to be successful, the Pt curve included a curve obtained through curve-fitting using a discriminant $P_e = a \times (t+b)^2 + c$ (where coefficient $a \neq 3$), i.e., a curve that fitted a parabola.

For the curve-fitting, Kaleida Graph from Synergy Software was used.

Thus, it was confirmed that the Pt curve served as a tool for judging success or failure of the solid-liquid separation.

Example 2: Solid-Liquid Separation Using Combinations of Tube and Carrier

With respect to more kinds of tubes and carriers, success or failure of the solid-liquid separation was judged by using the method for determining success or failure of the solid-liquid separation, the method having been described with reference to FIG. 4A to FIG. 4C.

In the present embodiment, the kind of each carrier is defined by: the size unique to the carrier (particle size distribution); and the volume fraction in a mixture or a suspension (carrier concentration).

FIG. 5A is an explanatory drawing showing the aperture sizes of the sieves used in preparation of the carriers used in the experiment. As illustrated at the upper right in FIG. 5A, the particle diameter of the carrier is S4.

FIG. 5B is a table showing particle size distributions of carriers No. 1 to No. 10 obtained by measuring the particle diameters by a laser diffraction scattering method with respect to carriers No. 1 to No. 10 prepared by use of sieves having predetermined aperture sizes shown in FIG. 5A.

FIG. 5C is an explanatory drawing showing the kind of tubes used in the experiment. The kind of each tube is defined by, in particular, the size of the leading end opening unique thereto (liquid-passing cross-sectional area). As illustrated at the upper right of FIG. 5C, the opening diameter at the leading end of the tube is S0.

FIG. 5D is a table showing the result of the experiment of solid-liquid separation performed using combinations of the carriers shown in FIG. 5A and the tubes shown in FIG. 5C. In the table and the description below, "good" means that it was judged that the solid-liquid separation state was good, and "possible" means that it was judged that solid-liquid separation was possible.

In the experiment, combinations of a carrier and a tube arbitrarily selected from the group of carriers (carriers No. 1 to No. 9) shown in FIG. 5A and the group of tubes (N, A, B, O, B1, and B2) shown in FIG. 5C were selected, and for each combination, the selected tube was attached to the connector of the solid-liquid separation apparatus 11. Then, the selected carrier and the PBS solvent were put in a container 23, and the resultant container was left to stand still.

Next, as shown in FIG. 2, the agitation step and the ejection step were performed to obtain a Pt curve. On the basis of visual observation and the obtained Pt curve, whether the solid-liquid separation was successful or not was determined, whereby the table shown in FIG. 5D was obtained.

From the result of the experiment, the following is deduced. (1) The number of combinations that enable the solid-liquid separation is not one or a limited multiple number, but a large number. (2) As described above, not the shape of the tube (see photographs, etc.) or the shape of the carrier (since carrier No. 1 to carrier No. 9 are secondary aggregates, the shape of each carrier is not uniform), but rather the relative size between the leading end opening of the tube and the particle diameter of the carrier has a large influence on whether the solid-liquid separation succeeds or fails.

More specifically, when a combination of carrier No. 7 and tube B1 was employed, good solid-liquid separation was realized, whereas, when a combination of carrier No. 8 and tube B1 is employed, the success rate of the solid-liquid separation decreased (FIG. 5D). According to FIG. 5C, the upper diameter of carrier No. 7 is 0.25 mm, whereas the upper diameter of carrier No. 8 is 0.18 In addition, according to FIG. 5C, the minimum opening diameter of tube B1 is 0.8 mm. Calculation performed on the basis of these numerical values revealed that, if the minimum opening diameter of a tube is greater than the upper diameter of the particles and is smaller than six times the upper diameter of the particles, good solid-liquid separation is realized. In this Example, the upper diameter of particles means the size of the greater sieve-mesh of the two sieves used in preparation of the carrier.

The success rate means the rate (m/n), where n is the number by which the pass/failure determination is repeated with regard to a combination of a certain tube and a certain carrier, and m is the number of cases in which the solid-liquid separation is successful. The pass/failure determination was repeated 10 times (n=10), and the success rate of the solid-liquid separation was obtained. In the table shown in FIG. 5D, the success rate was indicated as: "good" when the rate m/n was not lower than 50% and not higher than 100%; "possible" when the rate m/n was not lower than 10% and lower than 50%; and "poor" when the rate m/n was 0%. None of the combinations of a tube and a carrier employed in this Example exhibited the success rate of 0% (FIG. 5D).

The tubes used in the experiment are as follows.

Tube N type: manufactured by Precision Science, F4100.

Tube A type: manufactured by eppendorf, ep T.I.PS Standard 50-1000 μL.

Tube B type: manufactured by Corning, 100-1000 μL Universal Fit Pipet Tips.

Tube O type: manufactured by GILSON, capillary part of CP-1000.

Tube B1 type: a tube B type of which leading end was cut along a plane in parallel to the opening plane by use of a Precision Art Knife 157B type (manufactured by OLFA Corporation). The opening diameter S0 at the leading end was measured by a vernier caliper CD-15PSX (manufactured by Mitutoyo Corporation) after the cutting work, and was confirmed to be in the range of 0.8 mm to 1.6 mm.

Tube B2 type: a tube B type of which leading end was cut along a plane in parallel to the opening plane by use of a Precision Art Knife 157B type (manufactured by OLFA Corporation). The opening diameter S0 at the leading end was measured by a vernier caliper CD-15PSX (manufactured by Mitutoyo Corporation) after the cutting work and was confirmed to be in the range of 1.6 mm to 2.4 mm.

As for the carrier, 100 mg of a mesoporous silica carrier manufactured by Nippon Kasei Chemical Co., Ltd. (mesoporous silica carrier having a trade name of Mesopure) (each of carriers No. 1 to No. 9) was taken by weighing, and was put in a container.

As described above, the concentration of the carrier in the solution is also a factor for determining the kind of the carrier, but an example employing combinations based on this factor will be described later in Example 6.

Example 3: Reproducibility of Dispersion and Aggregation of Carrier

The actual values of the success rate obtained in Example 2 were very high, which is described below. The tube shown in FIG. 5A and FIG. 5C was connected to the apparatus shown in FIG. 1, and the agitation step and the ejection step were continuously repeated 100 times.

Figure 6A:
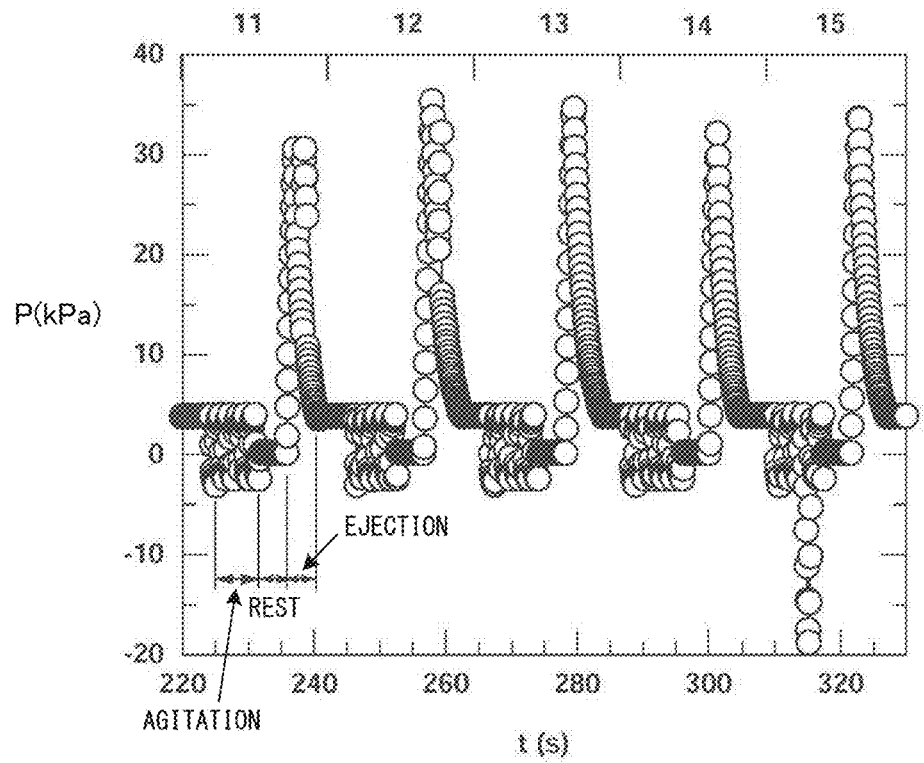
FIG. 6A shows a Pt curve indicating the 11th to 15th solid-liquid separations of the present embodiment obtained when the solid-liquid separation was continuously repeated 100 times.
Figure 6B:
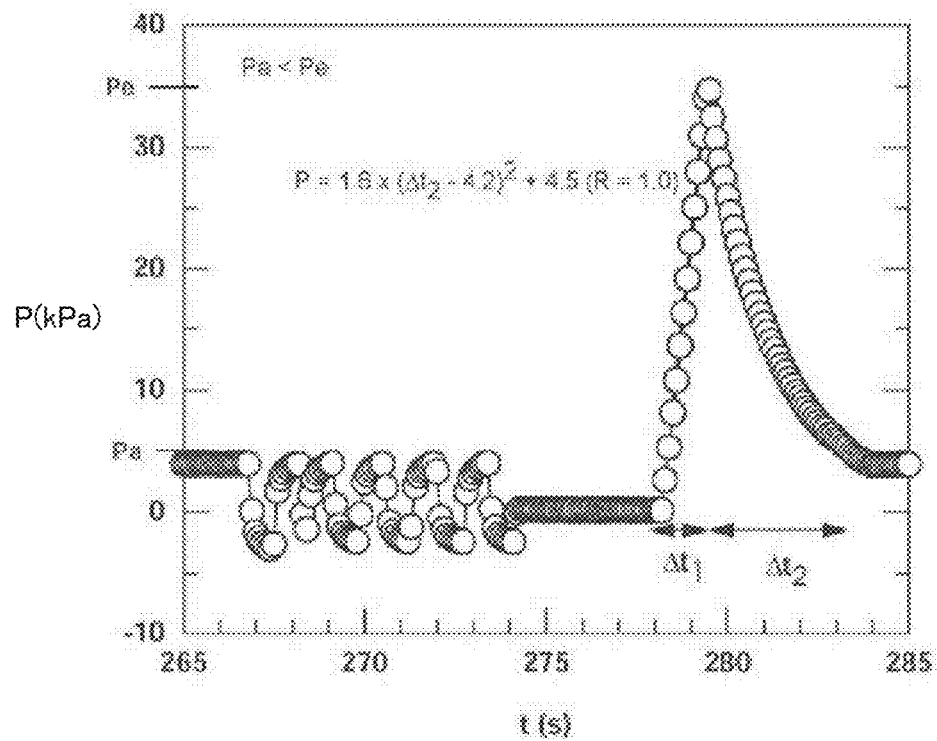
FIG. 6B shows a Pt curve of the 13th solid-liquid separation of the present embodiment obtained when the solid-liquid separation was continuously repeated 100 times.
Figure 6C:
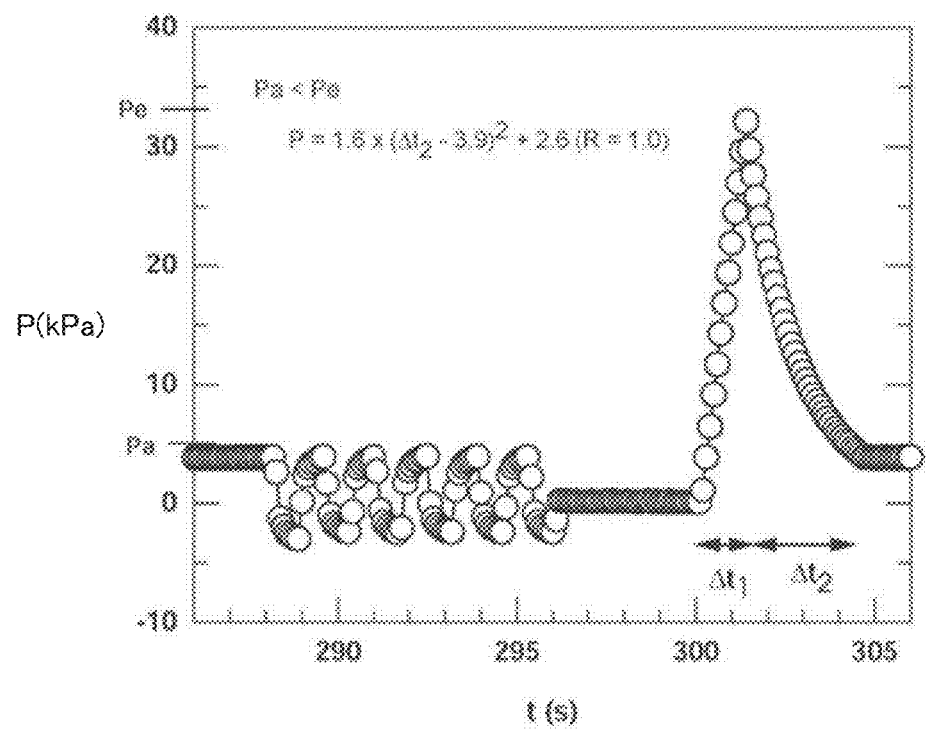
FIG. 6C shows a Pt curve of the 14th solid-liquid separation of the present embodiment obtained when the solid-liquid separation was continuously repeated 100 times.

As a result, each of the 100 times, a Pt curve that is determined as "pass" was obtained. That is, the success rate was 100%. FIGS. 6A to 6 C illustrate the Pt curves. That is, FIG. 6A shows the Pt curve of the 11th to 15th agitation steps and ejection steps, FIG. 6B shows the Pt curve of the 13th agitation step and ejection step, and FIG. 6C shows the Pt curve of the 14th agitation step and ejection step. These results show that the solid-liquid separation of the present embodiment can be performed with high reproducibility.

Example 4: Study of Moving Speed of Plunger

Whether the cases in which the determination result was "pass" are limited by a specific moving speed $R_{eject}$ of the plunger was examined. The same method as that in Example 1 was used. Detailed examination conditions are as follows.

100 mg of carrier No. 1 shown in FIG. 5C was taken by weighing and was put in a container similar to that in Example 1, and 1 mL of PBS was added thereto, to obtain a mixture. As the tube, the tube B1 type (opening diameter: 1.5 mm) shown in FIG. 5C was used and connected to a pump via the connector of the apparatus shown in FIG. 1. Suction and discharge of the solvent associated with the agitation step were performed under the following plunger movement condition. A retreat and an advance were alternately repeated five times, and further, one retreat was performed. The moved volume and the moving speed $R_{agit}$ in one advance or one retreat were 1000 µL and 2800 µL/s, respectively. In the ejection step, one advance was performed and the moved volume was 1000 µL. At that time, movement of the plunger was controlled such that an advance was made at an $R_{eject}$ in the range of 30 to 1200 µL/s. The Pt curve was recorded in the ejection step at each moving speed. Pass/failure determination was performed by a method similar to that in Example 1.

Figure 7:
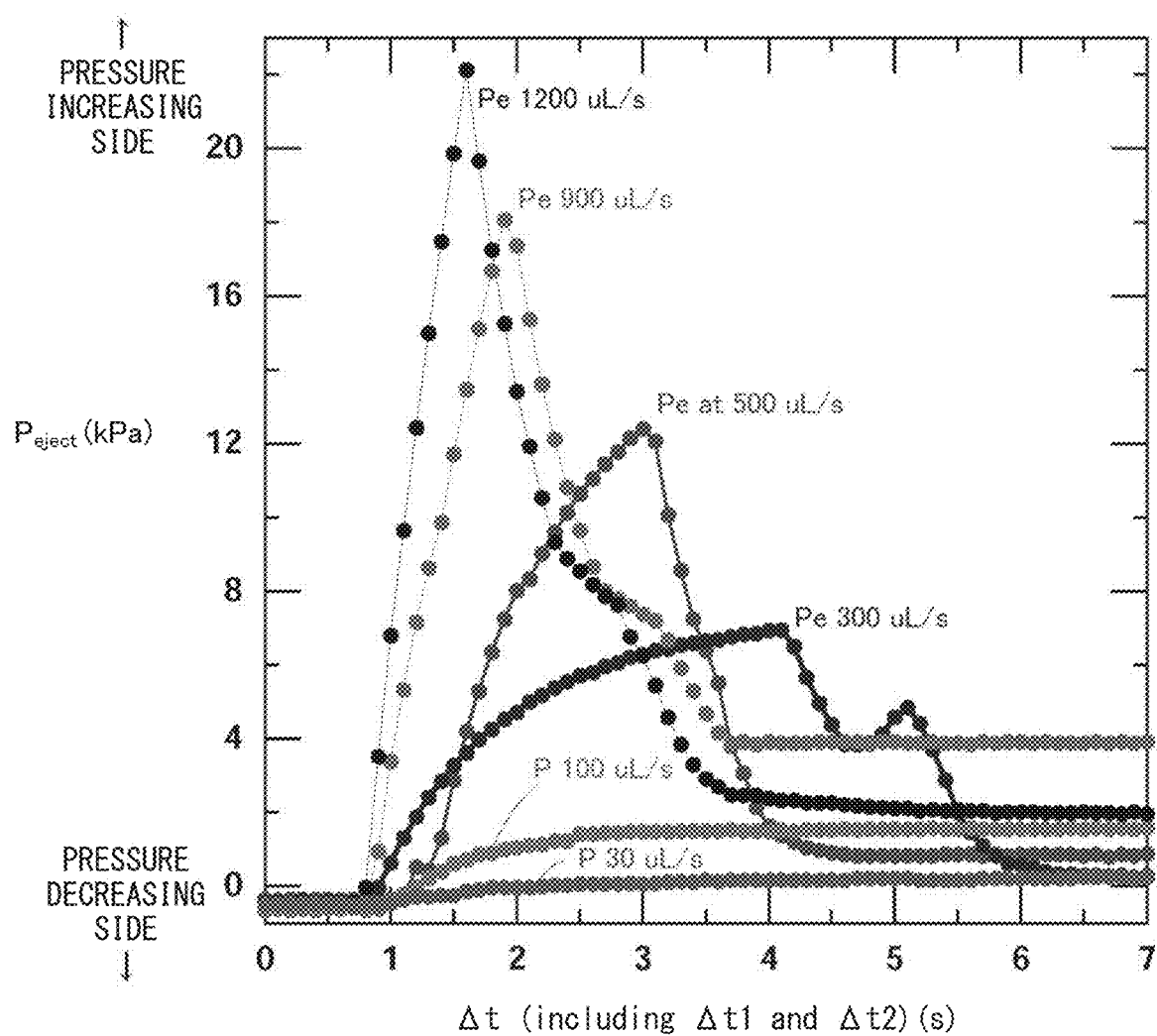
FIG. 7 shows Pt curves at respective liquid ejection speeds obtained when the liquid ejection speed was changed in the solid-liquid separation of the present embodiment.

At any of high and low plunger moving speeds $R_{eject}$, formation of a plug in the tube was observed. That is, it was demonstrated that a wide range of $R_{eject}$ allowed achievement of the solid-liquid separation (FIG. 7).

It was confirmed that when the value of $R_{eject}$ was larger (the plunger advanced faster), a higher in-tube pressure was generated, or when the value of $R_{eject}$ was smaller (the plunger advanced more slowly), a pressure drop (relaxation) consuming a longer time period ($\Delta t_2$) occurred.

Example 5: Study of Diverse Agitation Methods

In order to investigate whether success or failure of the solid-liquid separation of the present embodiment is influenced by diversity of the agitation method (agitation step), the following experiment was performed.

4.9 g of an ion exchange resin Bio-Rex MSZ501D (Bio-Rad Laboratories, Inc.) as a carrier was taken by weighing into a cylindrical container having an inner diameter of 18 mm, and 3.2 mL of ultrapure water supplied by a water purification apparatus MilliQ model (manufactured by MILLIPORE) was added as a solvent. A tube B2 type (opening diameter: 2.34 mm) shown in FIG. 5C was used as a first tube, and a tube B2 type (opening diameter: 1.8 mm) shown in FIG. 5C was used as a second tube, and each tube was connected to the apparatus shown in FIG. 1. A suspension was prepared through suction and discharge of the solvent in the container by the second tube, or through suction and discharge of the solvent in the container by both of the first tube and the second tube. After the suspension was sucked by the first tube, formation of a plug was observed. Then, the plunger was caused to advance according to a predetermined command, and only the solvent was ejected from the suspension in the first tube to the outside of the tube. Through visual observation and according to pass/failure determination using the Pt curve, it was confirmed that solid-liquid separation was carried out.

From the result above, it was shown that, irrespective of the number of tubes in contact with the solvent, the mixture, or the suspension, the solid-liquid separation according to the present embodiment could be achieved.

Example 6: Influence of Concentration of Carrier

In order to investigate influence of the concentration of the carrier, the following experiment was performed. Table 1 shows the carrier, the solvent, and the opening diameter of the tube that were employed.

TABLE 1

| | Carrier | | Solvent | | Mixture | Tube |
|---|---|---|---|---|---|---|
| FIG. | Name | Use amount mg | Kind | Use amount mL | Carrier concentration Vol % | Opening diameter mm |
| 8A | 12 | 4900 | ultrapure water | 3.2 | 60 | 1.8 (tube B2 type) |
| 8B | 1 | 100 | PBS | 1.5 | 5 | 0.8 (tube B type) |
| 8C | 13 | 10 | PBS | 1.5 | 0.1 | 0.8 (tube B type) |

Carrier No. 12 (manufactured by Bio-Rad Laboratories, Inc., Bio-Rex MSZ501D) shown in Table 1 was taken by weighing into the container described in Example 5 and the solvent shown in Table 1 was added. Each of carrier No. 1 shown in FIG. 5C and Table 1 and carrier No. 13 shown in Table 1 (zirconia balls having a particle diameter of 0.5 mm (model YTZ-0.5 manufactured by AS ONE Corporation)) was taken by weighing into the container as used in Example 1, and the solvent shown in Table 1 was added.

The tube shown in Table 1 was connected to the connector portion of the apparatus shown in FIG. 1, the agitation step and the ejection step similar to those in Example 1 were applied. The advance in the ejection step was performed at 25° C. (room temperature) under atmospheric pressure.

Figure 8A:
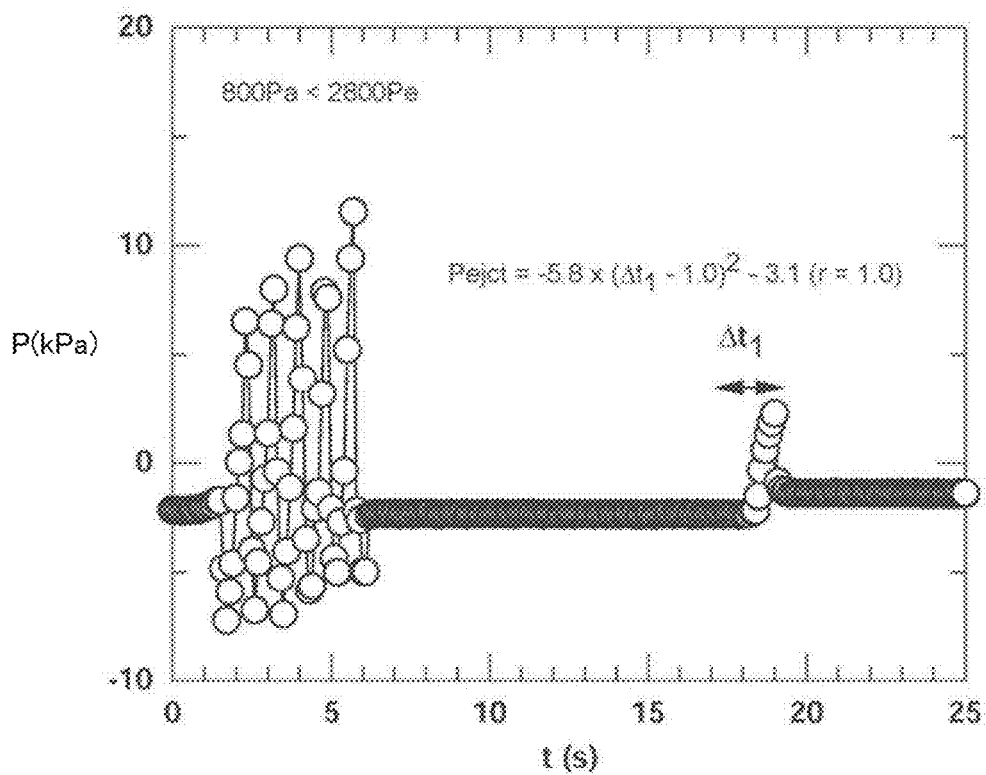
FIG. 8A shows a Pt curve obtained when the carrier concentration was 60% in an Example.
Figure 8B:
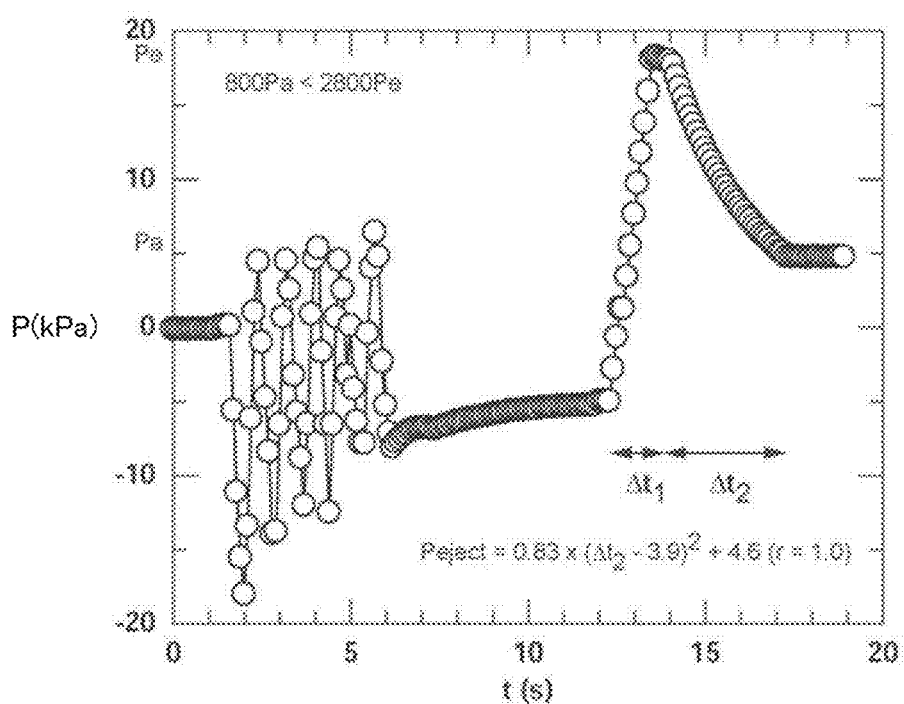
FIG. 8B shows a Pt curve obtained when the carrier concentration was 5% in an Example.
Figure 8C:
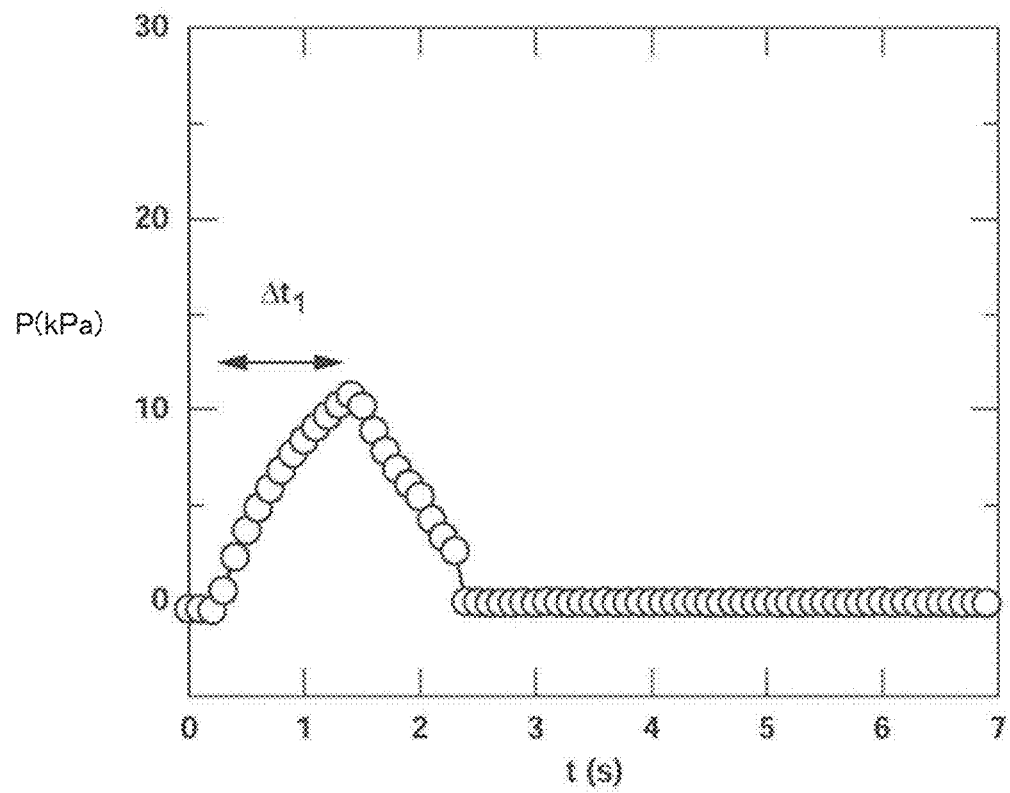
FIG. 8C shows a Pt curve obtained when the carrier concentration was 0.1% in an Example.
Figure 9A:
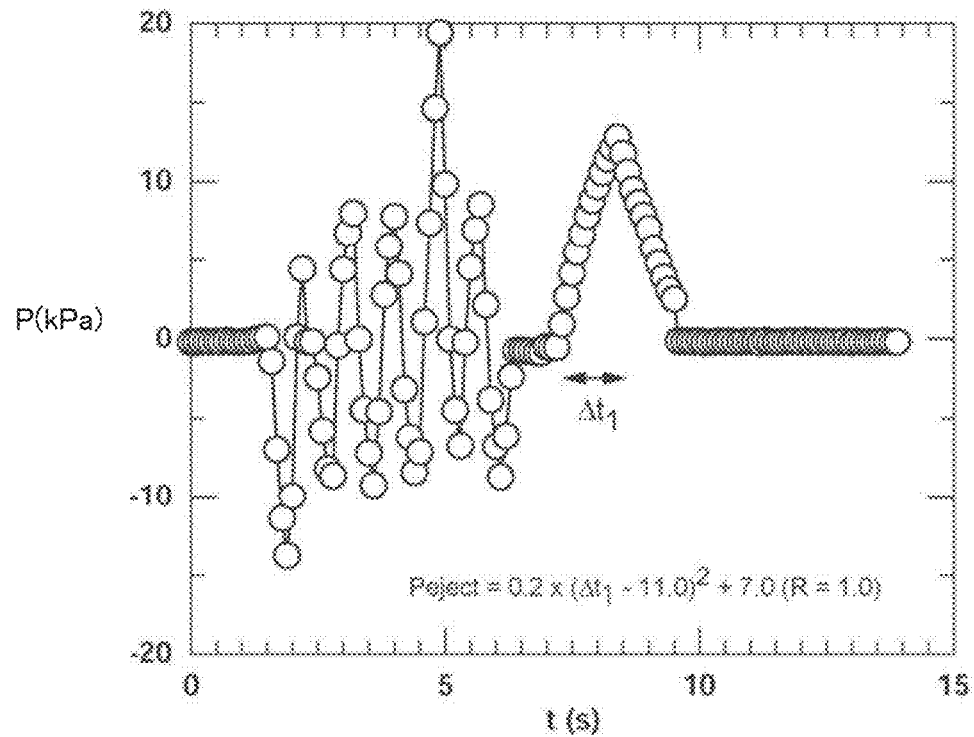
FIG. 9A shows a Pt curve obtained when the specific gravity of the carrier was 7.9 in an Example.
Figure 9B:
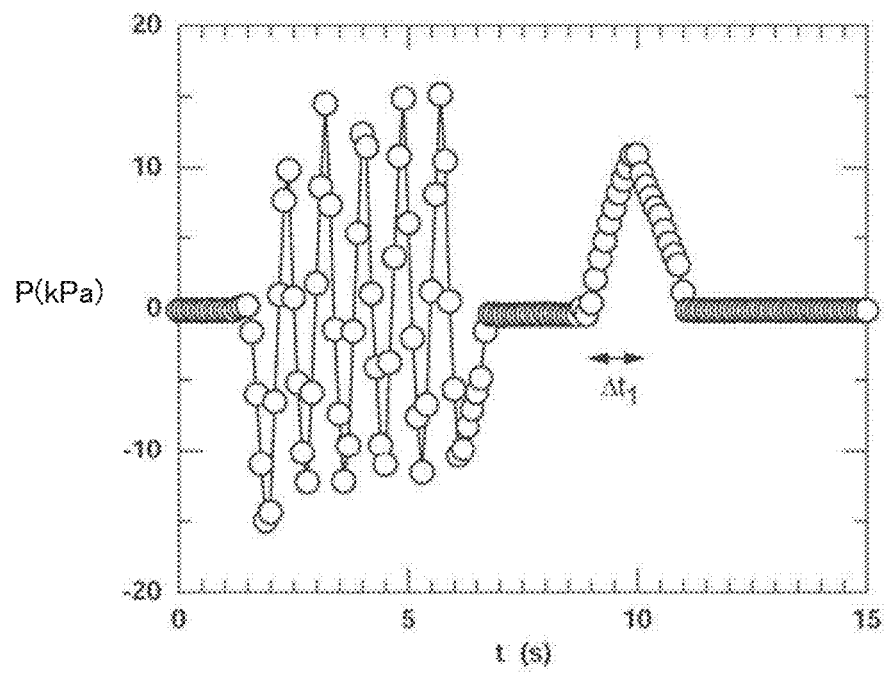
FIG. 9B shows a Pt curve obtained when the specific gravity of the carrier was 6.0 in an Example.
Figure 9C:
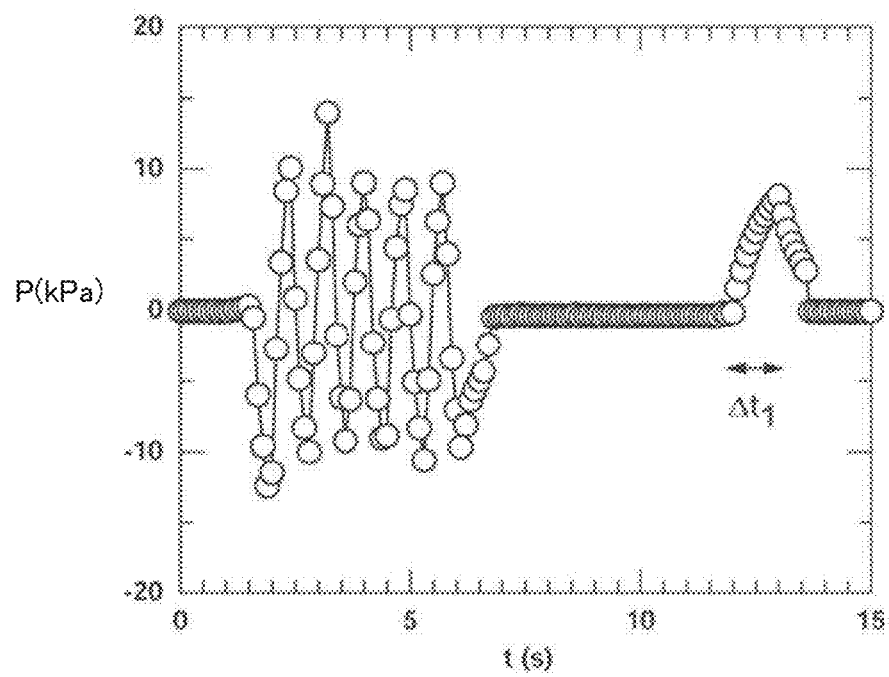
FIG. 9C shows a Pt curve obtained when the specific gravity of the carrier was 4.0 in an Example.
Figure 9D:
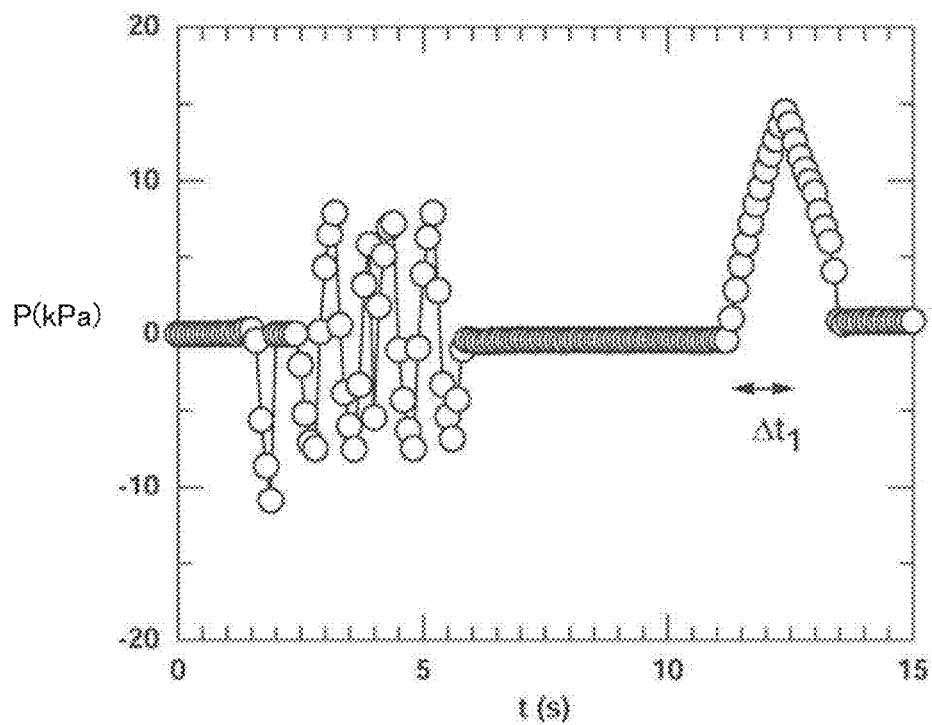
FIG. 9D shows a Pt curve obtained when the specific gravity of the carrier was 1.1 in an Example.

As a result, it was confirmed that, with any of the concentrations, expected carrier dispersion and carrier lumping were observed and the solid-liquid separation was achieved (FIG. 8A to FIG. 8C).

Example 7: Influence of Specific Gravity of Carrier

In order to investigate influence of the specific gravity of the carrier, the following experiment was performed. Table 2 shows the carrier, the solvent, and the $\Delta V_{plngr}$ and $R_{eject}$ during ejection that were employed.

First, each of the various types of carriers (9A to 9D) shown in Table 2 was taken by weighing and put in the same container as used in Example 1, and 1.5 mL of phosphate buffer (PBS) having a specific gravity of 1 was added, to obtain a mixture. With respect to the various types of mixtures, the agitation step and the ejection step similar to those in Example 1 were performed, by use of the apparatus (FIG. 1) with the tube B shown in FIG. 5C connected thereto.

The moved volume and the moving speed R of the plunger in the advance in the ejection step were as shown in Table 2. This advance was performed at 25° C. (room temperature) under atmospheric pressure.

FIGS. 9A to 9D show the Pt curves recorded by the apparatus shown in FIG. 1. From these results, it was confirmed that, with any of the carriers respectively having the different specific gravities, expected carrier dispersion and carrier lumping were observed and the solid-liquid separation could be achieved.

TABLE 2

|  | Carrier | | | Solvent | | | Ejection | |
|---|---|---|---|---|---|---|---|---|
|  | Name | Specific gravity | Use amount mg | Kind | Specific gravity | Viscosity cP | $\Delta V_{plngr}$ μL | $R_{eject}$ μL/s |
| 9A | 14 | 7.9 | 200 | PBS | 1 | — | 1000 | 800 |
| 9B | 13 | 6.0 | 100 | PBS | 1 |  | 1000 | 800 |
| 9C | 15 | 4.0 | 100 | PBS | 1 |  | 1000 | 800 |
| 9D | 16 | 1.1 | 100 | PBS | 1 |  | 1000 | 800 |

The details of Table 2 above are described below.

Carrier No. 14: SUS304 balls having a particle diameter of 0.5 mm, Kyushu Bearing Co. Ltd.

Carrier No. 15: alumina balls having a particle diameter of 0.5 mm, AS ONE Corporation, model AL9-0.5.

Carrier No. 16: polystyrene balls having a particle diameter of 0.5 mm.

PBS: 10×PBS (manufactured by Bio-Rad Laboratories, Inc., 1610780) diluted 10-fold with ultrapure water.

Example 8: Influence of Specific Gravity of Solvent

In order to investigate influence of the specific gravity of the solvent, the following experiment was performed. Table 3 shows the carrier, the solvent, and the $\Delta V_{plngr}$ and $R_{eject}$ during ejection that were employed.

First, 100 mg of carrier 1 having a specific gravity of 2 was taken by weighing into the same container as used in Example 1, and 1.5 mL of each of the various types of carriers (10A to 10C) shown in Table 3 was added, to obtain a mixture. With respect to the various types of mixtures, the agitation step and the ejection step similar to those in Example 1 were performed, by use of the apparatus (FIG. 1) with the tube B shown in FIG. 5C connected thereto.

Figure 10A:
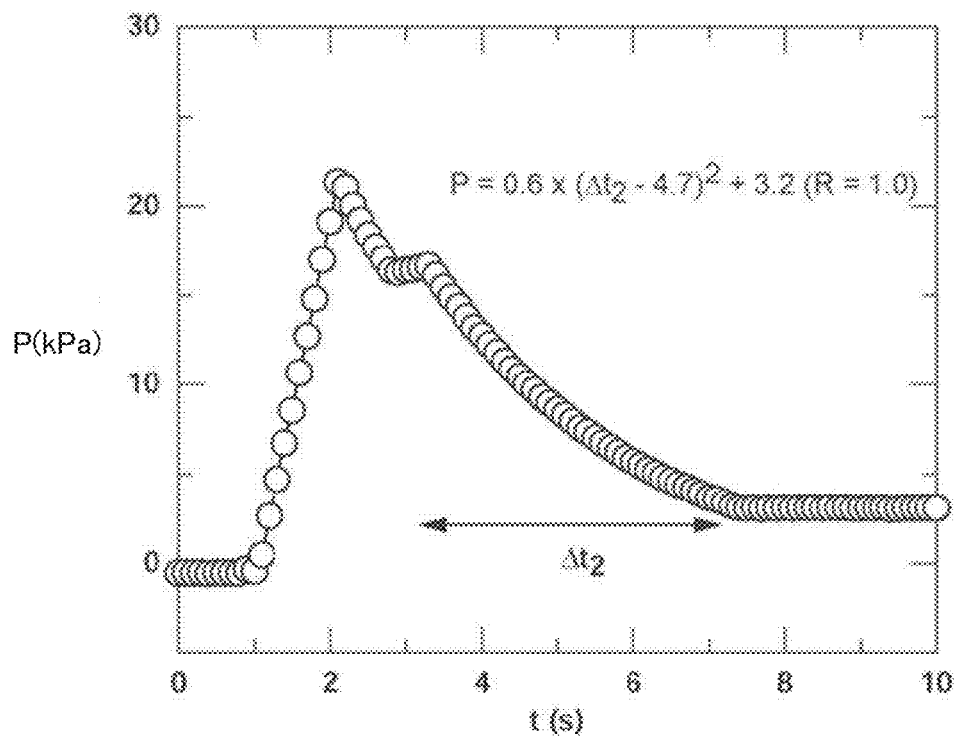
FIG. 10A shows a Pt curve obtained when the specific gravity of a solvent was 1.9 in an Example.
Figure 10B:
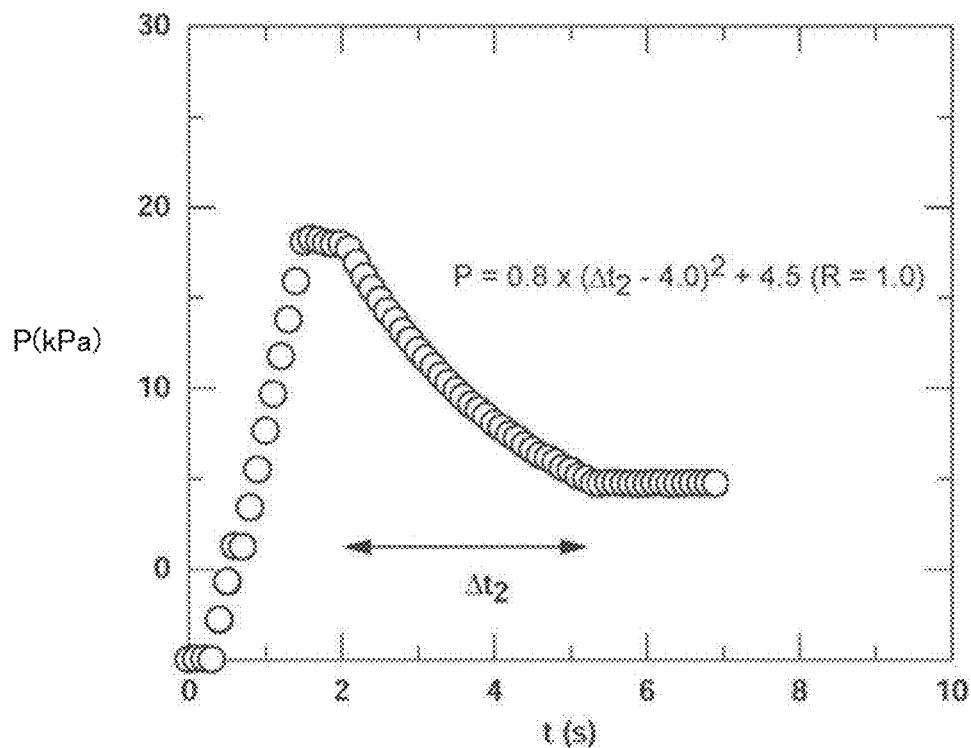
FIG. 10B shows a Pt curve obtained when the specific gravity of a solvent was 1.2 in an Example.
Figure 10C:
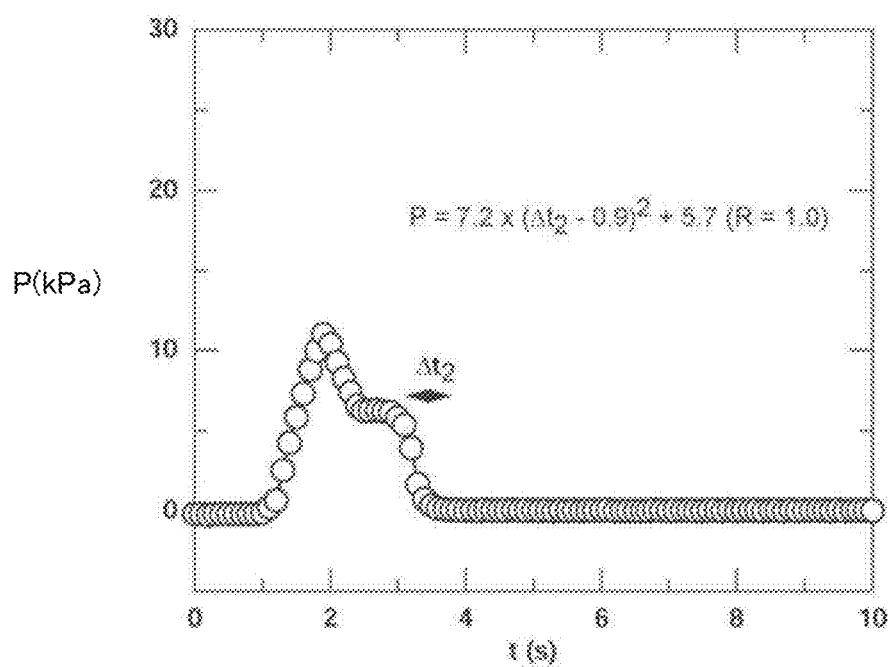
FIG. 10C shows a Pt curve obtained when the specific gravity of a solvent was 0.7 in an Example.
Figure 11A:
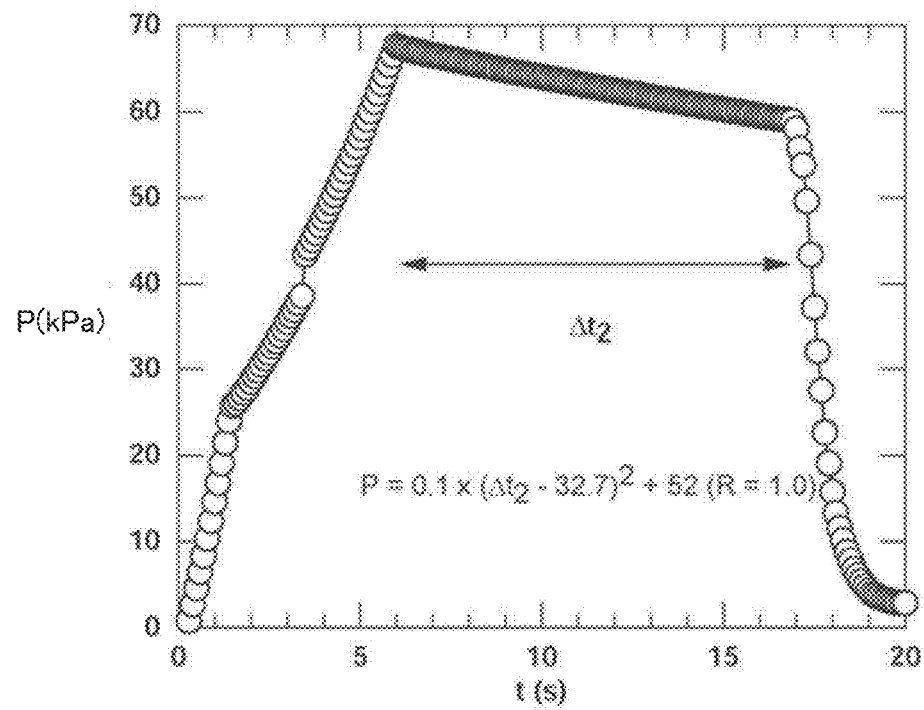
FIG. 11A shows a Pt curve obtained when the viscosity of a solvent was 400 cP in an Example.
Figure 11B:
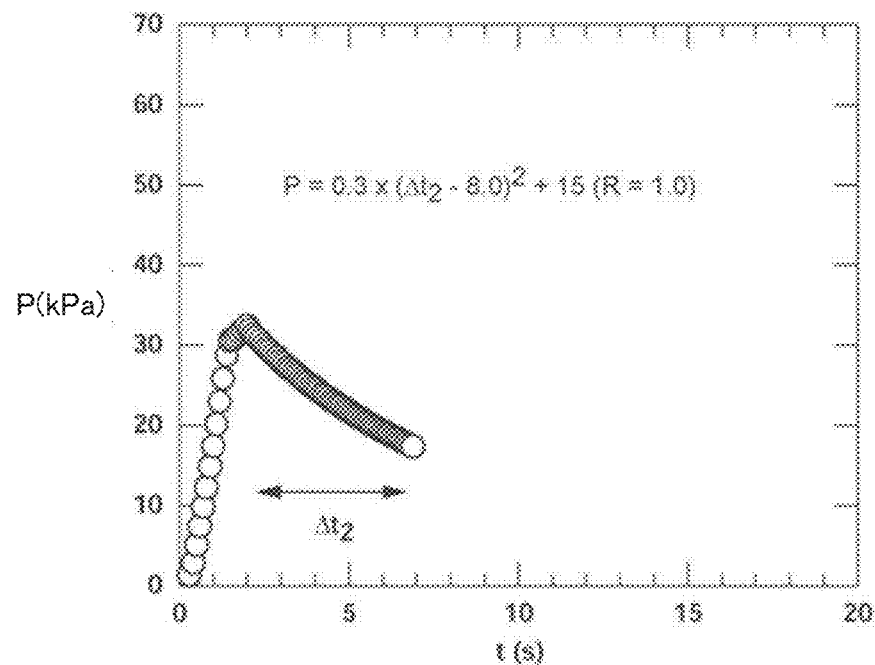
FIG. 11B shows a Pt curve obtained when the viscosity of a solvent was 60 cP in an Example.
Figure 11C:
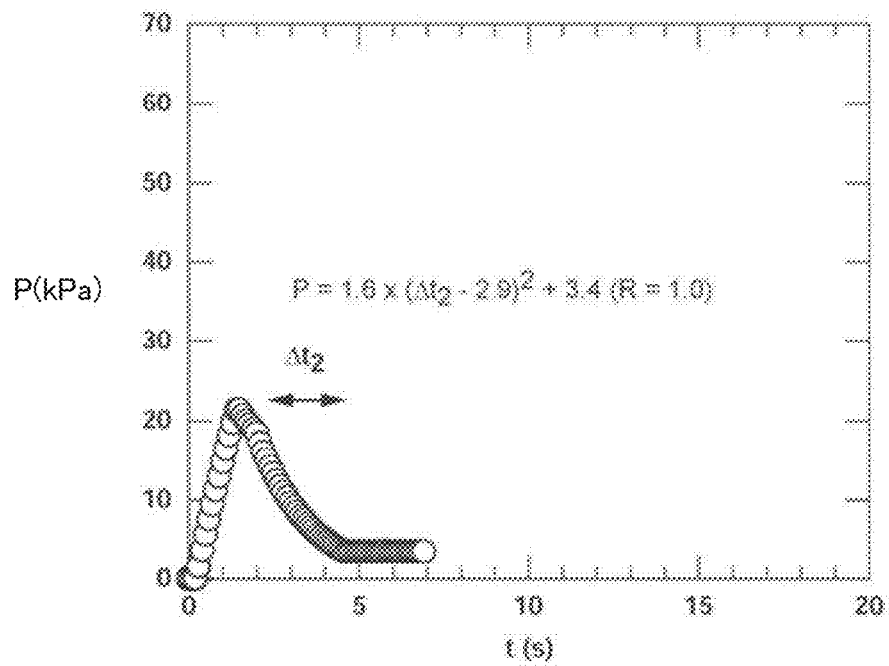
FIG. 11C shows a Pt curve obtained when the viscosity of a solvent was 1 cP in an Example.
Figure 11D:
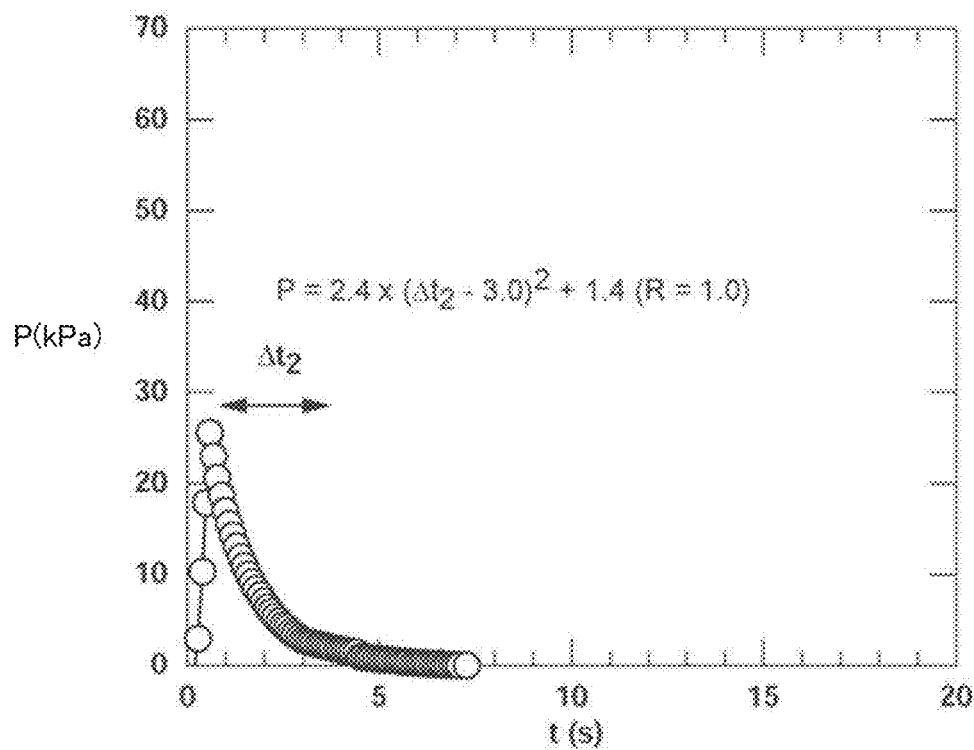
FIG. 11D shows a Pt curve obtained when the viscosity of a solvent was 0.3 cP in an Example.

FIGS. 10A to 10C show the Pt curves recorded by the apparatus shown in FIG. 1. From these results, it was confirmed that, with any of the solvents respectively having different specific gravities, expected carrier dispersion and carrier lumping were observed and the solid-liquid separation could be achieved.

TABLE 3

|  | Carrier | | | Solvent | | | Ejection | |
|---|---|---|---|---|---|---|---|---|
|  | Name | Specific gravity | Use amount mg | Kind | Specific gravity | Viscosity cP | $\Delta V_{plngr}$ μL | $R_{eject}$ μL/s |
| 10A | 1 | 2 | 100 | 60% CsCl | 1.9 | — | 1000 | 800 |
| 10B | 1 | 2 | 100 | PBS | 1.2 | — | 1000 | 800 |
| 10C | 1 | 2 | 100 | Hexan | 0.7 | 0.3 | 1000 | 800 |

The details of Table 3 above are described below.

PBS: 10×PBS (manufactured by Bio-Rad Laboratories, Inc., 1610780) diluted 10-fold with ultrapure water.

60% CsCl: CsCl (manufactured by Wako Pure Chemical Industries, Ltd., 034-08161) dissolved with ultrapure water.

Hexan: n-Hexan (Wako Pure Chemical Industries, Ltd., 082-00421).

Example 9: Influence of Viscosity of Solvent

In order to investigate influence of viscosity of the solvent, the following experiment was performed. Table 4 shows the carrier, the solvent, and the $\Delta V_{plngr}$ and $R_{eject}$ during ejection that were employed.

First, each of the various types of carriers (11A to 11D) shown in Table 4 was taken by weighing and put in the same container as used in Example 1, and 1.5 mL of a corresponding one of the various types of solvents shown in Table 4 was added, to obtain a mixture. With respect to the various types of mixtures, the agitation step and the ejection step similar to those in Example 1 were performed, by use of the apparatus (FIG. 1) with the tube B shown in FIG. 5C connected thereto.

FIGS. 11A to 11D show the Pt curves recorded by the apparatus shown in FIG. 1. From these results, it was confirmed that, with any of the solvents respectively having different viscosities, expected carrier dispersion and carrier lumping were observed and the solid-liquid separation could be achieved.

TABLE 4

|  | Carrier | | | Solvent | | | Ejection | |
|---|---|---|---|---|---|---|---|---|
|  | Name | Specific gravity | Use amount mg | Kind | Specific gravity | Viscosity cP | $\Delta V_{plngr}$ μL | $R_{eject}$ μL/s |
| 11A | 13 | 6.0 | 100 | Tween | 1.1 | 400 | 2000 | 800 |
| 11B | 13 | 6.0 | 100 | 80% Glycerol | 1.2 | 60 | 1000 | 800 |

TABLE 4-continued

| | Carrier | | | Solvent | | | Ejection | |
|---|---|---|---|---|---|---|---|---|
| Name | Specific gravity | Use amount mg | Kind | | Specific gravity | Viscosity cP | $\Delta V_{plngr}$ μL | $R_{eject}$ μL/s |
| 11C | 13 | 6.0 | 100 | ultrapure water | 1 | 1 | 1000 | 800 |
| 11D | 6 | 2 | 100 | ultrapure water 95° C. | 1 | 0.3 | 1000 | 2800 |

The details of Table 4 above are described below.

Tween: tween-20 (manufactured by Nacalai Tesque Inc., 23926-35).

80% Glycerol: Glycerol (manufactured by Nacalai Tesque Inc., 17018-25) diluted with ultrapure water.

Ultrapure water 95° C.: prepared by causing ultrapure water to stand still in a hot bath (manufactured by Tokyo Rikakikai Co. Ltd, model SB-450) for 30 minutes.

Example 10: Influence of Temperature 100 mg of carrier 6 shown in FIG. 5C was taken by weighing and put in the same container as used in Example 1, and 1.5 mL of ultrapure water was added, to obtain a mixture. Then, this mixture was caused: (a) to stand still for 30 minutes in an ice bath (a container filled with tap water and ice made by a crushed ice making machine of model AFE400 manufactured by Scotsman) to prepare a 0.5° C. mixture; (b) to stand still under room temperature to prepare a 25° C. mixture; and (c) to stand still for 30 minutes in a hot bath (manufactured by TOKYO RIKAKIKAI Co. Ltd, model SB-450) to prepare a 98° C. mixture. With respect to these mixtures (a), (b), and (c), the agitation step and the ejection step similar to those in Example 1 were performed, by use of the apparatus (FIG. 1) with the tube B shown in FIG. 5C connected thereto.

Figure 12A:
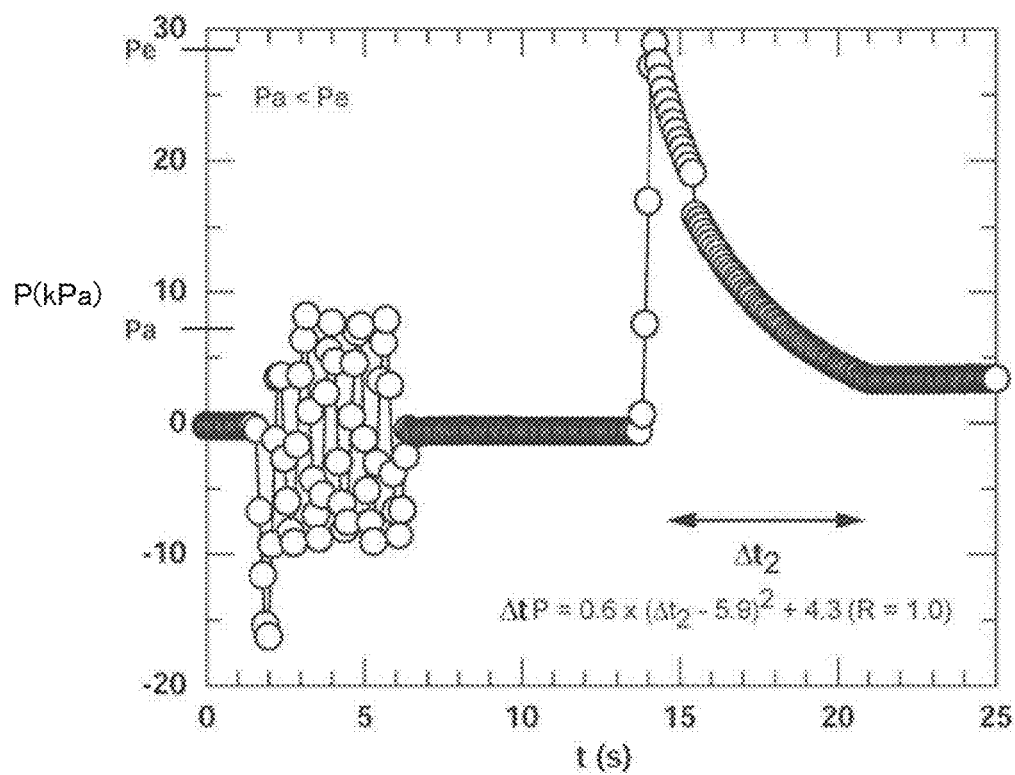
FIG. 12A shows a Pt curve obtained when the temperature of a suspension was 0.5° C. in an Example.
Figure 12B:
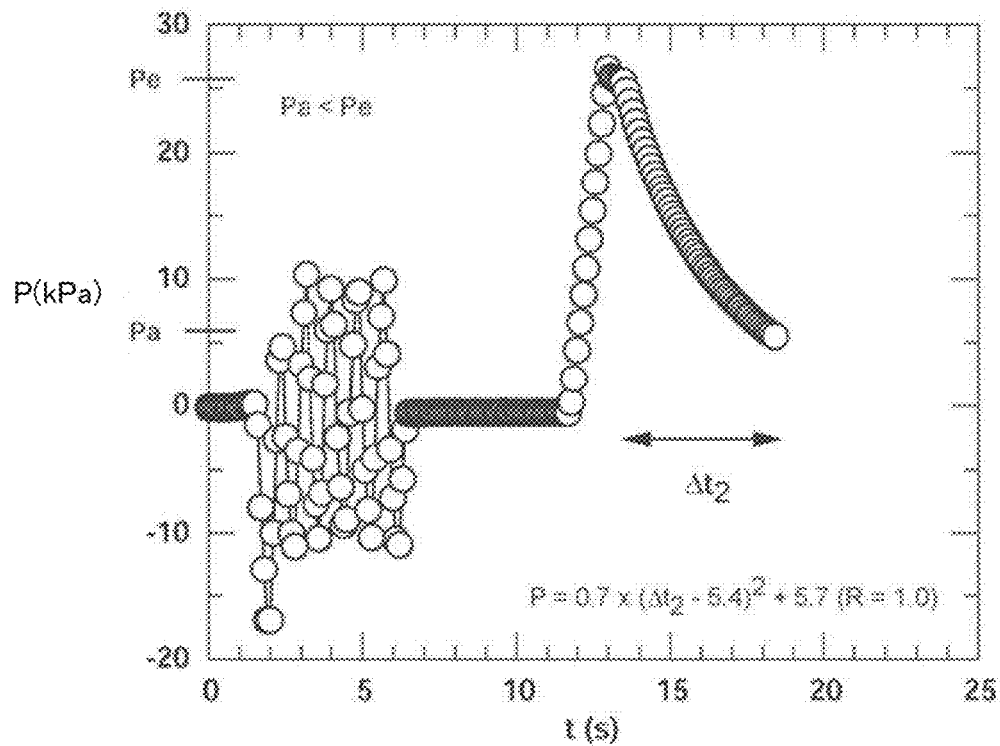
FIG. 12B shows a Pt curve obtained when the temperature of a suspension was 25° C. in an Example.
Figure 12C:
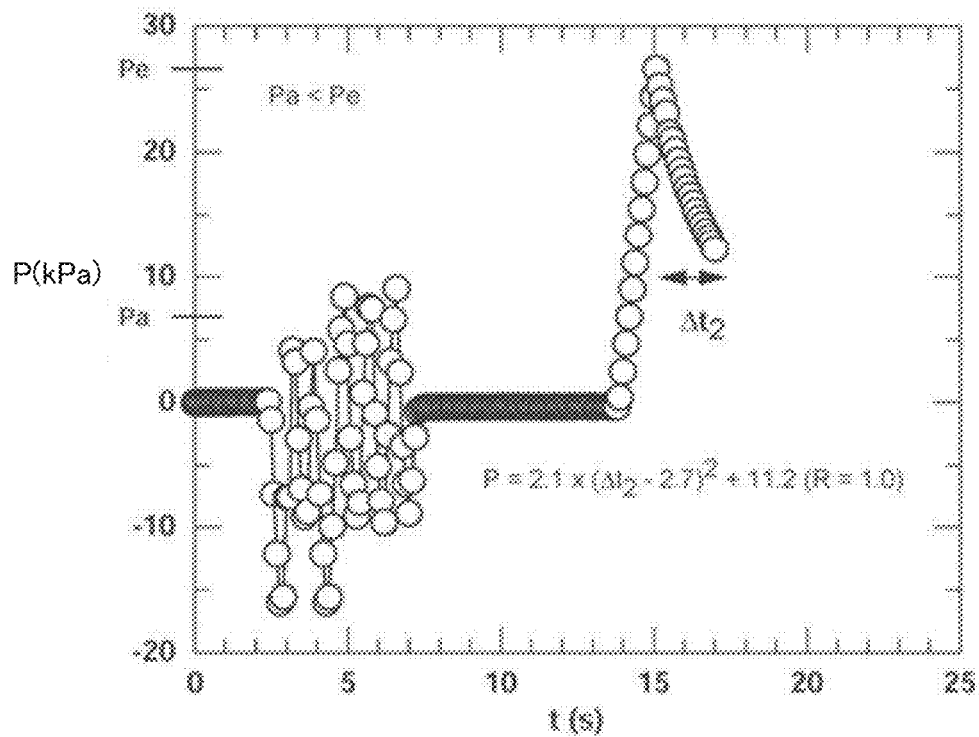
FIG. 12C shows a Pt curve obtained when the temperature of a suspension was 98° C. in an Example.

The moved volume and the moving speed R of the plunger in the advance in the ejection step were respectively 1000 μL and 800 μL/s (as for (a), 2800 μL/s). This advance was performed at 25° C. (room temperature) under atmospheric pressure. FIGS. 12A to 12C show the Pt curves recorded by the apparatus shown in FIG. 1. From these results, it was confirmed that, at any of the temperatures, expected carrier dispersion and carrier lumping were observed and the solid-liquid separation could be achieved.

Example 11: Usability of Solvent Containing Surfactant

In order to investigate influence in the case of the solvent that contains a surfactant, the following experiment was performed.

100 mg of carrier 1 shown in FIG. 5C was taken by weighing and put in the same container as used in Example 1, and 1 mL of a solvent, which was Triton X (manufactured by Nacalai Tesque Inc., product code: 35501-15) diluted with ultrapure water to a predetermined concentration ((a) 20%, (b) 8%, (c) 0%), was added, to prepare a mixture. With respect to these mixtures, the agitation step and the ejection step similar to those in Example 1 were performed, by use of the apparatus (FIG. 1) with the tube B1 (S0=1.32) shown in FIG. 5C connected thereto.

The advance in the ejection step was performed at 25° C. (room temperature) under atmospheric pressure.

Figure 13A:
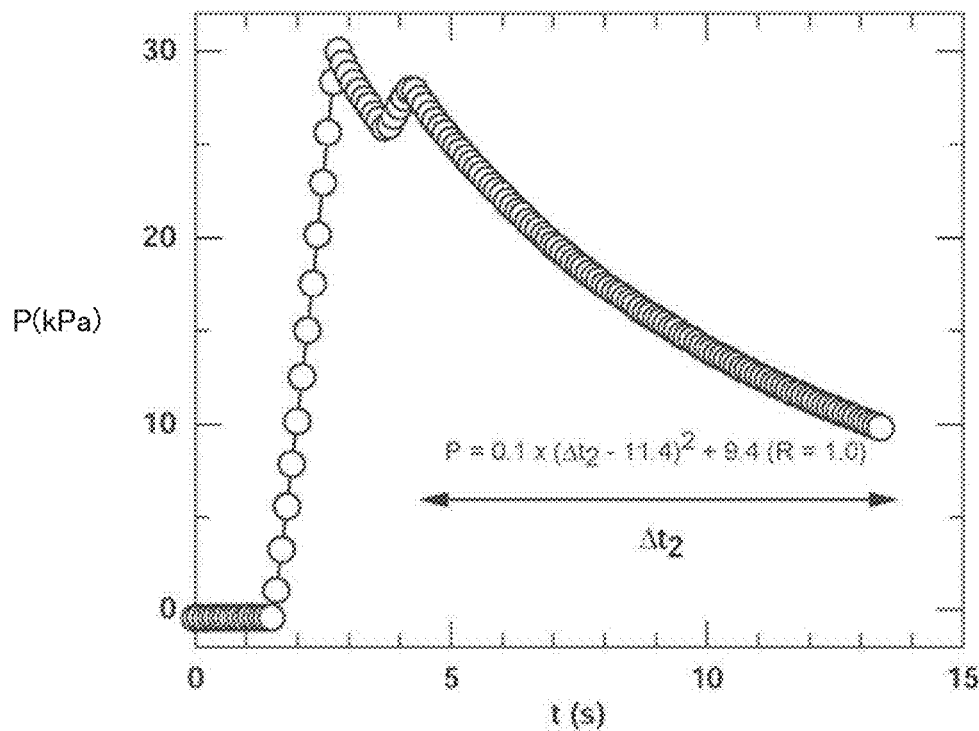
FIG. 13A shows a Pt curve obtained when a suspension containing a surfactant by 20% was used in an Example.
Figure 13B:
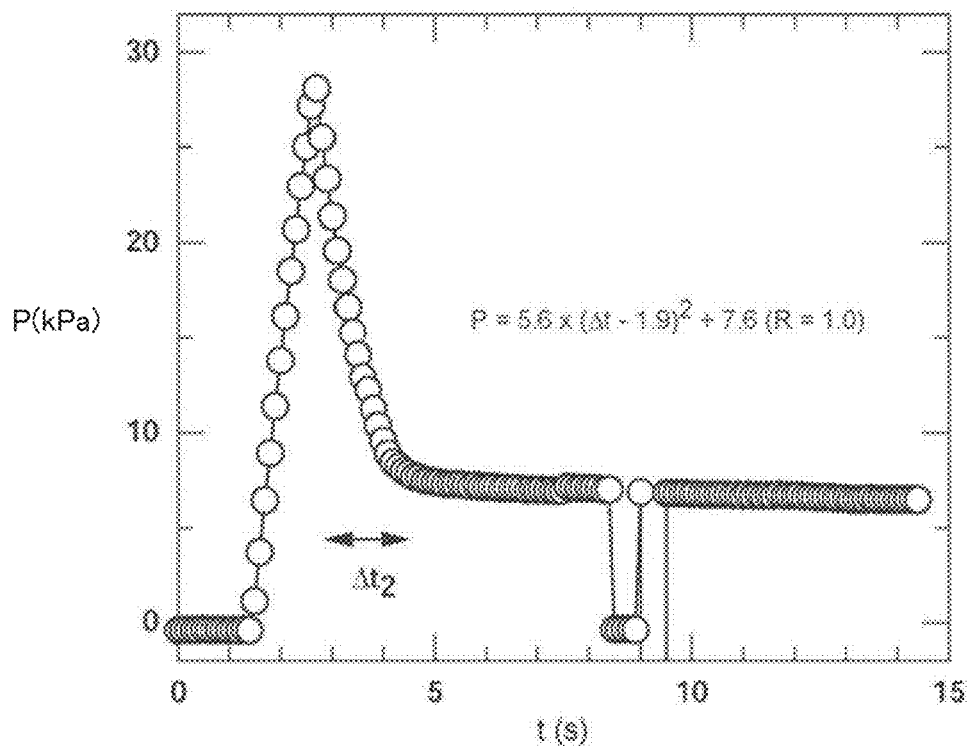
FIG. 13B shows a Pt curve obtained when a suspension containing a surfactant by 8% was used in an Example.
Figure 13C:
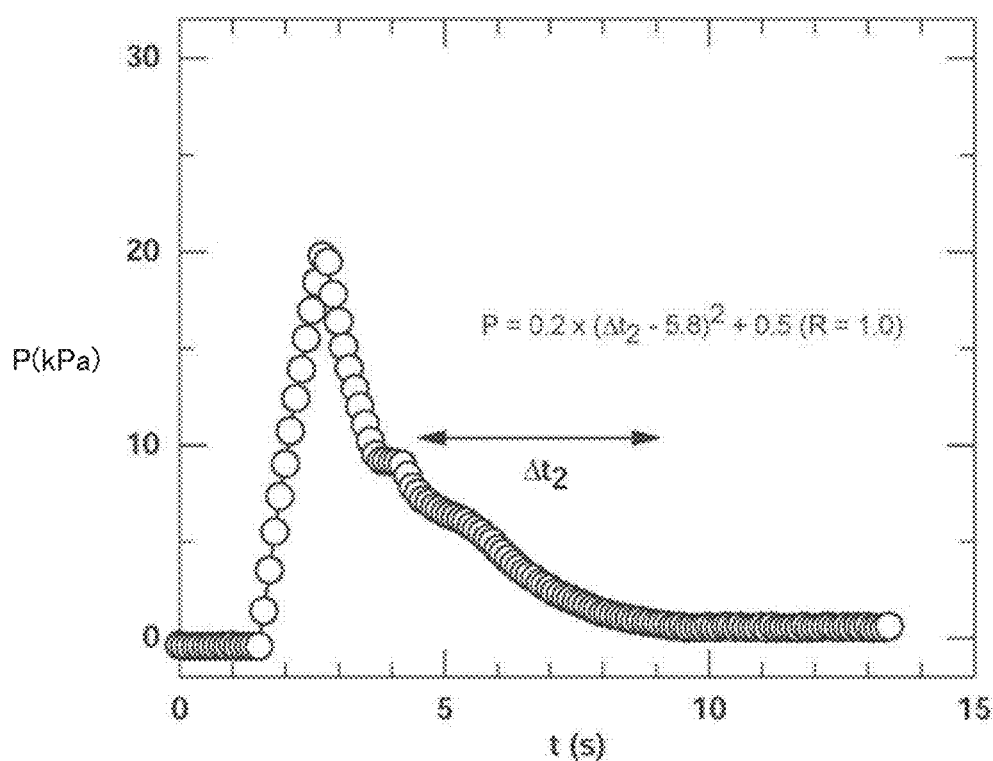
FIG. 13C shows a Pt curve obtained when a suspension containing no surfactant was used in an Example.

FIGS. 13A to 13C show the Pt curves recorded by the apparatus shown in FIG. 1. From these results, it was confirmed that, with any of the solvents, expected carrier dispersion and carrier lumping were observed and the solid-liquid separation could be achieved.

Example 12: Increase in Variety of Carrier Usable in Solid-Liquid Separation

In order to investigate whether the solid-liquid separation becomes possible if a carrier, with which the solid-liquid separation was determined to be unsuccessful, i.e., a failure, when the carrier was used in combination with a certain tube, is used together with a supporting body, the following experiment was performed.

Figure 14A:
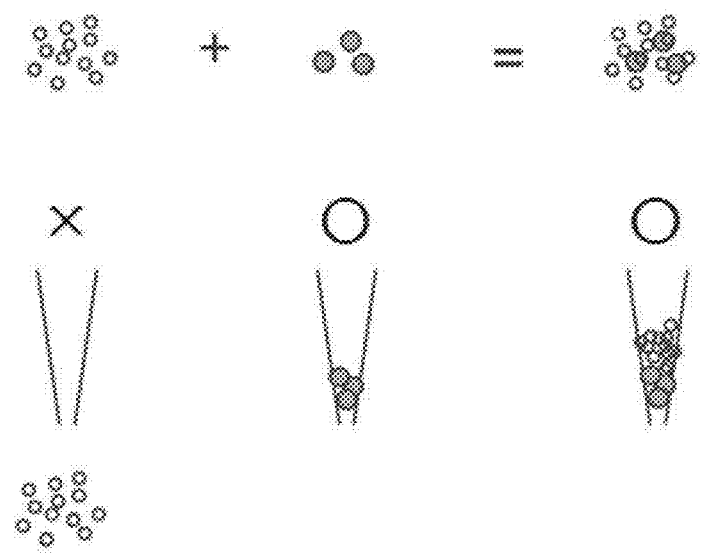
FIG. 14A is a diagram showing the concept of clogging observed when a failure carrier and a pass supporting body are used in combination in an Example.

First, carrier 10 shown in FIG. 5C was used as a failure carrier (i.e., a carrier for which the solid-liquid separation was determined as failure) with respect to the tube B, and the same carrier as carrier 2 shown in FIG. 5C was used as a pass carrier (i.e., a carrier for which the solid-liquid separation was determined as pass) (supporting body). 100 mg of carrier 10 and 10 mg of the same carrier as carrier 2 were taken by weighing into the same container as used in Example 1, and were mixed together, whereby a mixture of the carrier and the supporting body was prepared (FIG. 14A). To each of various types of carriers and the mixture, 1.5 mL of PBS was added, to obtain a mixture. With respect to the obtained various types of mixtures, the agitation step and the ejection step similar to those in Example 1 were performed, by use of the apparatus (FIG. 1) with the tube B shown in FIG. 5C connected thereto. The advance in the ejection step was performed at 25° C. (room temperature) under atmospheric pressure.

Figure 14B:
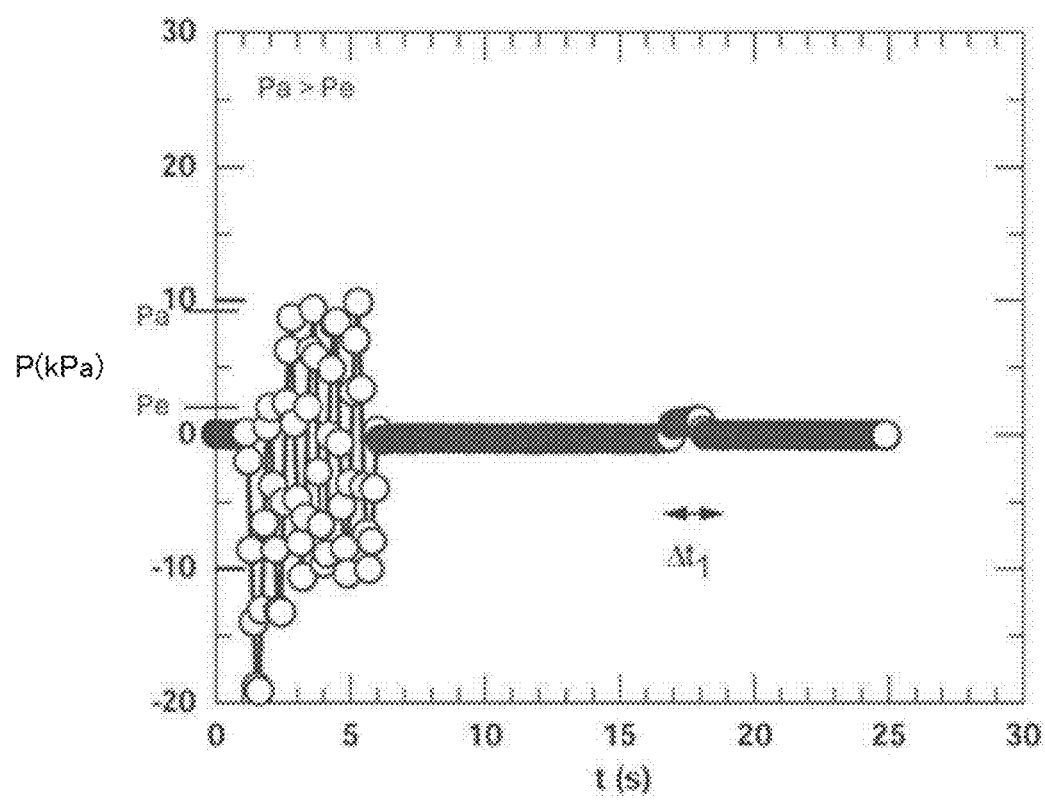
FIG. 14B shows a Pt curve obtained when a failure carrier was used in an Example.
Figure 14C:
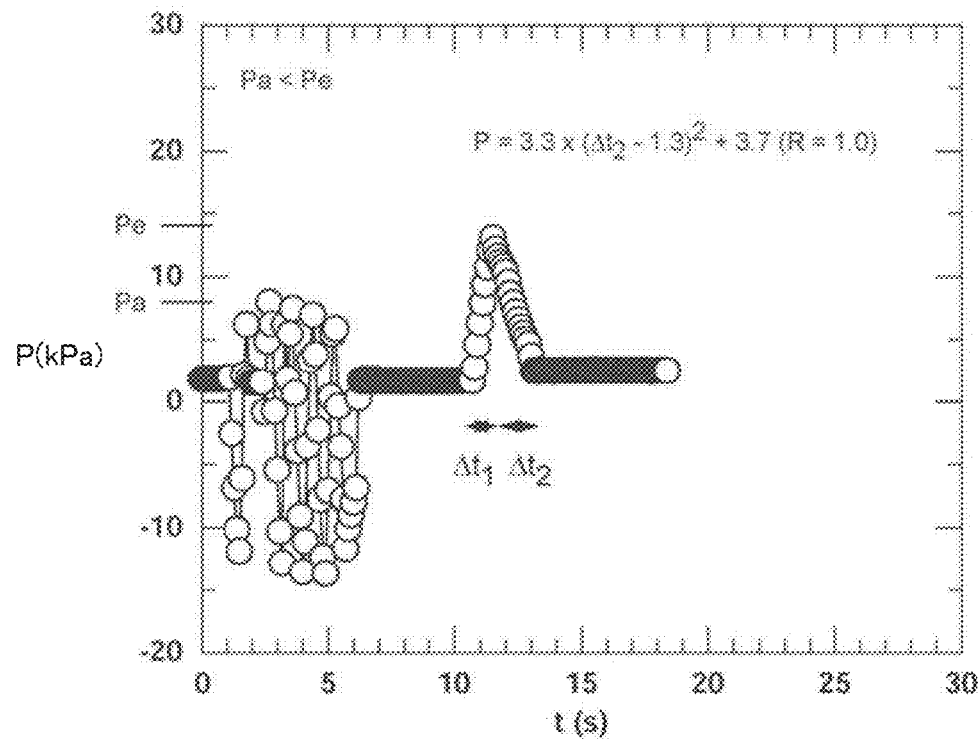
FIG. 14C shows a Pt curve observed when a pass supporting body was used singly as a carrier in an Example.
Figure 14D:
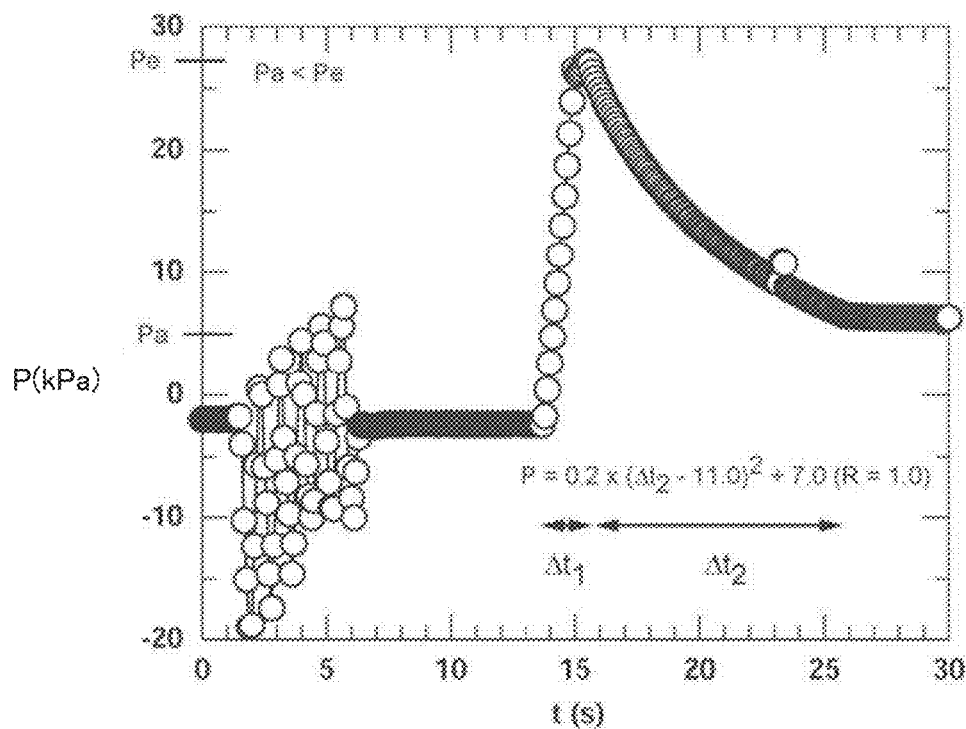
FIG. 14D shows a Pt curve observed when a failure carrier and a pass supporting body were used in combination in an Example.

FIGS. 14B to 14D show the Pt curves recorded by the apparatus shown in FIG. 1. As a result, in concordance with the determination obtained in advance, lumping was not observed with respect to the failure carrier (FIG. 14B), and the solid-liquid separation of the present disclosure was observed with respect to the pass carrier (FIG. 14C). In addition, it was confirmed that, if the mixture of the carrier and the supporting body was used, the solid-liquid separation was achieved (FIG. 14D).

It was demonstrated that even in the case of a failure carrier, if a pass carrier was added as a supporting body, the solid-liquid separation could be achieved. That is, it has been clarified that, only with a simple operation of adding a supporting body, the range of carriers that can be used in the solid-liquid separation of the present disclosure can be greatly widened.

Example 13: Purification of Adrenocorticotropic Hormone (ACTH) Peptide

It was investigated whether use of the solid-liquid separation of the present embodiment enabled removal of a salt from a liquid sample containing ACTH peptides, and recovery of the ACTH peptides as a purified fraction.

(1) Preparation of Liquid Sample that Contains TMR-ACTH Peptide

A TMR-ACTH peptide (manufactured by Scrum Inc.), obtained by labeling with tetramethylrhodamine (TMR) a partial ACTH peptide consisting of the amino acids at positions 1 to 24 of adrenocorticotropic hormone (ACTH), was used as a target molecule. ACTH is a basic peptide (isoelectric point pI=10.64) and indicated as SEQ ID NO: 1. The TMR-ACTH peptide was dissolved in PBS (manufactured by Bio-Rad Laboratories, Inc., 1610780) such that the final concentration of the TMR-ACTH peptide was 50 nM, whereby a liquid sample containing the TMR-ACTH peptide was prepared.

(2) Desalting Process (Serial Dilution Type) Performed on Liquid Sample that Contains TMR-ACTH Peptide A liquid sample containing the TMR-ACTH peptide was subjected to a desalting process through the steps shown in FIG. 15 (hereinafter, referred to as serial-dilution-type BF separation operation) using the solid-liquid separation of the present embodiment. The series of steps were performed by use of the apparatus shown in FIG. 1. A mesoporous silica carrier (manufactured by Nippon Kasei Chemical Co., Ltd.) having a pore diameter of 4 nm and having aminosilyl group modification on the surface thereof (hereinafter, referred to as aminosilyl-group-modified silica carrier) was used as the carrier. A tube of the tube B type shown in FIG. 5C and the same container as used in Example 1 were used.

Figure 15:
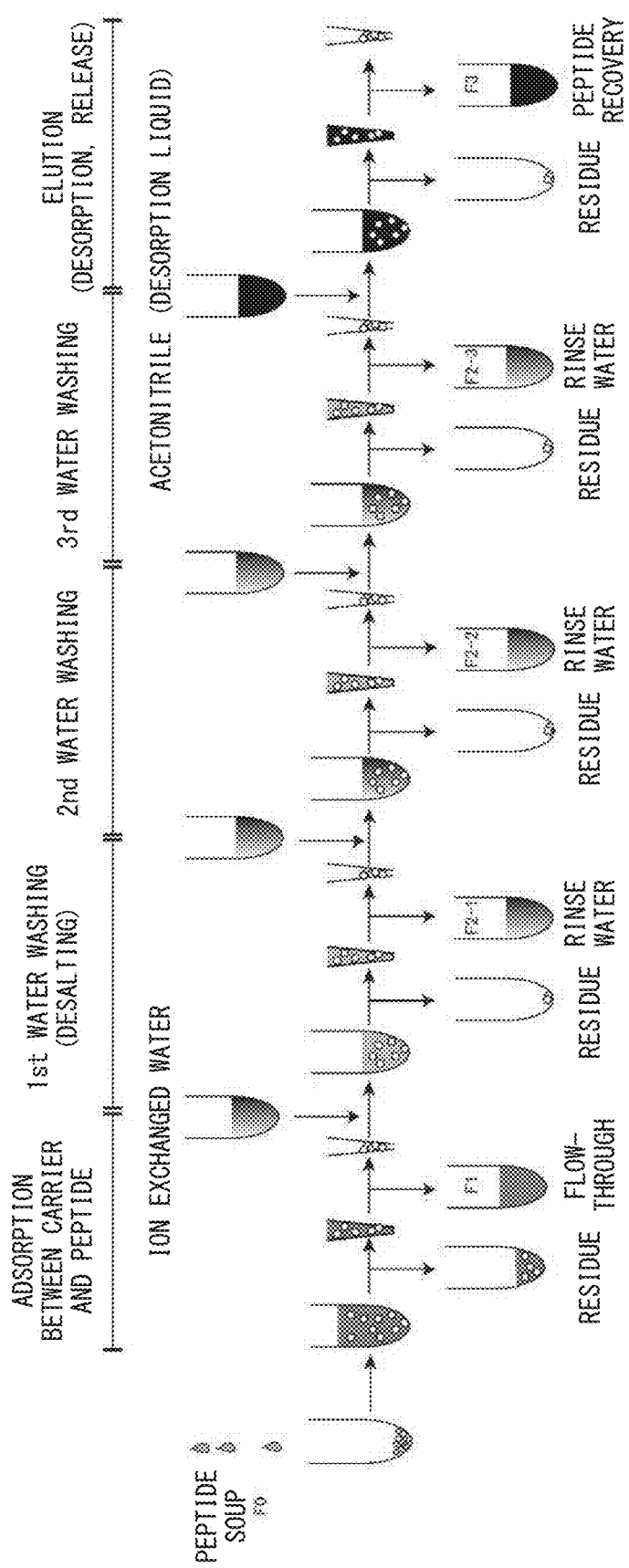
FIG. 15 is a diagram describing serial-dilution-type BF separation operation in an Example.

The steps (i) to (iii) of the serial-dilution-type BF separation operation shown in FIG. 15 are described below.

(i) Adsorption Step 1.5 mL of a liquid sample (F0) containing the TMR-ACTH peptide was added to the container storing 100 mg of the carrier. Through the agitation step, the TMR-ACTH peptide was caused to be adsorbed on the carrier, and the liquid sample containing the carrier was sucked in the tube. The tube was taken out of the container, the carrier was allowed to sediment to the mouth portion of the tube, and formation of a plug was observed. Then, through the ejection step, only the liquid was discharged. The discharged liquid was recovered as a flow-through fraction (F1).

(ii) Water Washing Step

The tube after the discharge was immersed in a container similar to that in Example 1 and storing 1 mL of ion exchanged water, and suction/ejection operation was repeated to cause agitation, whereby salts were washed off. The suspension of the carrier and the ion exchanged water was sucked in the tube, the tube was taken out of the container, the carrier was allowed to sediment to the mouth portion of the tube, and formation of a plug was observed. Then, through the ejection step, only the liquid was discharged. The discharged liquid was recovered as a rinse water fraction (F2-1). A similar water washing step was further repeated two times. In FIG. 15, the rinse water fractions obtained through the second and third water washing steps are indicated as F2-2 and F2-3, respectively.

(iii) Elution Step

The tube after the discharge was immersed in a container similar to that in Example 1 and storing 1 mL of a desorption liquid for peptide elution (elution liquid) {aqueous solution containing: 50% acetonitrile (manufactured by Wako Pure Chemical Industries, Ltd., 019-21691); and 0.1% trifluoroacetic acid (manufactured by Wako Pure Chemical Industries, Ltd., 206-10731)}, agitation was caused, and the peptide adsorbed on the carrier was eluted. The suspension of the carrier and the desorption liquid was sucked in the tube, the tube was taken out of the container, the carrier was allowed to sediment to the mouth portion of the tube, and formation of a plug was observed. Then, through the ejection step, only the liquid was discharged. The discharged liquid was recovered as a purified fraction (F3).

(3) Measurement of Electric Conductivity

With respect to the liquid sample (F0) before the desalting process and the purified fraction (F3) after the desalting process, electric conductivity was measured. Twin Cond B-173 (HORIBA, Ltd.) was used as an electric conductivity meter. Here, the solvent before the desalting process was water, while the solvent after the desalting process was a 50% acetonitrile/0.1% TFA solution. Thus, the electric conductivity value after the desalting process was shown as a value obtained by subtracting the electric conductivity value (2.0 mS/cm) of the 50% acetonitrile/0.1% TFA solution from the measured value.

From the obtained electric conductivities, the desalting efficiency brought by the present desalting process was calculated according to formula 1 below.

Desalting efficiency (%)=(Electric conductivity before desalting process−Electric conductivity after desalting process)/(Electric conductivity before desalting process)×100    formula 1

Table 5 below shows the electric conductivity and the desalting efficiency. The electric conductivity of F3 had a negative value because the electric conductivity (2.0 mS/cm) of the acetonitrile was subtracted. The value before the subtraction was 1.72 mS/cm.

TABLE 5

| Fraction | Electric conductivity (mS/cm) | Desalting efficiency (%) |
|---|---|---|
| Before desalting process (F0) | 10.1 | — |
| After desalting process (F3) | −0.28 | 100 |

(4) Measurement of Fluorescence Intensity

With respect to the liquid sample (F0) before the desalting process and the purified fraction (F3) after the desalting process, fluorescence intensity was measured. As a spectrofluorometer, F-7000 (Hitachi High-Technologies Corporation) was used and the fluorescence intensity at an excitation wavelength of 480 nm and a fluorescence wavelength of 580 nm was measured.

From the obtained fluorescence intensities, the peptide recovery rate brought by the present desalting process was calculated according to formula 2 below.

Peptide recovery rate (%)=(Fluorescence intensity after desalting process)/(Fluorescence intensity before desalting process)×100    formula 2

Figure 16:
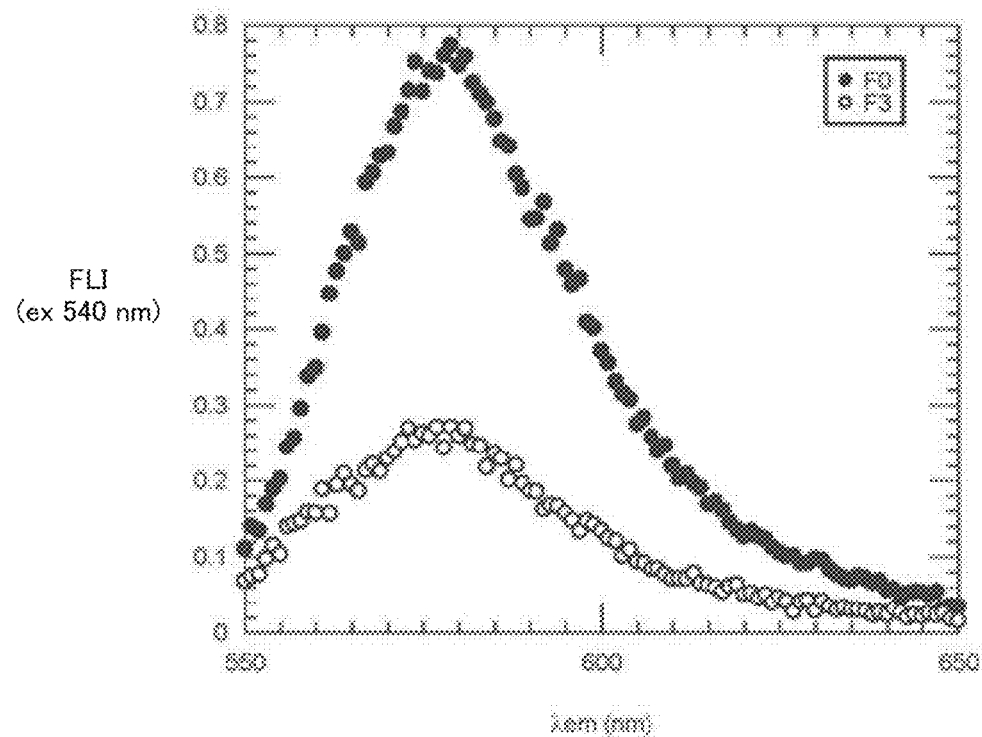
FIG. 16 shows a result of fluorescence intensity measurement in Example 13.

FIG. 16 shows fluorescence spectra, and Table 6 below shows the fluorescence intensity and the peptide recovery rate.

TABLE 6

| Fraction | Fluorescence intensity (ex 480 nm/em 580 nm) | Peptide recovery rate (%) |
|---|---|---|
| Before desalting process (F0) | 0.747 | 100 |
| After desalting process (F3) | 0.259 | 35 |

As shown in Table 5, the purified fraction F3 was sufficiently desalted by the BF separation operation. In addition, as shown in Table 6, from the purified fraction F3 after the desalting process, fluorescence due to TMR was observed, and the TMR-ACTH peptide was contained in the purified fraction F3. From these results, it has been clarified that, through the serial-dilution-type BF separation operation using the solid-liquid separation of the present embodiment, salts in the liquid sample can be removed and the ACTH peptide can be recovered as a purified fraction.

Example 14: Purification of Carcinoembryonic Antigen (CEA) Peptide

It was investigated whether use of the solid-liquid separation of the present embodiment enabled removal of salts from a liquid sample containing CEA peptides, and recovery of the CEA peptides as a purified fraction.

(1) Preparation of Liquid Sample that Contains TMR-CEA Peptide

A TMR-CEA peptide (manufactured by Scrum Inc.), obtained by labeling with TMR a partial CEA peptide consisting of the amino acids at positions 132 to 171 of carcinoembryonic antigen (CEA), was used as a target molecule. CEA is an acidic peptide (isoelectric point pI=4.38) and indicated as SEQ ID NO: 2. The TMR-CEA peptide was dissolved in PBS such that the final concentration of the TMR-CEA peptide was 2.5 µM, whereby a liquid sample containing the TMR-CEA peptide was prepared.

(2) Desalting Process Performed on Liquid Sample that Contains TMR-CEA Peptide

The desalting process was performed in a similar manner to that in Example 13 through the serial-dilution-type BF separation operation shown in FIG. 15, except that: a liquid sample prepared in (1) above and containing the TMR-CEA peptide was used instead of the liquid sample containing the TMR-ACTH peptide; and a mesoporous silica carrier (manufactured by Nippon Kasei Chemical Co., Ltd.; trade name: Mesopure; carrier name "1" in FIG. 5A) having a pore diameter of 4 nm and having octadecylsilyl group (ODS) modification on the surface thereof (ODS-modified silica carrier) was used as the carrier.

(3) Measurement of Electric Conductivity

With respect to the liquid sample F0 before the desalting process and the purified fraction F3 after the desalting process, electric conductivity was measured by a method similar to that in Example 13. From the obtained electric conductivities, the desalting efficiency brought by the present desalting process was calculated according to formula 1 shown in Example 13. Table 7 below shows the electric conductivity and the desalting efficiency. The electric conductivity of F3 became zero because the electric conductivity (2.0 mS/cm) of the acetonitrile was subtracted. The value before the subtraction was 2 mS/cm.

TABLE 7

| Fraction | Electric conductivity (mS/cm) | Desalting efficiency (%) |
| --- | --- | --- |
| Before desalting process (F0) | 8.9 | — |
| After desalting process (F3) | 0.0 | 100 |

(4) Measurement of Fluorescence Intensity

With respect to the liquid sample F0 before the desalting process and the purified fraction F3 after the desalting process, fluorescence intensity at an excitation wavelength of 480 nm and a fluorescence wavelength of 580 nm was measured by a method similar to that in Example 13. From the obtained fluorescence intensities, the peptide recovery rate brought by the present desalting process was calculated according to formula 2 shown in Example 13.

Figure 17:
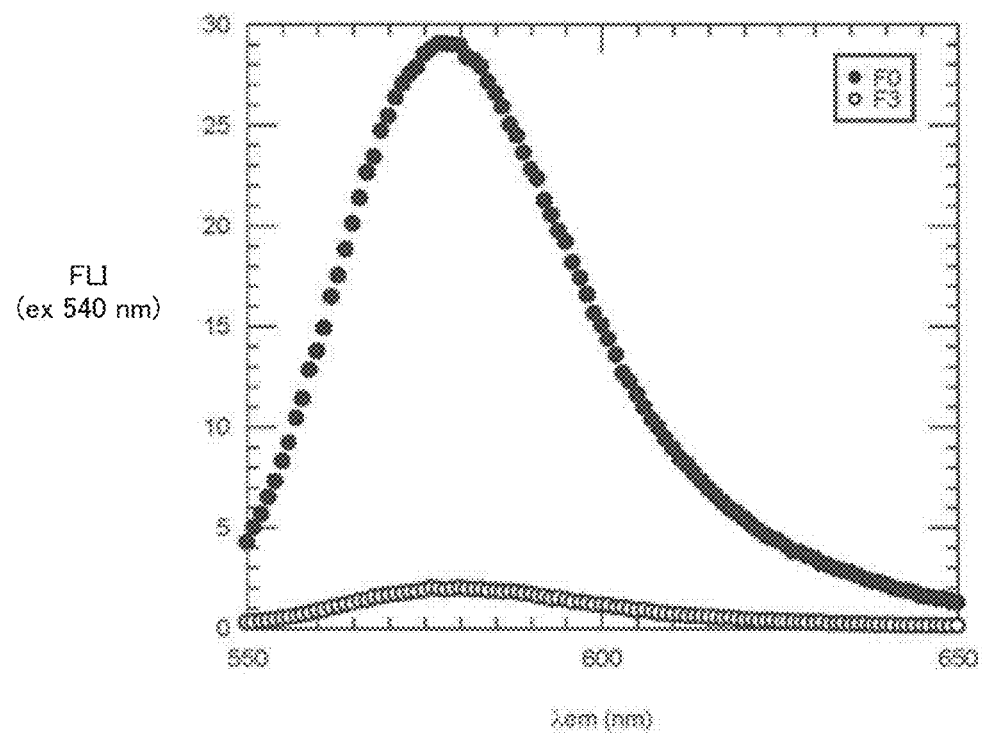
FIG. 17 shows a result of fluorescence intensity measurement in Example 14.

FIG. 17 shows fluorescence spectra, and Table 8 below shows the fluorescence intensity and the peptide recovery rate.

TABLE 8

| Fraction | Fluorescence intensity (ex 480 nm/em 580 nm) | Peptide recovery rate (%) |
| --- | --- | --- |
| Before desalting process (F0) | 28.92 | 100 |
| After desalting process (F3) | 2.007 | 6.9 |

As a result, as shown in Table 7, the purified fraction F3 was sufficiently desalted by the BF separation operation. In addition, as shown in Table 8, from the purified fraction F3 after the desalting process, fluorescence due to TMR was observed, and the TMR-CEA peptide was contained in the purified fraction F3. From these results, it has been clarified that, through the serial-dilution-type BF separation operation using the solid-liquid separation of the present embodiment, salts in the liquid sample can be removed and the CEA peptide can be recovered as a purified fraction.

Example 15: Selective Purification of Peptide

By use of a carrier having higher affinity to ACTH than to BNP, difference between the recovery rates, from a liquid sample containing ACTH and BNP peptides, of BNP and of ACTH in a purified fraction by the BF separation operation using the solid-liquid separation of the present embodiment was investigated.

(1) Preparation of Liquid Sample that Contains Peptide Mixture

The TMR-ACTH peptide and a brain natriuretic peptide (BNP) (manufactured by Scrum Inc.) were used as target molecules. BNP is a basic peptide (isoelectric point pI=10.95), and indicated as SEQ ID NO: 3. The TMR-ACTH peptide and the BNP peptide were dissolved in PBS such that the final concentration of the TMR-ACTH peptide was 5 µM, and the final concentration of the BNP peptide was 100 µM, whereby a liquid sample containing a peptide mixture was prepared.

(2) BF Separation Process for Separating Target Peptide from Liquid Sample that Contains Peptide Mixture The liquid sample containing the peptide mixture was subjected to a BF separation process according to a method similar to that in Example 13. The ODS-modified silica carrier was used as the carrier.

(3) Detection of Peptide

An SDS-polyacrylamide gel electrophoresis (SDS-PAGE) was performed on the fractions before and after the BF separation process [before BF separation process (F0), flow-through fraction in BF separation process step (F1), rinse water fraction {F2: obtained by mixing equivalences of three rinse water fractions (F2-1, F2-2, and F2-3)}, and purified fraction (F3) after BF separation process]. Specifically, each of the fractions above and a sample buffer (no reductant added), which was a 1:1 mixture of 10× Loading Buffer (TAKARA BIO INC.) and a 60% (w/w) glycerol solution, were mixed together, and electrophoresis was performed on each of the resultant mixtures at 200 V (constant voltage) for 30 minutes by use of NuPAGE 4-12% Bis-Tris Gel and NuPAGE MES SDS Running Buffer (both manufactured by Life Technologies Corporation). X-Cell Sure Lock Minicell (Life Technologies Corporation) was used as the electrophoresis chamber, and Power Station 1000XP (ATTO Corporation) was used as the power supply apparatus. With respect to the gel after the electrophoresis, the TMR-ACTH peptide was detected by use of a fluorescence imager Pharos FX system (Bio-Rad Laboratories, Inc.).

The BNP peptide was detected by silver staining. For silver staining, a silver staining kit "EZStainSilver" (ATTO Corporation) was used. The steps of staining are as follows.

Fixing: shaking with 100 mL of a fixative solution {40 mL of ultrapure water+50 mL of methanol (Wako Pure Chemical Industries, Ltd.)+10 mL of acetic acid (Wako Pure Chemical Industries, Ltd.)+1 mL from kit bottle S-1} for 10 minutes;

washing: shaking with 100 mL of ultrapure water for 10 minutes, three times;

staining: shaking with a stain solution (100 mL of ultrapure water+1 mL from kit bottle S-2) for 10 minutes;

washing: shaking with 100 mL of ultrapure water for 30 seconds and shaking with 100 mL of a coloring liquid (200 mL of ultrapure water+1 mL from kit bottle S-3+1 mL from kit bottle S-4) for 30 seconds;

coloring: shaking with 100 mL of a coloring liquid for 5 to 10 minutes;

terminating: shaking with 100 mL of stop solution (100 mL of ultrapure water+1 mL of acetic acid) for 10 minutes; and washing: shaking with 100 mL of ultrapure water for 5 minutes, twice.

In vitro shaker Wave-SI (TAITEC CORPORATION) was used as the shaker.

With respect to a gel fluorescence image and a gel silver stain image, the densitometry value of the band of the TMR-ACTH peptide or the BNP peptide was obtained, by use of image processing software ImageJ 1.46r (NIH), and the recovery rate was calculated according to formula 3 below.

Recovery rate (%)=(Densitometry value in each fraction)/Densitometry value before BF separation process)×100          formula 3

Figure 18:
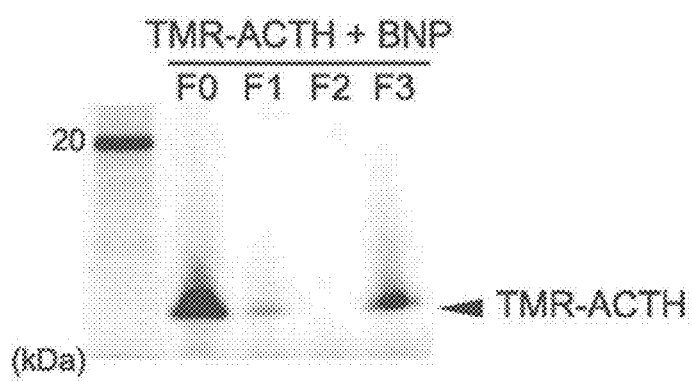
FIG. 18 is a photograph of gel fluorescence imaging in Example 15.
Figure 19:
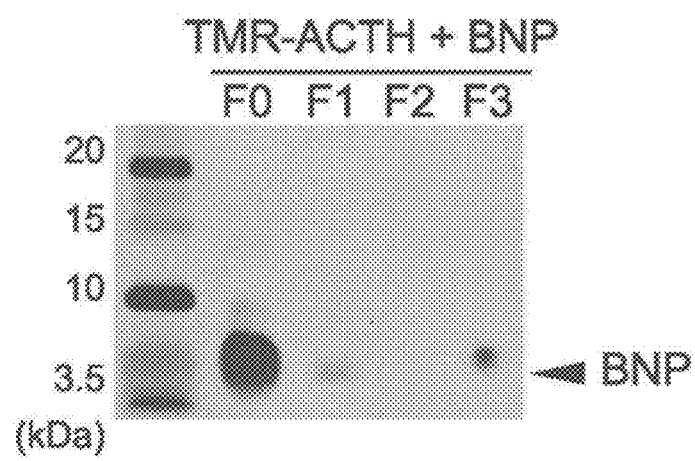
FIG. 19 is a photograph of silver staining in Example 15.

FIG. 18 and FIG. 19 show the gel fluorescence image and the gel silver stain image, and Table 9 shows the recovery rates of the TMR-ACTH peptide and the BNP peptide.

TABLE 9

| | Recovery rate (%) | |
|---|---|---|
| Fraction | TMR-ACTH peptide | BNP peptide |
| Before BF separation process (F0) | 100 | 100 |
| Flow-through fraction (F1) | 9 | 9 |
| Rinse water fraction (F2) | 0 | 3 |
| Purified fraction (F3) | 46 | 13 |

As a result, it was shown that, through the serial-dilution-type BF separation operation using the solid-liquid separation of the present embodiment, ACTH could be selectively recovered as a purified fraction relative to BNP from the liquid sample containing ACTH and BNP peptides, in accordance with the difference in the affinity of the carrier to ACTH and to BNP.

Example 16: Selective Purification of Peptide

By use of a carrier having high affinity to ACTH and low affinity to λDNA, it was investigated whether ACTH could be selectively recovered as a purified fraction from a liquid sample containing ACTH and λDNA, through BF separation operation using the solid-liquid separation of the present disclosure.

(1) Preparation of Liquid Sample that Contains Peptide and Nucleic Acid

The TMR-ACTH peptide was used as a target molecule. λDNA being a linear nucleic acid derived from bacteriophage λ and having 48,502 bp (manufactured by TAKARA BIO INC., model: 3010) was used as a contaminant. The TMR-ACTH peptide and λDNA were dissolved in PBS such that the final concentration of the TMR-ACTH peptide was 5 μM and the final concentration of λDNA was 50 μg/mL, whereby a liquid sample containing the peptide and the nucleic acid was prepared.

(2) BF Separation Process for Separating Peptide from Liquid Sample that Contains Peptide and Nucleic Acid The liquid sample containing the peptide and the nucleic acid was subjected to a BF separation process according to a method similar to that in Example 13. A mesoporous silica carrier having a pore diameter of 4 nm and not having any chemical modification, i.e., an unmodified silica carrier having a silanol group on the member surface (manufactured by Nippon Kasei Chemical Co., Ltd.), was used as the carrier.

(3) Detection of Peptide and Nucleic Acid

An SDS-PAGE or an agarose gel electrophoresis was performed on the fractions before and after the BF separation process [before BF separation process (F0), flow-through fraction in BF separation process step (F1), rinse water fraction {F2: obtained by mixing equivalences of three rinse water fractions (F2-1, F2-2, and F2-3)}, and purified fraction (F3) after BF separation process]. The SDS-PAGE was performed by a method similar to that in Example 15. As for the agarose gel electrophoresis, specifically, an agarose (TAKARA BIO INC.) and a Tris-acetate-EDTA (TAE) buffer (Wako Pure Chemical Industries, Ltd.) were mixed together, and the mixture was heated to be dissolved, and then, solidified in a gel tray (Mupid), whereby a 1% agarose gel was made. Each of the fractions above and 6× Loading Buffer (TAKARA BIO INC.) were mixed together, and electrophoresis was performed at 100 V (constant voltage) for 40 minutes by use of the prepared 1% agarose gel and the TAE buffer. Mupid-2plus (Mupid) was used as the electrophoresis chamber equipped with a power supply apparatus. With respect to the gel after the electrophoresis, λDNA was stained with a nucleic acid fluorescence stain SYBR Green II (Lonza Japan Ltd.), and a fluorescence imager Image Quant LAS4000 (GE Healthcare Japan) was used to perform detection. Staining of λDNA was performed by shaking the gel in a 1×SYBR Green II/TAE buffer for 60 minutes. In vitro shaker Wave-SI was used as the shaker.

With respect to gel fluorescence images, the recovery rates of the TMR-ACTH peptide and λDNA were calculated by a method similar to that in Example 15.

Figure 20:
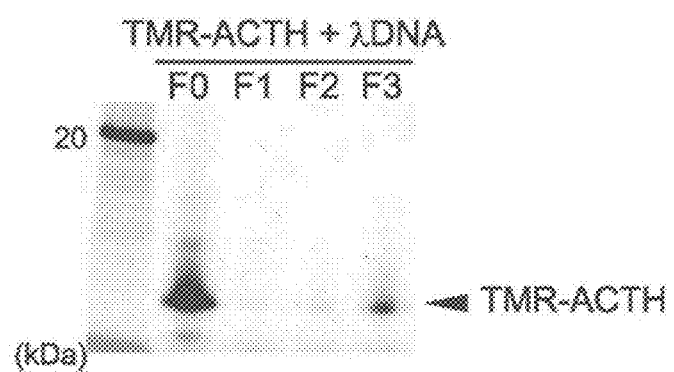
FIG. 20 is a photograph of gel fluorescence imaging in Example 16.
Figure 21:
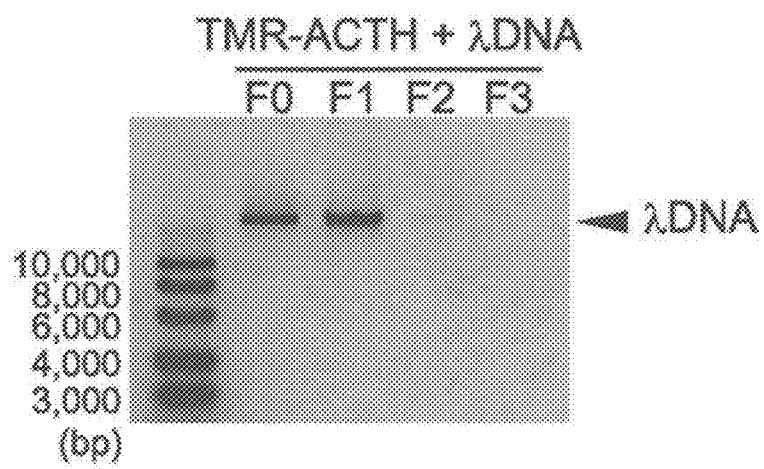
FIG. 21 is a photograph of silver staining in Example 16.

FIG. 20 and FIG. 21 show the gel fluorescence images, and Table 10 below shows the recovery rates of the TMR-ACTH peptide and λDNA.

TABLE 10

| | Recovery rate (%) | |
|---|---|---|
| Fraction | TMR-ACTH peptide | λDNA |
| Before BF separation process (F0) | 100% | 100% |
| Flow-through fraction (F1) | 1% | 98% |

TABLE 10-continued

| Fraction | Recovery rate (%) | |
| --- | --- | --- |
| | TMR-ACTH peptide | λDNA |
| Rinse water fraction (F2) | 2% | 22% |
| Purified fraction (F3) | 23% | 6% |

As a result, it was shown that, through the BF separation operation using the solid-liquid separation of the present embodiment, ACTH could be selectively recovered as a purified fraction from a liquid sample containing the ACTH peptide and λDNA.

Example 17: Purification of Peptide from Blood Sample

It was investigated whether salts could be removed from a peptide liquid (hereinafter, also referred to as peptide soup) obtained by processing whole blood in accordance with the method described in Japanese Laid-Open Patent Publication No. 2015-140320, and whether peptides could be taken out as a purified fraction.

(1) Preparation of Liquid Sample that Contains Peptide and Whole Blood

A TMR-partial ACTH peptide (Biologica Co, Ltd.), obtained by labeling with a red fluorescent dye tetramethylrhodamine (TMR) a partial ACTH peptide consisting of the amino acids at positions 1 to 24 of ACTH, was used as a target molecule. Blood (whole blood), of a healthy volunteer, having an anticoagulant EDTA salt added therein was purchased from PROMEDDX and used as a contaminant. In accordance with the method described in Japanese Laid-Open Patent Publication No. 2015-140320, the TMR-partial ACTH peptide and the whole blood were dissolved in a tris-phosphoric acid buffer containing zinc chloride (Tris-HCl [pH=7.0] (final concentration: 100 mM), sodium phosphate (final concentration: 0.4 mM), NaCl (final concentration: 6 mM), and $ZnCl_2$ (final concentration: 100 mM)) such that the final concentration of the TMR-ACTH peptide was 5 μM and the whole blood was 3-fold diluted, whereby a liquid sample containing the peptide and the whole blood was prepared.

(2) Heat Treatment of Liquid Sample that Contains Peptide and Whole Blood 1.4 mL of the liquid sample containing the peptide and the whole blood was transferred to a 10-mL glass test tube. Then, the tube was sealed with a pressure resistant sealing holder for test tubes (Milestone General K.K.) made of Teflon (registered trade mark), and was placed in a microwave applicator MultiSYNTH (Milestone General K.K.). Then, heat treatment was performed by increasing the temperature from room temperature (25° C.) to 100° C. for 30 seconds, and then increasing the temperature from 100° C. to 160° C. for 1 minute. Cooling after the heat treatment was performed by blowing compressed air to the pressure resistant sealing holder from an air compressor YC-3R (YAEZAKI KUATSU CO., LTD.) connected to the microwave applicator. The cooling rate was set to 20° C./minute. The peptide soup as the supernatant fraction after the heat treatment (hereinafter, heat-treated supernatant) was recovered.

(3) Desalting Process for Heat-Treated Supernatant of Liquid Sample that Contains Peptide and Whole Blood The heat-treated supernatant (peptide soup) of the liquid sample containing the peptide and the whole blood was subjected to a desalting process according to a BF separation operation similar to that in Example 13. The ODS-modified silica carrier was used as the carrier.

(4) Measurement of Electric Conductivity

With respect to the fractions before and after the desalting process {before desalting process (F0), flow-through fraction in desalting process step (F1), rinse water fractions (F2-1, F2-2, F2-3), and purified fraction (F3) after desalting process}, electric conductivity was measured by a method similar to that in Example 13, and the desalting efficiency brought by the present desalting process was calculated.

Table 11 below shows the electric conductivity and the desalting efficiency.

TABLE 11

| Fraction | Electric conductivity (mS/cm) | Desalting efficiency (%) |
| --- | --- | --- |
| Before desalting process (F0) | 214 | — |
| Flow-through fraction (F1) | 50 | — |
| Rinse water fraction (F2-1) | 12.3 | — |
| Rinse water fraction (F2-2) | 1.1 | — |
| Rinse water fraction (F2-3) | 0.1 | — |
| Purified fraction (F3) | 2.4 | 98.9 |

(5) Measurement of Fluorescence Intensity

With respect to the fractions before and after the desalting process {before desalting process (F0), flow-through fraction in desalting process step (F1), rinse water fractions (F2-1, F2-2, F2-3), and purified fraction (F3) after desalting process}, fluorescence intensity was measured by a method similar to that in Example 13, and the peptide recovery rate brought by the present desalting process was calculated. In the fluorescence intensity measurement, for detection of the TMR-ACTH peptide, the excitation wavelength was set to 540 nm and the fluorescence wavelength was set to 580 nm, and for detection of the whole-blood-derived peptide, the excitation wavelength was set to 287 nm and the fluorescence wavelength was set to 350 nm.

Figure 22:
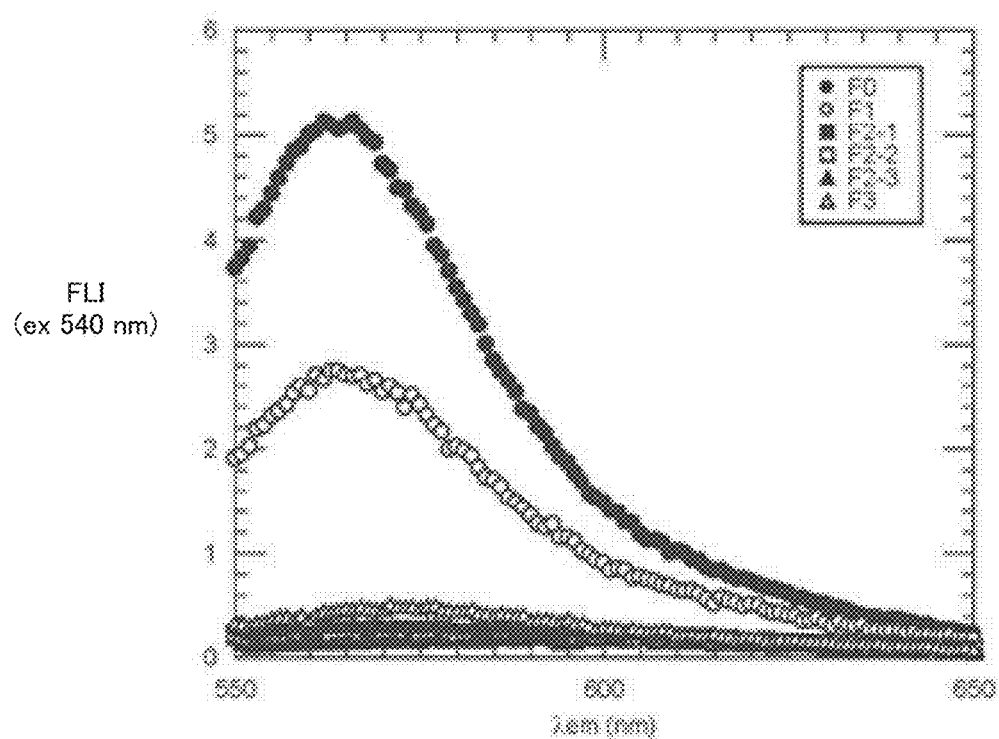
FIG. 22 shows a result of measurement of fluorescence intensity of TMR-partial ACTH peptide in Example 17.
Figure 23:
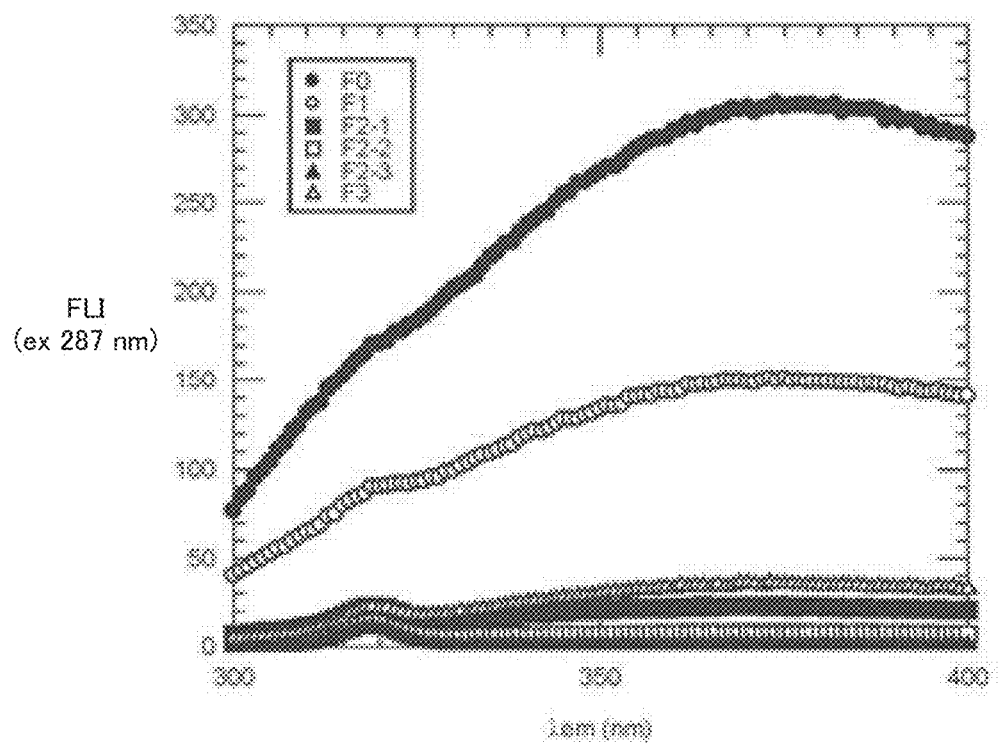
FIG. 23 shows a result of measurement of fluorescence intensity of whole-blood-derived peptide in Example 17.

FIG. 22 and FIG. 23 show fluorescence spectra, and Table 12 below shows the fluorescence intensity and the peptide recovery rate.

TABLE 12

| | TMR-ACTH peptide | | Whole-blood-derived peptide | |
| --- | --- | --- | --- | --- |
| Fraction | Fluorescence intensity (ex 540 nm/em 580 nm) | Recovery rate (%) | Fluorescence intensity (ex 287 nm/em 350 nm) | Recovery rate (%) |
| Before desalting process (F0) | 3.535 | 100 | 267.8 | 100 |
| Flow-through fraction (F1) | 2.014 | 57.0 | 141.2 | 52.7 |
| Rinse water fraction (F2-1) | 0.193 | 5.5 | 20.35 | 7.6 |
| Rinse water fraction (F2-2) | 0.236 | 6.7 | 6.718 | 2.5 |
| Rinse water fraction (F2-3) | 0.284 | 8.0 | 2.444 | 0.9 |
| Purified fraction (F3) | 0.451 | 12.8 | 30.86 | 11.5 |

As a result, it was shown that, through the serial-dilution-type BF separation operation using the solid-liquid separation of the present disclosure, salts could be removed from the liquid prepared from whole blood in accordance with the method described in Japanese Laid-Open Patent Publication No. 2015-140320, and the peptides derived from ACTH and whole blood could be recovered as purified fractions.

Example 18: Purification of TMR-ACTH Peptide Using Various Carriers

By use of three kinds of carriers having been confirmed to have high affinity to ACTH, it was investigated whether salts in a liquid obtained through heat treatment in the reagent described in Japanese Laid-Open Patent Publication No. 2015-137978 could be removed through a BF separation operation using the solid-liquid separation of the present disclosure. Further, difference among recovery rates brought by the three kinds of carriers was investigated.

(1) Preparation of Liquid Sample that Contains Peptide and Whole Blood

The TMR-ACTH peptide was used as a target molecule. Whole blood similar to that in Example 17 was used as a contaminant. The TMR-ACTH peptide and the whole blood were dissolved in a 0.5×phosphate-buffered saline containing glycine (0.5×PBS [pH=7.4], sodium chloride (final concentration: 68.5 mM), disodium hydrogenphosphate (final concentration: 4 mM), potassium chloride (final concentration: 1.3 mM), potassium dihydrogenphosphate (final concentration: 0.7 mM), and glycine (final concentration: 500 mM)), whereby a liquid sample containing the peptide and the whole blood was prepared.

(2) Heat Treatment of Liquid Sample that Contains Peptide and Whole Blood

Heat treatment was performed on the liquid sample containing the peptide and the whole blood by a method similar to that in Example 17, the resultant liquid sample was further held as it was, at 160° C. for 60 seconds, and then the supernatant fraction after the heat treatment was recovered.

Figure 24:
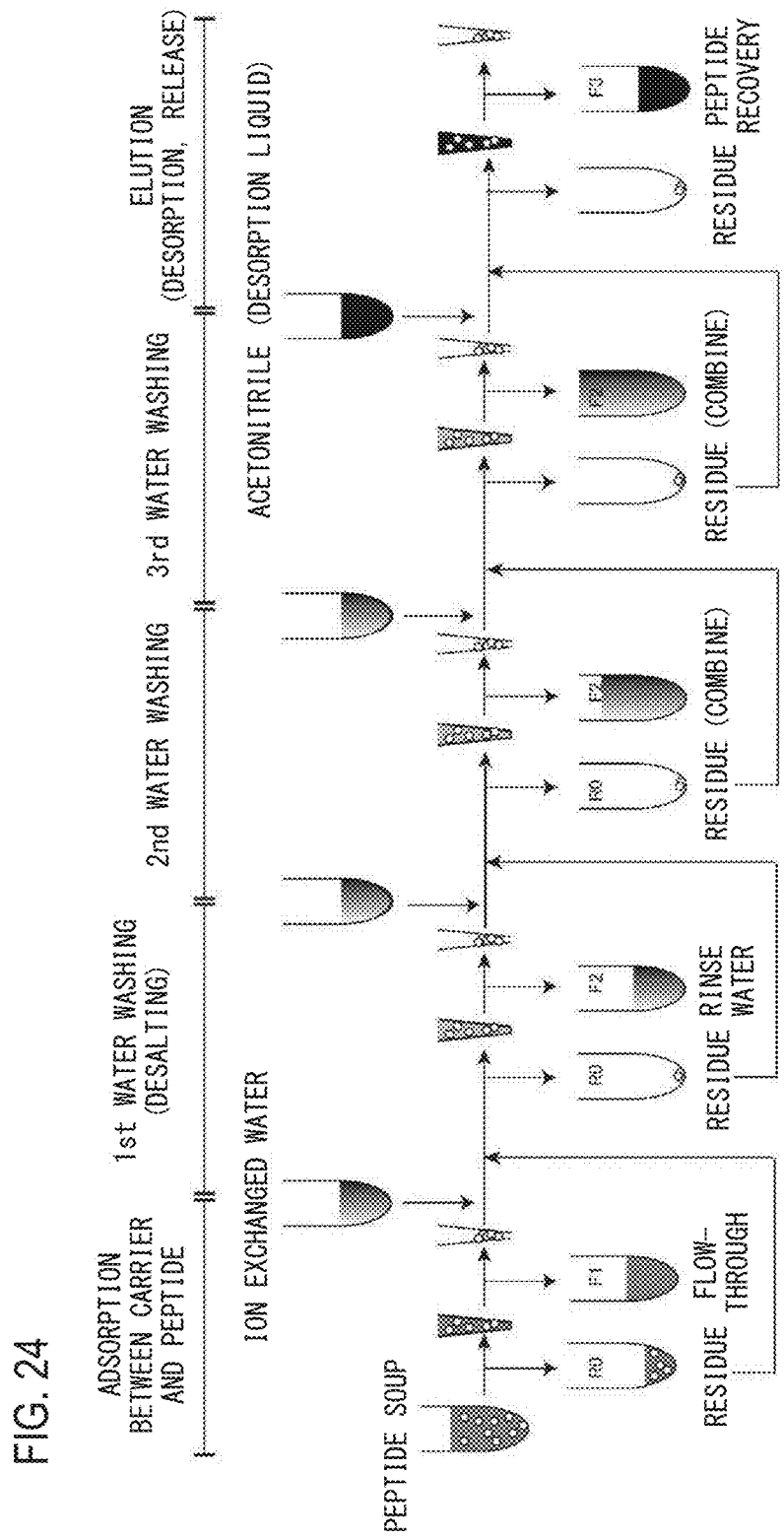
FIG. 24 is a diagram describing retention-back-type BF separation operation.

(3) Desalting Process (Retention-Back-Type) for Heat-Treated Supernatant of Liquid Sample that Contains Peptide and Whole Blood The heat-treated supernatant of the liquid sample containing the peptide and the whole blood was subjected to a desalting process through the steps shown in FIG. 24 (hereinafter, referred to as retention-back-type BF separation operation) using the solid-liquid separation of the present embodiment. The series of steps were performed by use of the apparatus shown in FIG. 1. The unmodified silica carrier, the ODS-modified silica carrier, or the aminosilyl-group-modified silica carrier was used as the carrier. The tube B1 type (opening diameter: 1.34 mm) shown in FIG. 5C was used as the tube, and a container similar to that in Example 1 was used as the container. FIG. 24 shows a schematic diagram showing the series of steps and the names of fractions produced in the steps.

The steps (i) to (iii) of the retention-back-type BF separation operation shown in FIG. 24 are described below.

(i) Adsorption Step 1.5 mL of a liquid sample (F0) containing the TMR-ACTH peptide and the whole blood was added to the container similar to that in Example 1 and storing 100 mg of the carrier. The mixture was agitated to cause the TMR-ACTH peptide to be adsorbed on the carrier, and the liquid sample containing the carrier was sucked in the tube. The liquid sample containing the carrier remaining by a small amount in the container after the liquid sample containing the carrier had been sucked was defined as a residue (R0). The tube was taken out of the container and caused to stand still, the carrier was allowed to sediment to the mouth portion of the tube, and formation of a plug was observed. Then, the solvent was discharged. The discharged solvent was recovered as a flow-through fraction (F1).

(ii) Water Washing Step 1 mL of ion exchanged water for water washing was added to the above-described residue (R0), and then, the carrier forming the plug in the tube was agitated in the ion exchanged water, whereby salts were washed off. The agitated liquid was sucked in the tube, the tube was taken out of the container and caused to stand still, the carrier was allowed to sediment to the mouth portion of the tube, and formation of a plug was observed. Then, the solvent was discharged. The discharged solvent was recovered as a rinse water fraction (F2). The ion exchanged water containing the carrier remaining by a small amount in the 1.5 mL container after the ion exchanged water containing the carrier had been sucked was defined as a residue (R0). A similar water washing step was further repeated twice.

(iii) Elution Step 1 mL of a desorption liquid for peptide elution was added to the residue (R0) finally obtained through the above water washing steps, and then, the carrier was agitated in the desorption liquid, whereby the peptide adsorbed on the carrier was eluted. The mixed liquid of the carrier and the desorption liquid was sucked in the tube, the tube was taken out of the container and caused to stand still, and the carrier was allowed to sediment to the mouth portion of the tube, and formation of a plug was observed. Then, the solvent was discharged. The discharged liquid was recovered as a purified fraction (F3).

(4) Measurement of Electric Conductivity

With respect to the fractions before and after the desalting process {before desalting process (F0) and purified fraction (F3) after the desalting process} using the unmodified silica carrier, the ODS-modified silica carrier, or the aminosilyl-group-modified silica carrier, electric conductivity was measured by a method similar to that in Example 13. Table 13 below shows the electric conductivity. The electric conductivity of F3 had a negative value because the electric conductivity (2.0 mS/cm) of the acetonitrile was subtracted. The value before the subtraction was 1.18 mS/cm.

TABLE 13

| Fraction | Electric conductivity (mS/cm) | | |
|---|---|---|---|
| | Unmodified silica carrier | ODS-modified silica carrier | Aminosilyl-group-modified silica carrier |
| Before desalting process (F0) | 2.1 | 2.1 | 1.3 |
| After desalting process (F3) | 0.76 | 0.44 | −0.82 |

(5) Measurement of Fluorescence Intensity

With respect to the fractions before and after the desalting process {before desalting process (F0) and purified fraction (F3) after desalting process} using the unmodified silica carrier, the ODS-modified silica carrier, or the aminosilyl-group-modified silica carrier, fluorescence intensity was measured by a method similar to that in Example 13, and the peptide recovery rate was calculated.

In the fluorescence intensity measurement, for detection of the TMR-ACTH peptide, the excitation wavelength was set to 540 nm and the fluorescence wavelength was set to 580 nm, and for detection of the whole-blood-derived peptide, the excitation wavelength was set to 287 nm and the fluorescence wavelength was set to 350 nm.

From the calculated peptide recovery rates, difference in the ratio of the recovery rate of the TMR-ACTH peptide to the recovery rate of the whole-blood-derived peptide after the present desalting process was calculated in accordance with formula 4 below.

Ratio of recovery rates of TMR-ACTH peptide/ whole-blood-derived peptide=(Recovery rate of TMR-ACTH peptide)/(recovery rate of whole-blood-derived peptide)   formula 4

Figure 25:
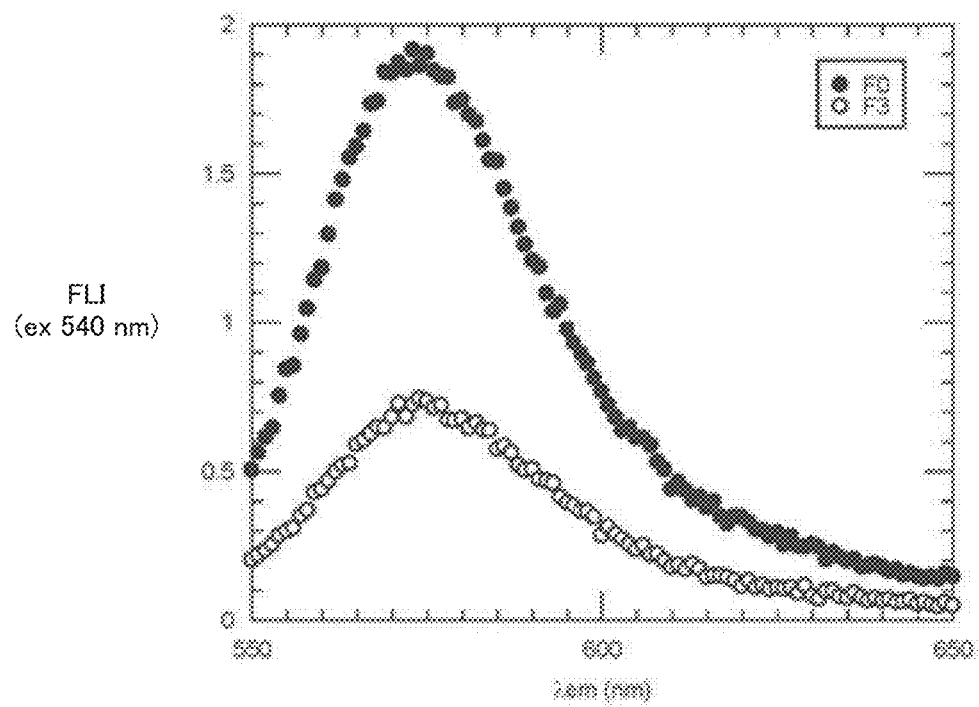
FIG. 25 shows a result of measurement of fluorescence intensity of TMR-partial ACTH peptide before and after a desalting process using an unmodified silica carrier in Example 18.
Figure 26:
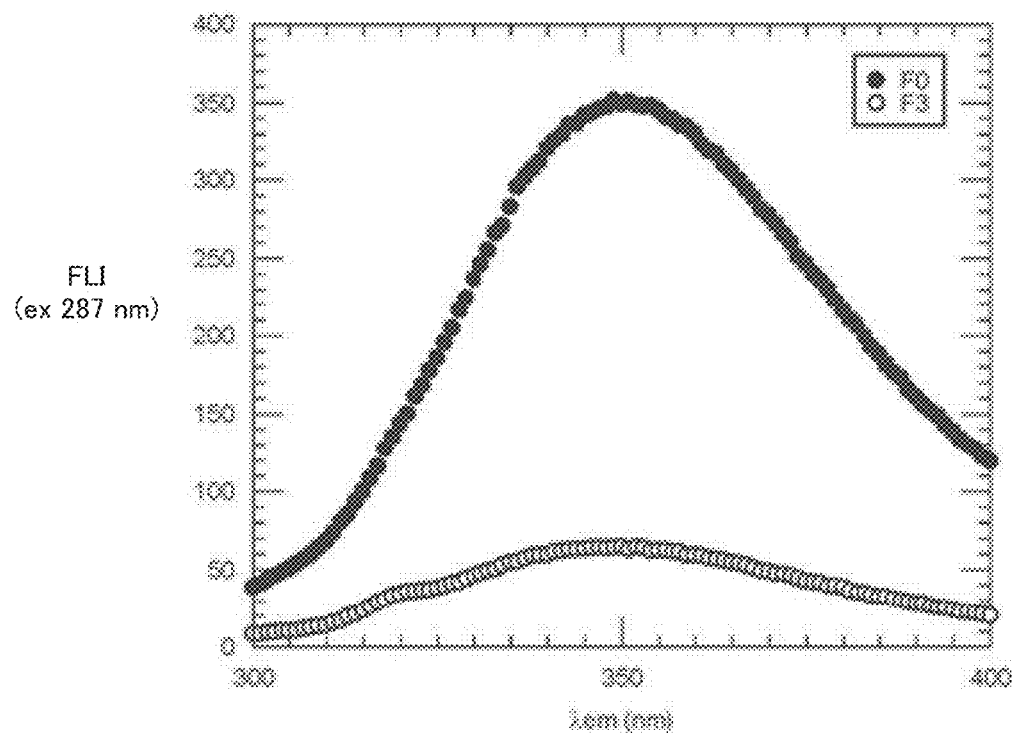
FIG. 26 shows a result of measurement of fluorescence intensity of whole-blood-derived peptide before and after a desalting process using an unmodified silica carrier in Example 18.
Figure 27:
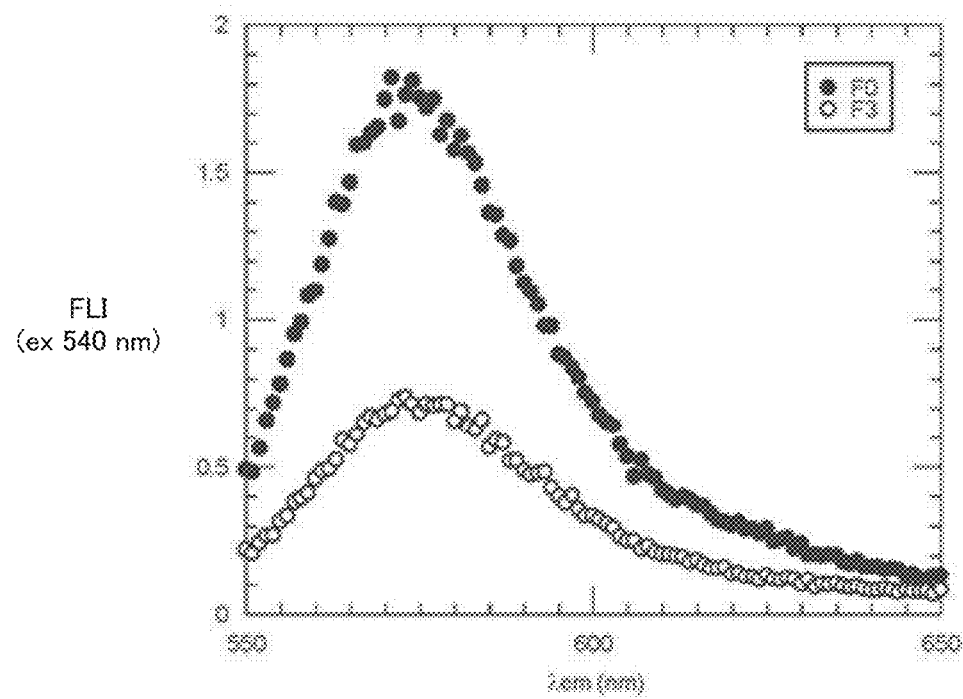
FIG. 27 shows a result of measurement of fluorescence intensity of TMR-partial ACTH peptide before and after a desalting process using an ODS-modified silica carrier in Example 18.
Figure 28:
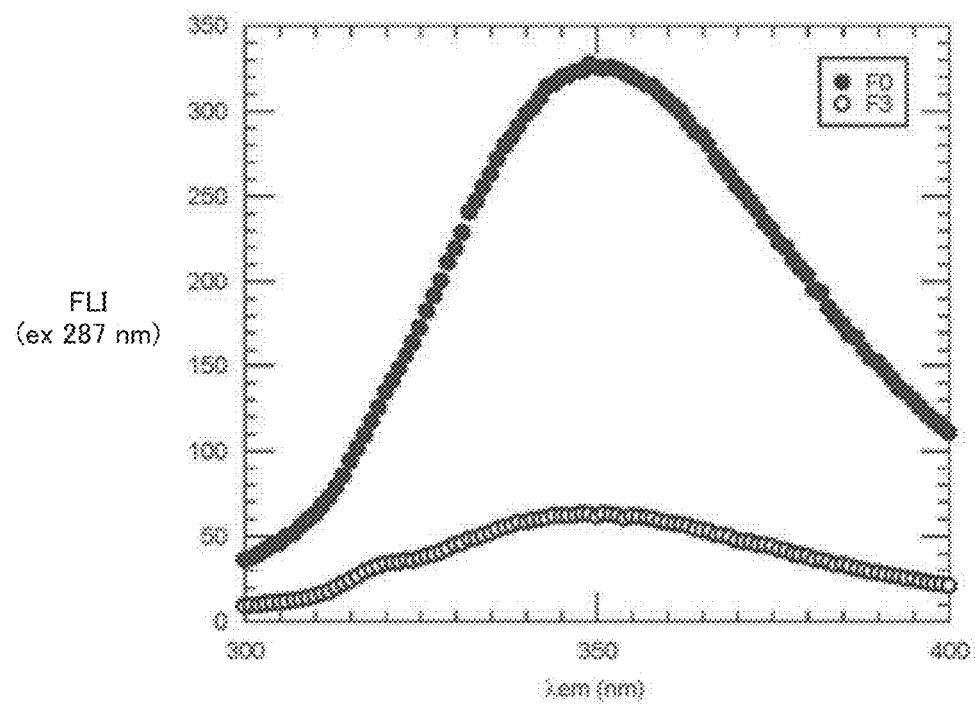
FIG. 28 shows a result of measurement of fluorescence intensity of whole-blood-derived peptide before and after a desalting process using an ODS-modified silica carrier in Example 18.
Figure 29:
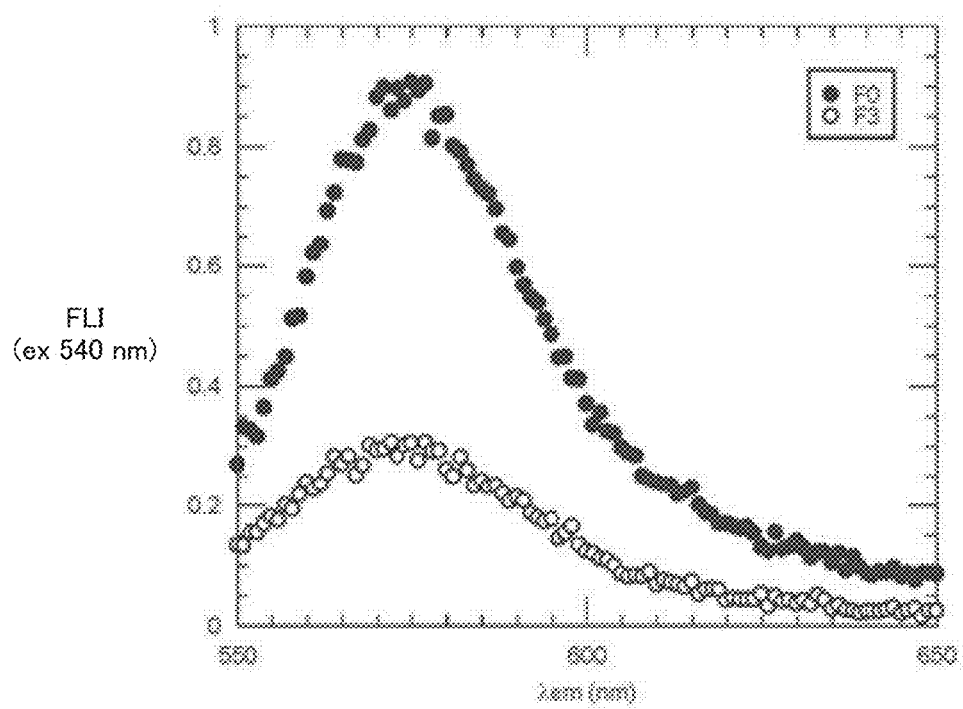
FIG. 29 shows a result of measurement of fluorescence intensity of TMR-partial ACTH peptide before and after a desalting process using an aminosilyl-group-modified silica carrier in Example 18.
Figure 30:
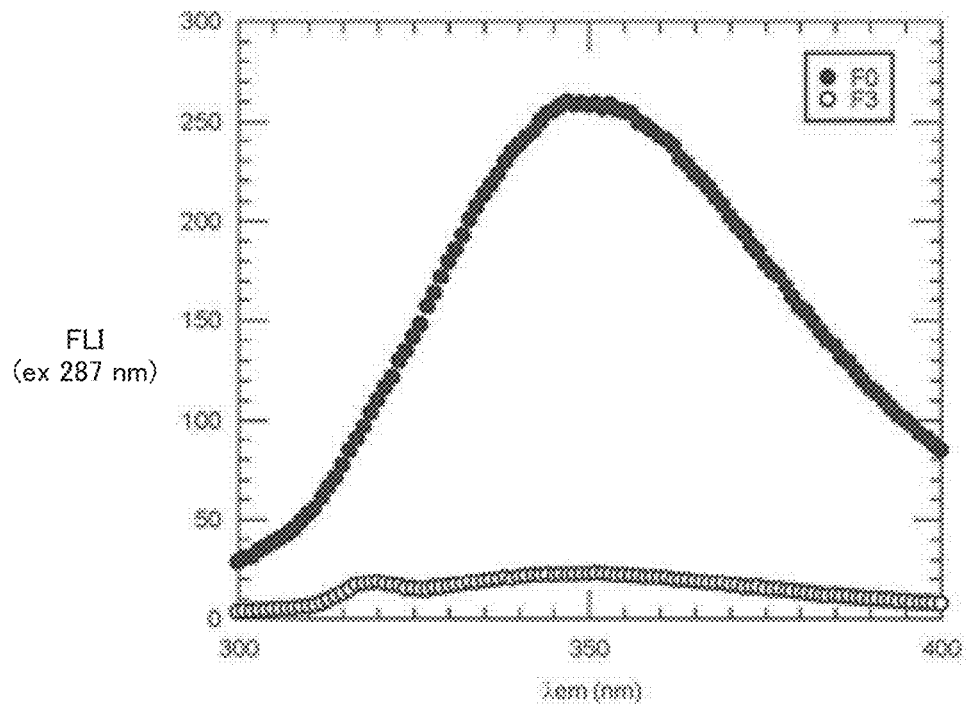
FIG. 30 shows a result of measurement of fluorescence intensity of whole-blood-derived peptide before and after a desalting process using an aminosilyl-group-modified silica carrier in Example 18.

FIG. 25 and FIG. 26 show the fluorescence spectra before and after the present desalting process using the unmodified silica carrier, FIG. 27 and FIG. 28 show the fluorescence spectra before and after the present desalting process using the ODS-modified silica carrier, and FIG. 29 and FIG. 30 show the fluorescence spectra before and after the present desalting process using the aminosilyl-group-modified silica carrier. Tables 14 to 16 below show the fluorescence intensity and the peptide recovery rate, and Table 17 below shows the ratio of recovery rates of TMR-ACTH peptide/whole-blood-derived peptide.

TABLE 14

Unmodified silica carrier

| Fraction | TMR-ACTH peptide | | Whole-blood-derived peptide | |
| --- | --- | --- | --- | --- |
| | Fluorescence intensity (ex 540 nm/em 580 nm) | Recovery rate (%) | Fluorescence intensity (ex 287 nm/em 350 nm) | Recovery rate (%) |
| Before desalting process (F0) | 1.747 | 100 | 349.0 | 100 |
| After desalting process (F3) | 0.675 | 38.6 | 64.50 | 18.5 |

TABLE 15

ODS-modified silica carrier

| Fraction | TMR-ACTH peptide | | Whole-blood-derived peptide | |
| --- | --- | --- | --- | --- |
| | Fluorescence intensity (ex 540 nm/em 580 nm) | Recovery rate (%) | Fluorescence intensity (ex 287 nm/em 350 nm) | Recovery rate (%) |
| Before desalting process (F0) | 1.574 | 100 | 325.4 | 100 |
| After desalting process (F3) | 0.657 | 41.7 | 61.48 | 18.9 |

TABLE 16

Aminosilyl-group-modified silica carrier

| Fraction | TMR-ACTH peptide | | Whole-blood-derived peptide | |
| --- | --- | --- | --- | --- |
| | Fluorescence intensity (ex 540 nm/em 580 nm) | Recovery rate (%) | Fluorescence intensity (ex 287 nm/em 350 nm) | Recovery rate (%) |
| Before desalting process (F0) | 0.853 | 100 | 257.8 | 100 |
| After desalting process (F3) | 0.261 | 30.6 | 22.43 | 8.7 |

TABLE 17

| Kind of silica carrier | Ratio of recovery rates of TMR-ACTH peptide/ whole-blood-derived peptide |
| --- | --- |
| Unmodified silica carrier | 2.1 |
| ODS-modified silica carrier | 2.2 |
| Aminosilyl-group-modified silica carrier | 3.5 |

As a result, salts in the liquid obtained from the whole blood in accordance with the method described in Japanese Laid-Open Patent Publication No. 2015-137978 could be removed, through the retention-back-type BF separation operation using the solid-liquid separation of the present embodiment. Further, there was no big difference in the recovery rate of ACTH among the three kinds of carriers, and it was shown that, with any of the carriers, ACTH could be selectively recovered against a large amount of whole-blood-derived peptide, and that, as a result, ACTH in the peptide in a purified fraction could be condensed.

Preferable modes of the present invention also include a combination of any of the plurality of modes described above.

In addition to the embodiments described above, various modifications of the present invention are possible. Such modifications should not be considered as being excluded from the scope of the present invention. The present invention includes meaning equivalent to the scope of the claims and all modifications within the scope.

What is claimed is:

1. A solid-liquid separation method comprising:
sucking a suspension containing particles, through an opening formed at a leading end of a suction nozzle, into the suction nozzle;
allowing at least a part of the particles contained in the sucked suspension, to sediment by gravity to be clogged in the suction nozzle; and
ejecting a liquid inside the suction nozzle, through the opening of the suction nozzle clogged with the particles, wherein
a minimum opening diameter of the suction nozzle is greater than a maximum diameter of the particles, and is smaller than six times the maximum diameter of the particles,
with respect to a particle diameter and a particle diameter distribution, the particles have $D_{90}-D_{10}$ being not smaller than 120 μm and $D_{50}$ being not smaller than 170 μm,
an inner diameter of the suction nozzle is gradually reduced toward the leading end.

2. The solid-liquid separation method of claim 1, wherein the ejecting the liquid is performed after a difference in particle concentration due to sedimentation has occurred between: a vicinity of the leading end opening in the suspension having the sucked particles substantially uniformly dispersed therein; and a farthest portion from the leading end opening in the suspension, and
the ejecting the liquid is ejecting a liquid that is capable of passing through the suction nozzle clogged with the particles, in association with the ejection.

3. The solid-liquid separation method of claim 2, wherein the suspension is obtained by mixing a sample liquid containing a target substance, and particles for adsorbing the target substance, and
the ejecting the liquid is causing the particles having the target substance adsorbed thereon to remain at a near side of the opening.

4. The solid-liquid separation method of claim 3, wherein the target substance is a desired peptide or nucleic acid, and
the liquid contains a peptide and/or a nucleic acid and a salt other than the desired peptide or nucleic acid.

5. The solid-liquid separation method of claim 3, wherein the sample liquid is whole blood, serum, or plasma.

6. The solid-liquid separation method of claim 3, wherein the sample liquid is a supernatant obtained by heating whole blood, serum, or plasma by means of a microwave oven.

7. The solid-liquid separation method of claim 3, wherein the sample liquid is a desalted liquid of a supernatant obtained by heating whole blood, serum, or plasma by means of a microwave oven.

8. The solid-liquid separation method of claim 3, wherein the particles are particles of a porous material for adsorbing the target substance.

9. The solid-liquid separation method of claim 3, wherein the particles are made from silica, alumina, zirconia, or polystyrene.

10. The solid-liquid separation method of claim 3, wherein after the liquid is ejected, an elution liquid for eluting the target substance from the particles having the target substance adsorbed thereon is sucked into the suction nozzle, at least a part of the particles mixed with the sucked elution liquid is allowed to sediment at the near side of the opening, and the elution liquid and the eluted target substance are ejected through the leading end opening.

11. The solid-liquid separation method of claim 1, wherein the sucking the suspension is immersing the leading end of the suction nozzle in the suspension and causing an air pressure in the suction nozzle to be a negative pressure relative to an external air pressure, the allowing the particles to sediment is keeping the air pressure in the suction nozzle constant, and the ejecting the liquid is causing the air pressure in the suction nozzle to be a positive pressure relative to the external air pressure.

12. The solid-liquid separation method of claim 11, wherein controlling the air pressure in the suction nozzle is controlling a position of a plunger in a state where a syringe including the plunger is connected to a rear end of the suction nozzle, the sucking the suspension is increasing, by moving the plunger, a volume inside the syringe including the suction nozzle, the allowing the particles to sediment is causing the plunger to rest and keep a same position, and the ejecting the liquid is decreasing, by moving the plunger, the volume inside the syringe including the suction nozzle, and then causing the plunger to rest and keep a same position.

13. The solid-liquid separation method of claim 1 to be used in BF separation.

14. The solid-liquid separation method of claim 1, wherein a concentration of the particles in the suspension is 10 to 100 mg/mL.

15. The solid-liquid separation method of claim 1, wherein an inner diameter of the suction nozzle is gradually reduced toward the leading end.

16. A solid-liquid separation apparatus comprising:
a suction unit to which a suction nozzle having an opening formed at a leading end thereof is attached;
a controller programmed to control operation of the suction unit; and a container supporting body configured to support a container storing a sample liquid that contains a target substance, and particles configured to absorb the target substance thereon, wherein the controller is programmed to control the suction unit so as to suck at least a part of a suspension of the sample liquid containing the particles, through the opening into the suction nozzle, allow at least a part of the particles contained in the sucked suspension, to sediment by gravity to be clogged in the suction nozzle, and eject a sample liquid inside the suction nozzle, through the opening of the suction nozzle clogged with the particles, thereby causing the particles having the target substance absorbed thereon, to remain in the suction nozzle, wherein a minimum opening diameter of the suction nozzle is greater than a maximum diameter of the particles, and is smaller than six times the maximum diameter of the particles, with respect to a particle diameter and a particle diameter distribution, the particles have $D_{90}$-$D_{10}$ being not smaller than 120 μm and $D_{50}$ being not smaller than 170 μm, an inner diameter of the suction nozzle is gradually reduced toward the leading end.

17. The solid-liquid separation apparatus of claim 16, wherein the controller is programmed to control the suction unit such that in a resting period determined in advance on the basis of a period after the suction of the suspension until a difference in particle concentration due to sedimentation occurs between:

a vicinity of the leading end opening in the suspension having the particles substantially uniformly dispersed in the suction nozzle; and a farthest portion from the leading end opening in the suspension, the suction unit stops the suction of the suspension to allow at least a part of the particles to sediment, and then, after a lapse of the resting period, the suction unit ejects the sample liquid inside the suction nozzle through the opening of the suction nozzle clogged with the particles.

18. A solid-liquid separation kit comprising:
a pipette tip as a suction nozzle that is used in the method of claim 1 and that does not have a filter in a vicinity of the leading end opening.

* * * * *